US008161824B2

(12) United States Patent
Satou et al.

(10) Patent No.: US 8,161,824 B2
(45) Date of Patent: *Apr. 24, 2012

(54) MULTILAYER FLOW PATH MEMBER OF ULTRASONIC FLUID MEASUREMENT APPARATUS AND ULTRASONIC FLUID MEASUREMENT APPARATUS

(75) Inventors: Masato Satou, Kadoma (JP); Yukinori Ozaki, Kadoma (JP); Akihisa Adachi, Kadoma (JP)

(73) Assignee: Panasonic Corporation, Osaka (JP)

( * ) Notice: Subject to any disclaimer, the term of this patent is extended or adjusted under 35 U.S.C. 154(b) by 218 days.

This patent is subject to a terminal disclaimer.

(21) Appl. No.: 12/668,171

(22) PCT Filed: Jul. 9, 2008

(86) PCT No.: PCT/JP2008/001838

§ 371 (c)(1),
(2), (4) Date: Jan. 7, 2010

(87) PCT Pub. No.: WO2009/008167

PCT Pub. Date: Jan. 15, 2009

(65) Prior Publication Data

US 2010/0192702 A1 Aug. 5, 2010

(30) Foreign Application Priority Data

| Jul. 9, 2007 | (JP) | 2007-179695 |
| Jul. 9, 2007 | (JP) | 2007-179696 |
| Jul. 9, 2007 | (JP) | 2007-179697 |
| Jul. 9, 2007 | (JP) | 2007-179952 |
| Jul. 9, 2007 | (JP) | 2007-179953 |

(51) Int. Cl.
*G01F 1/66* (2006.01)

(52) U.S. Cl. ................................ 73/861.27

(58) Field of Classification Search .............. 73/861.25, 73/861.27
See application file for complete search history.

(56) References Cited

U.S. PATENT DOCUMENTS 7,237,441 B2 7/2007 Umekage et al.
(Continued)

FOREIGN PATENT DOCUMENTS

JP 11-132813 A 5/1999
(Continued)

OTHER PUBLICATIONS

International Search Report for International Application No. PCT/JP2008/001838, dated Oct. 7, 2008, 3 pages.

*Primary Examiner* — Jewel V Thompson
(74) *Attorney, Agent, or Firm* — Brinks Hofer Gilson & Lione

(57) ABSTRACT

A multilayer flow path member of an ultrasonic fluid measurement apparatus and an ultrasonic fluid measurement apparatus capable of enhancing the measurement accuracy of the mean flow velocity are provided. When a multilayer flow path member 30 placed in a measurement flow path 14a shaped in a rectangular cross-section pipe of an ultrasonic fluid measurement apparatus 10 is partitioned into a plurality of flat flow paths 14e by partition plates 32 attached to a frame 31 along a flowing direction, the partition plates 32 are provided so as to face inner faces 15f and 17a of the measurement flow path 14a. Thus, the partition plates 32 are exposed and face the inner faces 15f and 17a of the measurement flow path 14a and thus the space between the exposed partition plate 32 and the inner face 15f, 17a of the measurement flow path 14a becomes the highest-stage or lowest-stage flat flow path 14e. Therefore, a problem of degrading the measurement accuracy as a fluid flows into the space between the frame 31 forming a part of the multilayer flow path member 30 and the inner face 15f, 17a of the measurement flow path 14a as before does not occur and accordingly the measurement accuracy can be enhanced.

16 Claims, 46 Drawing Sheets

U.S. PATENT DOCUMENTS

| | | |
|---|---|---|
| 7,360,449 B2 | 4/2008 | Umekage et al. |
| 7,913,575 B2 * | 3/2011 | Iwanaga et al. ............ 73/861.27 |
| 2006/0201259 A1 | 9/2006 | Umekage et al. |
| 2007/0193367 A1 | 8/2007 | Umekage et al. |

FOREIGN PATENT DOCUMENTS

| | | |
|---|---|---|
| JP | 11-311556 A | 11/1999 |
| JP | 2004-132928 A | 4/2004 |
| JP | 2004-170384 A | 6/2004 |
| JP | 2004-264064 A | 9/2004 |
| JP | 2004-316685 A | 11/2004 |
| JP | 2005-024080 A | 1/2005 |
| JP | 2005-283565 A | 10/2005 |
| JP | 2006-017499 A | 1/2006 |
| JP | 2006-053067 A | 2/2006 |
| WO | WO 2004/074783 A1 | 9/2004 |

* cited by examiner (A)

(B)

(C)

(A)

(B)

(A)

(B)

(C)

MULTILAYER FLOW PATH MEMBER OF ULTRASONIC FLUID MEASUREMENT APPARATUS AND ULTRASONIC FLUID MEASUREMENT APPARATUS

TECHNICAL FIELD

This invention relates to a multilayer flow path member of an ultrasonic fluid measurement apparatus formed with a plurality of flat flow paths in a measurement flow path using the multilayer flow path member and an ultrasonic fluid measurement apparatus.

BACKGROUND ART

The ultrasonic fluid measurement apparatus is an apparatus for allowing a fluid to flow into a measurement flow path, propagating an ultrasonic wave in the measurement flow path, measuring the propagation time of the ultrasonic wave, and finding the flow velocity of the fluid based on the measurement information.

The measurement flow path is provided with a pair of transducers on each of short side faces opposed to each other shaped in a rectangular cross-section pipe rectangular in cross section.

The pairs of transducers are placed so as to transmit and receive an ultrasonic wave along a line crossing at a predetermined angle relative to the flow direction of the measurement flow path.

In recent years, to enhance the measurement accuracy, an ultrasonic fluid measurement apparatus wherein a plurality of partition walls are placed in parallel in a measurement flow path for making the measurement flow path a multilayer flow path has been proposed (for example, refer to patent document 1).

Patent document 1: International Patent Laid-Open No. 04/074783 pamphlet

DISCLOSURE OF THE INVENTION

Problems to be Solved by the Invention

However, when the measurement flow path is made a multilayer flow path, if both margins of a partition plate to form the multilayer flow path are supported by a frame, there is a problem of degrading the measurement accuracy because a fluid flows into the space between the frame and the inner face of the measurement flow path.

The invention is embodied for solving the conventional problems and it is an object of the invention to provide a multilayer flow path member of an ultrasonic fluid measurement apparatus and an ultrasonic fluid measurement apparatus capable of enhancing the measurement accuracy of the mean flow velocity.

Means for Solving the Problems

A multilayer flow path member of an ultrasonic fluid measurement apparatus of the invention is a multilayer flow path member of an ultrasonic fluid measurement apparatus having partition plates placed in a measurement flow path shaped in a rectangular cross-section pipe, formed in the ultrasonic fluid measurement apparatus for partitioning the measurement flow path into a plurality of flat flow paths and a frame for supporting a margin along a flowing direction of a fluid in the partition plates, and has a configuration wherein the partition plates face the inner face of the measurement flow path.

According to the configuration, when the multilayer flow path member placed in the measurement flow path shaped in a rectangular cross-section pipe of the ultrasonic fluid measurement apparatus is partitioned into a plurality of flat flow paths by the partition plates attached to the frame, the partition plates are provided so as to face the inner face of the measurement flow path. Thus, the partition plates are exposed and face the inner face of the measurement flow path and thus the space between the exposed partition plate and the inner face of the measurement flow path becomes the highest-stage or lowest-stage flat flow path. Therefore, the problem of degrading the measurement accuracy as a fluid flows into the space between the frame forming a part of the multilayer flow path member and the inner face of the measurement flow path as before does not occur and accordingly the measurement accuracy of the mean flow velocity can be enhanced.

The multilayer flow path member of the ultrasonic fluid measurement apparatus of the invention has a configuration wherein the partition plates face a pair of opposed inner faces in the measurement flow path.

According to the configuration, the partition plates face both of the paired inner faces of the measurement flow path, so that the measurement accuracy can be further enhanced.

Further, the multilayer flow path member of the ultrasonic fluid measurement apparatus of the invention has an extension provided in an end part along the flowing direction in the frame and has a configuration wherein the inner side face of the extension crosses the inner side face of the frame.

According to the configuration, the extension having an inclined plate is provided in the frame, so that a fluid can be guided smoothly to the inside of the multilayer flow path member and can also be sent out smoothly to the outside of the multilayer flow path member. Thus, to measure a fluid, the flow of the fluid becomes uniform and the measurement accuracy of the mean flow velocity can be enhanced.

Further, the multilayer flow path member of the ultrasonic fluid measurement apparatus of the invention has a configuration wherein a filter member provided in a through hole of the frame for allowing an ultrasonic wave to pass through undergoes water repellency treatment.

According to the configuration, since the filter member undergoes water repellency treatment, a fluid striking the filter member is repelled and clogging caused by a fluid is hard to occur, so that the measurement accuracy can be enhanced.

The multilayer flow path member of the ultrasonic fluid measurement apparatus of the invention has a configuration wherein the frame is provided with seal means for preventing the fluid from flowing into a space between the inner face of the measurement flow path and the outer face of the frame.

According to the configuration, the frame is provided with the seal means for preventing the fluid from flowing into the space between the inner face of the measurement flow path and the outer face of the frame when the multilayer flow path member placed in the measurement flow path shaped in a rectangular cross-section pipe of the ultrasonic fluid measurement apparatus is partitioned into a plurality of flat flow paths by the partition plates attached to the frame along the flowing direction. Thus, the problem of degrading the measurement accuracy as a fluid flows into the space between the frame forming a part of the multilayer flow path member and the inner face of the measurement flow path as before does not occur and accordingly the measurement accuracy can be enhanced.

The multilayer flow path member of the ultrasonic fluid measurement apparatus of the invention has a configuration wherein the seal means is provided integrally with the frame.

According to the configuration, the seal means is provided integrally with the frame, so that a fluid can be prevented from flowing into the space between the inner face of the measurement flow path and the frame without using any other component.

The multilayer flow path member of the ultrasonic fluid measurement apparatus of the invention has a configuration wherein the seal member projects from the frame toward the inner face of the measurement flow path and is continuous in the direction crossing the fluid flowing direction.

According to the configuration, the seal member projects from the frame toward the inner face of the measurement flow path and is continuous in the direction crossing the fluid flowing direction, so that a fluid can be prevented from flowing into the space between the inner face of the measurement flow path and the frame.

Further, the multilayer flow path member of the ultrasonic fluid measurement apparatus of the invention has a configuration wherein the frame is formed roughly like a rectangular cross-section pipe and the seal means is provided like a ring along all outer faces of the frame.

According to the configuration, the seal means is provided over the entire perimeter along the outer surfaces of the frame formed roughly like a rectangular cross-section pipe, so that a fluid can be prevented from flowing into the space between the inner face of the measurement flow path and the frame.

The multilayer flow path member of the ultrasonic fluid measurement apparatus of the invention has a configuration wherein a filter member (mesh punching metal) provided in a through hole of the frame for allowing an ultrasonic wave to pass through undergoes water repellency treatment.

According to the configuration, since the filter member undergoes water repellency treatment, a fluid striking the filter member is repelled and clogging caused by a fluid is hard to occur, so that the measurement accuracy can be enhanced.

Further, the multilayer flow path member of the ultrasonic fluid measurement apparatus of the invention has a configuration wherein a filter member for allowing an ultrasonic wave to pass through includes a frame part housed detachably in a through hole provided in the frame and a filter part supported on the frame part.

According to the configuration, when the filter member is attached to the through hole of the multilayer flow path member placed in the measurement flow path shaped in a rectangular cross-section pipe of the ultrasonic fluid measurement apparatus for partitioning the measurement flow path into a plurality of flat flow paths by the partition plates, the filter part of mesh, punching metal, etc., for example, is attached to the frame part that can be attached to and detached from the through hole position of the frame of the multilayer flow path member. Thus, the filter member can be created separately from the multilayer flow path member and can be attached, and creation of the filter member and the multilayer flow path member is facilitated.

The multilayer flow path member of the ultrasonic fluid measurement apparatus of the invention has a configuration wherein the filter part is placed along the inner face of the flat flow path.

According to the configuration, the filter part for allowing an ultrasonic wave to pass through without allowing a fluid to pass through is placed along the inner face of the flat flow path, so that disturbing of the flow of a fluid can be prevented.

The multilayer flow path member of the ultrasonic fluid measurement apparatus of the invention has a configuration wherein the filter part undergoes water repellency treatment.

According to the configuration, since the filter member undergoes water repellency treatment, a fluid striking the filter member is repelled and clogging caused by a fluid is hard to occur, so that the measurement accuracy can be enhanced.

Further, the multilayer flow path member of the ultrasonic fluid measurement apparatus of the invention has a configuration wherein the partition plates undergo surface treatment for producing regular convexoconcave on the surfaces of the partition plates.

According to the configuration, the surface treatment is provided for producing the regular convexoconcave on the surface of each of the partition plates of the multilayer flow path member for partitioning the measurement flow path shaped in a rectangular cross-section pipe, formed in the ultrasonic fluid measurement apparatus into a plurality of flat flow paths, so that an irregular turbulent flow caused by irregular convexoconcave of the surface of each partition plate occurring in the conventional multilayer flow path member can be suppressed and the measurement accuracy can be enhanced. As the surface treatment for producing regular convexoconcave, for example, dimple process, satin process, sand blasting process, shot blast process, scraping process, coating of painting, etc., can be used.

The multilayer flow path member of the ultrasonic fluid measurement apparatus of the invention has a configuration wherein the surfaces of the partition plates are coated.

According to the configuration, regular convexoconcave is produced on the surfaces of the partition plates by coating, so that variations in flow rate area where a turbulent flow occurs between measurement flow paths can be suppressed and the measurement accuracy can be enhanced.

Further, the multilayer flow path member of the ultrasonic fluid measurement apparatus of the invention has a configuration wherein a filter member being provided in a through hole of the frame for supporting margin end parts of the partition plates along the fluid flowing direction for allowing an ultrasonic wave to pass through undergoes water repellency treatment.

According to the configuration, since the filter member undergoes water repellency treatment, a fluid striking the filter member is repelled and clogging caused by a fluid is hard to occur, so that the measurement accuracy can be enhanced.

Further, an ultrasonic fluid measurement apparatus of the invention is an ultrasonic fluid measurement apparatus including a measurement flow path formed like a rectangular cross-section pipe rectangular in cross section; an ultrasonic measurement section having a first transducer and a second transducer provided on the measurement flow path; and a multilayer flow path member having partition plates housed in the measurement flow path so as to become roughly parallel with respect to an ultrasonic propagation path connecting the first transducer and the second transducer and a frame for supporting a margin along a flowing direction of a fluid in the partition plates, wherein a plurality of flat flow paths are formed in the measurement flow path using the multilayer flow path member, and has a configuration wherein an inclined plane continuing with the inner face of the measurement flow path and continuing with the inner side face of the frame is provided.

According to the configuration, when the multilayer flow path member for partitioning into a plurality of flat flow paths by the partition plates attached to the frame along the flowing direction is provided in the measurement flow path shaped in a rectangular cross-section pipe where the ultrasonic measurement section having the first transducer and the second transducer is provided, the inclined planes continuing with the measurement flow path and the inner side faces of the frames are provided. Thus, a fluid can be guided smoothly to the inside of the multilayer flow path and can also be sent out smoothly to the outside of the multilayer flow path, so that to measure a fluid, the flow of the fluid becomes uniform and the measurement accuracy of the mean flow velocity can be enhanced.

Advantages of the Invention

In the invention, when the multilayer flow path member placed in the measurement flow path shaped in a rectangular cross-section pipe of the ultrasonic fluid measurement apparatus is partitioned into a plurality of flat flow paths by the partition plates attached to the frame along the flowing direction, the partition plates are provided so as to face the inner face of the measurement flow path. Thus, the partition plates are exposed and face the inner face of the measurement flow path and thus the space between the exposed partition plate and the inner face of the measurement flow path becomes the highest-stage or lowest-stage flat flow path. Therefore, the invention can provide the multilayer flow path member of the ultrasonic fluid measurement apparatus and the ultrasonic fluid measurement apparatus having the advantages that the problem of degrading the measurement accuracy as a fluid flows into the space between the frame forming a part of the multilayer flow path member and the inner face of the measurement flow path as before does not occur and accordingly the measurement accuracy can be enhanced.

Figure 1:
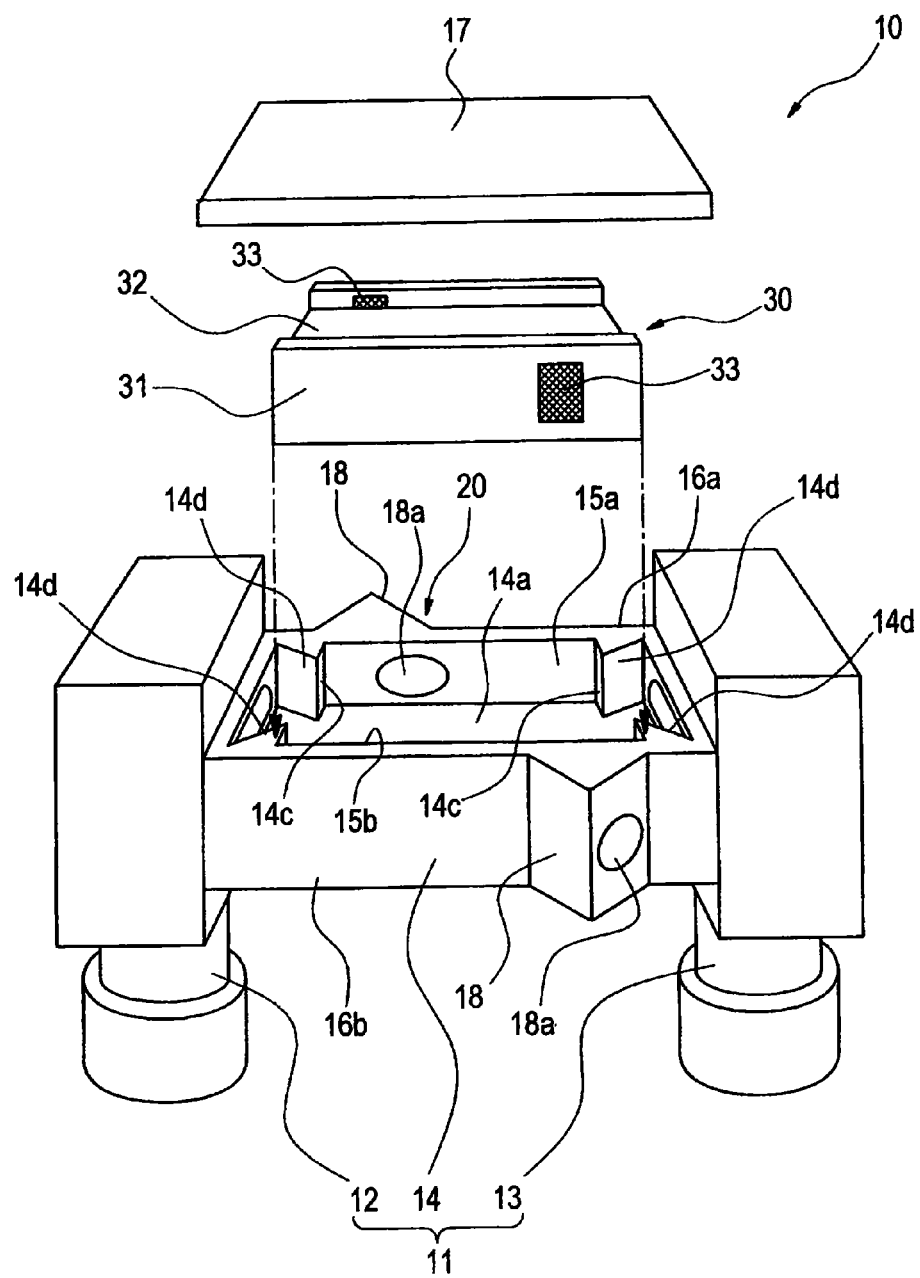
FIG. 1 is a perspective view of an ultrasonic fluid measurement apparatus and a multilayer flow path member according to a first embodiment of the invention.

DESCRIPTION OF REFERENCE NUMERALS (FIGS. 1 to 8)
10 Ultrasonic fluid measurement apparatus
14a Measurement flow path
14d Inclined plane
14e Flat flow path
14f Bottom face (inner face of measurement flow path)
17a Lower face (inner face of measurement flow path)
20 Ultrasonic measurement section
21 First transducer
22 Second transducer
23 Ultrasonic propagation path
30 Multilayer flow path member
31 Frame
31a Inner side face
31b Through hole
32 Partition plate
33 Filter member
34 Extension
  (FIGS. 9 to 16)
10A, 10C, 10E Ultrasonic fluid measurement apparatus
14a Measurement flow path
14b V-shaped concave parts (seal means, second seal means)
14d V-shaped convex parts (seal means, second seal means)
15a, 15b Inner face
20 Ultrasonic measurement section
21 First transducer
22 Second transducer
23 Ultrasonic propagation path
30 Multilayer flow path member
31 Frame
31a Outer face
31b Through hole
32 Partition plate
33 V-shaped convex parts (seal means, first seal means)
34 Filter member
  (FIGS. 17 to 23)
10A, 10B, 10C Ultrasonic fluid measurement apparatus
14a Measurement flow path
15 Inner face
19 Housing concave part
20 Ultrasonic measurement section
21 First transducer
22 Second transducer
23 Ultrasonic propagation path
30A, 30B, 30C Multilayer flow path member
31 Frame
31a Through hole
32 Partition plate
34 Filter member
34a Frame part
34b Filter part
34c Rib
34d Step part (step shape)
  (FIGS. 24 to 28)
10 Ultrasonic fluid measurement apparatus
14a Measurement flow path
14b Flat flow path
30 Multilayer flow path member
31 Frame
31a Through hole
32 Partition plate
32a Concave part (convexoconcave)
32b Convex part (convexoconcave)
33 Filter member
  (FIGS. 29 to 47)
10 Ultrasonic fluid measurement apparatus
14a Measurement flow path
14b Flat flow path
30, 40, 50, 60, 70, 80 Multilayer flow path member
31, 41, 51, 61, 71, 81, 91, 131, 231, 331 Partition member
32, 42, 52, 62, 72, 82a, 82b, 92a, 92b Partition plate
33, 43, 53, 64, 73, 133a, 133b Support part
35 Joint pin
53, 63 Bend part
34b Filter member
83, 93 Wall part
  (FIG. 48)
30 Multilayer flow path member
31 Frame
31a Inner side face
31b Through hole
32 Partition plate
33 Filter member
33a V-shaped convex parts (seal means)

BEST MODE FOR CARRYING OUT THE INVENTION

Figure 2:
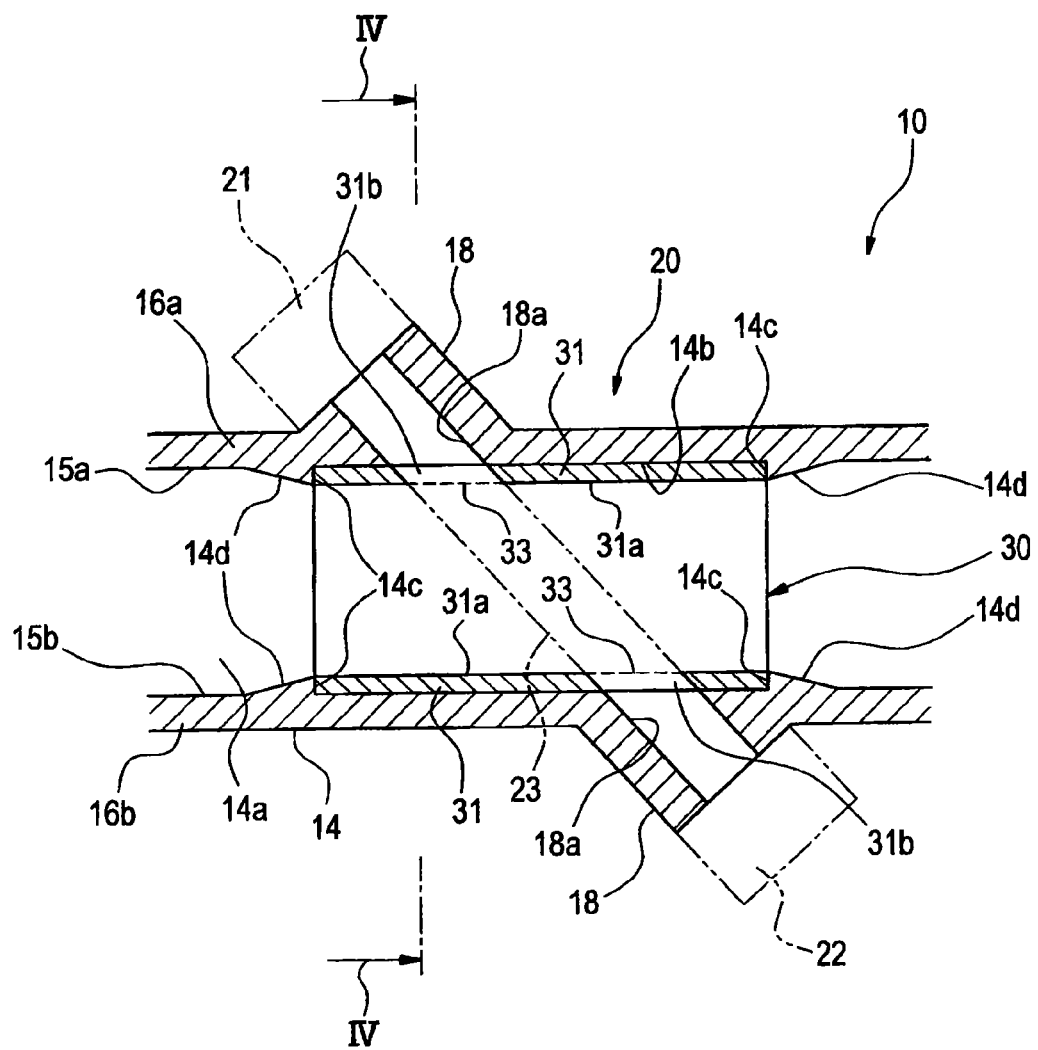
FIG. 2 is a sectional view of a horizontal flow path.
Figure 3:
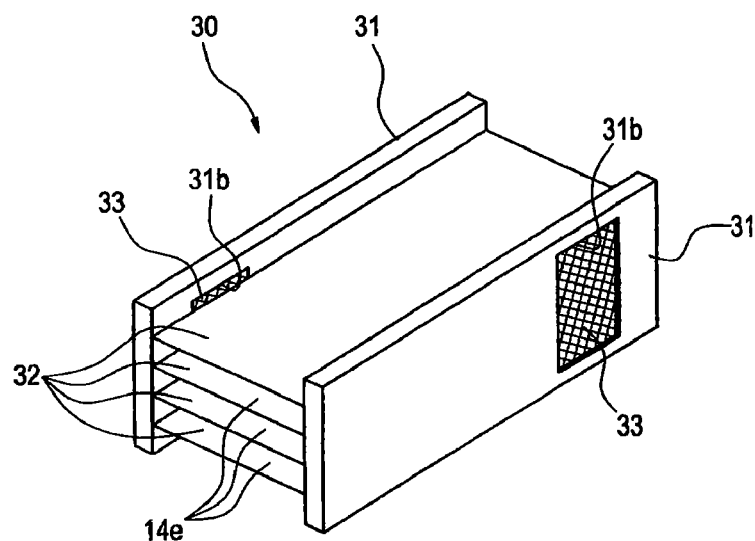
FIG. 3 is a perspective view of the multilayer flow path member.
Figure 4:
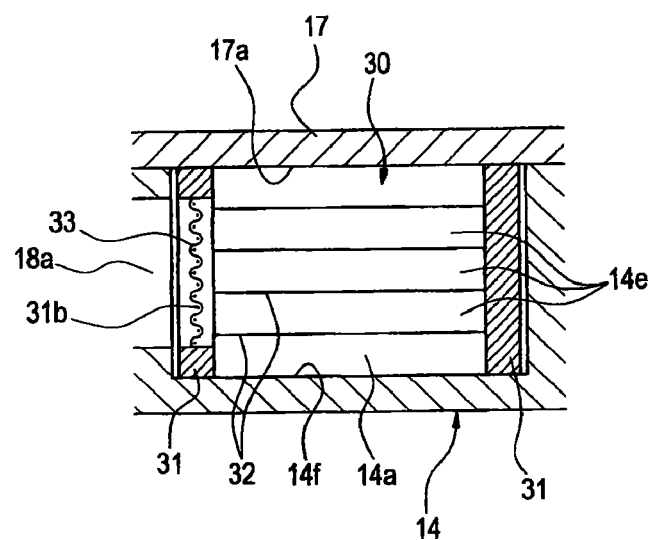
FIG. 4 is a sectional view taken on line IV-IV in FIG. 2.

A multilayer flow path member of an ultrasonic fluid measurement apparatus of each embodiment of the invention and the ultrasonic fluid measurement apparatus will be discussed below with the accompanying drawings:

FIG. 1 is a perspective view of an ultrasonic fluid measurement apparatus and a multilayer flow path member according to a first embodiment of the invention, FIG. 2 is a sectional view of a horizontal flow path, FIG. 3 is a perspective view of the multilayer flow path member, and FIG. 4 is a sectional view taken on line IV-IV in FIG. 2.

First Embodiment

As shown in FIG. 1, an ultrasonic fluid measurement apparatus 10 according to the first embodiment has a fluid path 11 formed roughly like an inverse U letter, made up of left and right vertical flow paths 12 and 13 and a horizontal flow path 14 joining the upper end parts of the left and right vertical flow paths 12 and 13. The horizontal flow path 14 has a measurement flow path 14a for measuring a fluid, and an ultrasonic measurement section 20 having a first transducer (here, a transmitter) 21 and a second transducer (here, a receiver) 22 is provided on a pair of opposed inner faces 15a and 15b in the measurement flow path 14a. Further, the measurement flow path 14a has a multilayer flow path member 30 for partitioning a fluid into a plurality of flat flow paths and a lid 17 for housing the multilayer flow path member 30 in the measurement flow path 14a and sealing. Therefore, if the lid 17 is put on the horizontal flow path 14, the measurement flow path 14a is formed like a rectangular cross-section pipe rectangular in cross section.

An ultrasonic propagation path 23 in a measurement direction connecting the first transducer 21 and the second transducer 22 is provided so as to cross slantingly the fluid flowing direction. Such a placement pattern having an angle relative to the flow where the first transducer 21 and the second transducer 22 are opposed to each other is called Z path (Z-path) or Z method and the Z path placement is illustrated in the first embodiment.

As shown in FIGS. 1 and 2, the horizontal flow path 14 is provided on side walls 16a and 16b with triangle-shaped transducer attachment parts 18 and 18 projecting to the outside. Both the transducer attachment parts 18 and 18 and the side walls 16a and 16b are provided with a through hole 18a, for example, shaped in a circle, piercing in the direction connecting both the transducer attachment parts 18 and 18, and the ultrasonic propagation path 23 is formed. The first transducer 21 is attached to one transducer attachment part 18 and the second transducer 22 is attached to the other transducer attachment part 18.

A multilayer flow path member attachment part 14b is provided inside the measurement flow path 14a of the horizontal flow path 14 and steps 14c for fitting the multilayer flow path member 30 from above are provided. Each of the steps 14c is provided with an inclined plane 14d for smoothly continuing with inner side faces 31a of frames 31 of the multilayer flow path member 30 and the inner faces 15a and 15b of the horizontal flow path 14.

Thus, when the multilayer flow path member 30 is provided in the measurement flow path 14a shaped in a rectangular cross-section pipe where the ultrasonic measurement section 20 having the first transducer 21 and the second transducer 22 is provided, the inclined planes 14d continuing with the measurement flow path 14a and the inner side faces 31a of the frames 31 are provided, so that a fluid can be guided smoothly to the inside of the multilayer flow path member 30 and can also be sent out smoothly from the multilayer flow path member 30 to the outside. Accordingly, to measure a fluid, the flow of the fluid becomes uniform and the measurement accuracy of the mean flow velocity can be enhanced.

As shown in FIG. 3, the multilayer flow path member 30 has partition plates 32 for partitioning the measurement flow path 14a into a plurality of flat flow paths 14e and the frames 31 for supporting margins along the fluid flowing direction in the partition plates 32. That is, as shown in FIG. 4, the frames 31 are placed along the left and right inner faces 15a and 15b of the horizontal flow path 14 and the partition plates 32 are supported horizontally between both the frames 31 and 31. At this time, in the upper end part and the lower end part in the horizontal flow path 14, the partition plates 32 face directly a bottom face 14f of the measurement flow path 14a and a lower face 17a of the lid 17 forming the inner faces (here, upper and lower faces) of the measurement flow path 14a.

It is desirable that the partition plates 32 should be set so that the cross-sectional areas of the flat flow paths 14e partitioned by the partition plates 32 become uniform. It is desirable that the cross-sectional areas of the lowest-stage and highest-stage flat flow paths 14e should also be made uniform in such a manner that the lower end faces of the frames 31 touch the bottom face 14f of the measurement flow path 14a and the upper end faces of the frames 31 touch the lower face 17a of the lid 17. It is also desirable that the partition plates 32 should be placed so as to become roughly parallel with respect to the ultrasonic propagation path 23 connecting the first transducer 21 and the second transducer 22.

As shown in FIGS. 2 to 4, each of the frames 31 of the multilayer flow path member 30 positioned in the ultrasonic propagation path 23 is provided with a through hole 31b for allowing an ultrasonic wave to pass through in a state in which the multilayer flow path member 30 is fitted into the multilayer flow path member attachment part 14b of the measurement flow path 14a. A filter member 33 of fine mesh punching metal, etc., for example, capable of allowing an ultrasonic wave to pass through although it blocks a fluid is attached to the notch 31b; the filter member 33 undergoes water repellency treatment. Thus, a fluid striking the filter member 33 is repelled and clogging caused by a fluid is hard to occur, so that the measurement accuracy can be enhanced.

Here, the "water repellency" refers to the nature of "repelling water" rather than "preventing penetration of water" like waterproofing. As the water repellency treatment, for example, treatment of 1: generating plasma under atmospheric pressure and generating a water-repellent polymer on a material surface by polymerization
2: providing an ultrathin film of fluorine on a material surface
3: forming a nano-scale function membrane on the surface of a raw material by organic thin film treatment, etc., can be illustrated.

According to the multilayer flow path member 30 of the first embodiment described above, the partition plates 32 are provided so as to face the bottom face 14f of the measurement flow path 14a and the lower face 17a of the lid 17, so that the partition plates 32 are exposed and face the bottom face 14f of the measurement flow path 14a and the lower face 17a of the lid 17 and the space between the exposed partition plate 32 and the bottom face 14f of the measurement flow path 14a and the space between the exposed partition plate 32 and the lower face 17a of the lid 17 become the highest-stage or lowest-stage flat flow path 14e. Thus, the problem of degrading the measurement accuracy as a fluid flows into the space between the frame 31 forming a part of the multilayer flow path member 30 and the bottom face 14f of the measurement flow path 14a and the space between the frame 31 and the lower face 17a of the lid 17 as before does not occur and accordingly the measurement accuracy of the mean flow velocity can be enhanced. Since the lowest-stage and highest-stage partition plates 32 and 32 face the bottom face 14f of the measurement flow path 14a and the lower face 17a of the lid 17, a fluid can smoothly flow through the highest-stage and lowest-stage flat flow paths 14e and the measurement accuracy can be further enhanced.

Second Embodiment

Next, a multilayer flow path member of an ultrasonic fluid measurement apparatus and an ultrasonic fluid measurement apparatus according to a second embodiment of the invention will be discussed.

Figure 5:
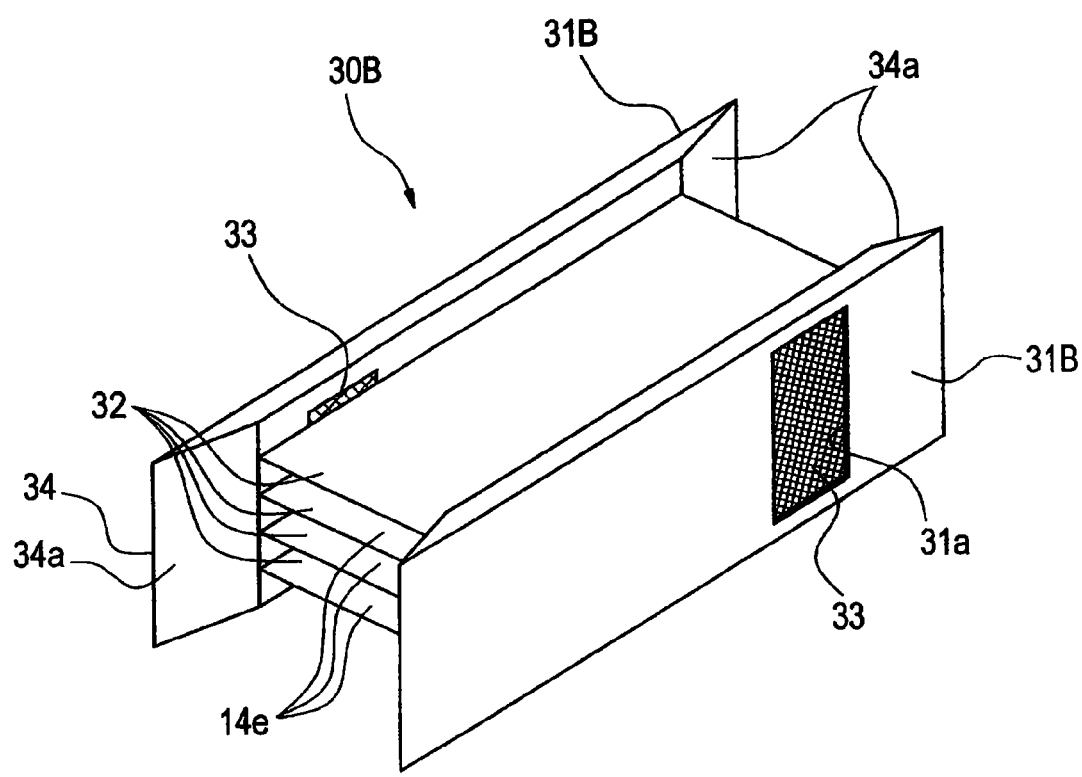
FIG. 5 is a perspective view of a multilayer flow path member according to a second embodiment.
Figure 6:
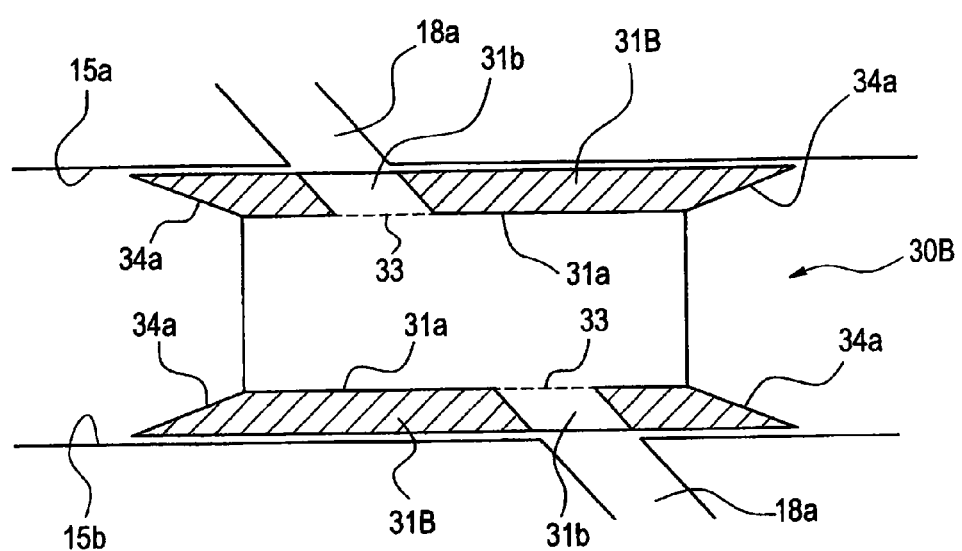
FIG. 6 is a sectional view of the multilayer flow path member according to the second embodiment.

FIG. 5 is a perspective view of the multilayer flow path member according to the second embodiment and FIG. 6 is a sectional view of the multilayer flow path member according to the second embodiment. Parts common to those of the multilayer flow path member of the ultrasonic fluid measurement apparatus and the ultrasonic fluid measurement apparatus according to the first embodiment described above are denoted by the same reference numerals and will not be discussed again.

As shown in FIGS. 5 and 6, a multilayer flow path member 30B according to the second embodiment has extensions 34 provided in end parts along a flowing direction in frames 31B, and an inner side face 34a of each of the extensions 34 crosses relative to an inner side face 31a of each of the frames 31. Therefore, as shown in FIG. 6, the extensions 34 can be inclined relative to left and right inner faces 15a and 15b of a measurement flow path 14a and can be connected smoothly to inner faces of the frames 31B. Accordingly, a fluid can be guided smoothly to the inside of the multilayer flow path member 30B and can also be sent out smoothly to the outside of the multilayer flow path member 30B, so that to measure a fluid, the flow of the fluid becomes uniform and the measurement accuracy of the mean flow velocity can be enhanced. To use the multilayer flow path member 30B according to the second embodiment, the need for providing the inclined planes 14d of the horizontal flow path 14 in the first embodiment described above is eliminated and the structure of the measurement flow path 14a is simplified.

Third Embodiment

Next, a multilayer flow path member of an ultrasonic fluid measurement apparatus and an ultrasonic fluid measurement apparatus according to a third embodiment of the invention will be discussed.

Figure 7:
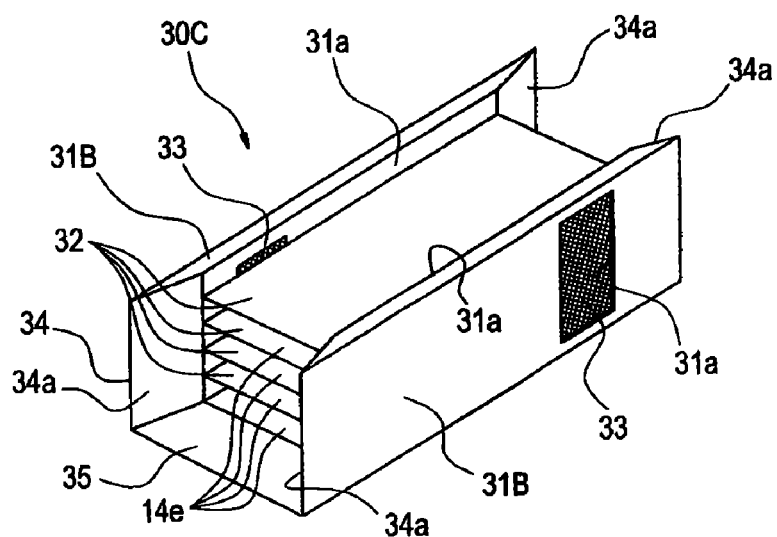
FIG. 7 is a perspective view of a multilayer flow path member according to a third embodiment.
Figure 8:
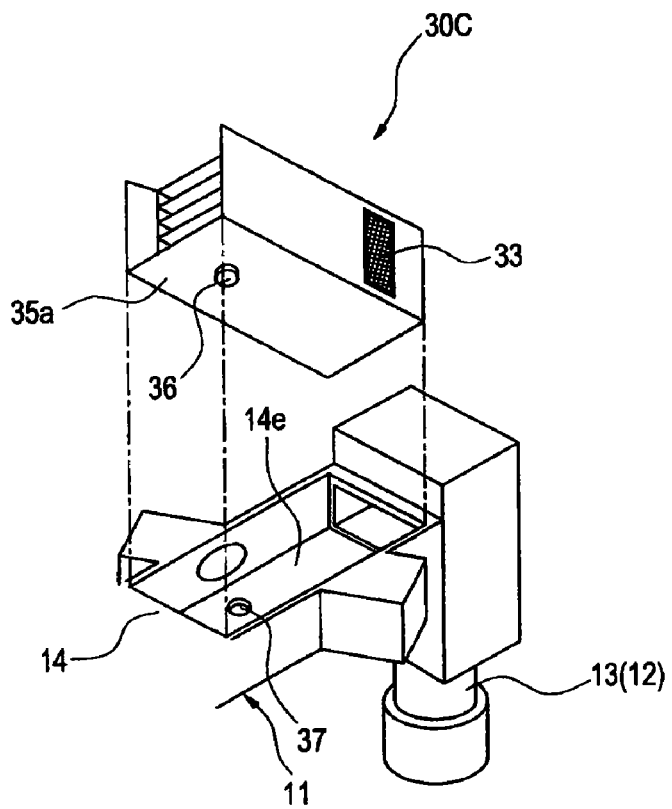
FIG. 8 is an exploded perspective view of a main part of an ultrasonic fluid measurement apparatus according to the third embodiment.

FIG. 7 is a perspective view of the multilayer flow path member according to the third embodiment and FIG. 8 is an exploded perspective view of a main part of the ultrasonic fluid measurement apparatus according to the third embodiment. Parts common to those of the multilayer flow path members of the ultrasonic fluid measurement apparatus and the ultrasonic fluid measurement apparatus according to the first embodiment and the second embodiment described above are denoted by the same reference numerals and will not be discussed again.

As shown in FIGS. 7 and 8, a multilayer flow path member 30C according to the third embodiment is provided with a bottom 35 in the lower end parts of the frames 31B and 31B described above in the second embodiment and is formed like a U letter in cross section. Thus, a flat flow path 14e is also formed between a lowest-stage partition plate 32 and the bottom 35. A positioning projection 36, for example, shaped in a circular cylinder, is provided on a lower face 35a of the bottom 35 and a positioning recess 37 into which the projection 36 is fitted is provided on a measurement flow path 14a in a horizontal flow path 14 of a fluid path body 11. Accordingly, the multilayer flow path member 30C can be placed reliably at a predetermined position.

Fourth Embodiment

Next, a fourth embodiment of the invention will be discussed.

Figure 9:
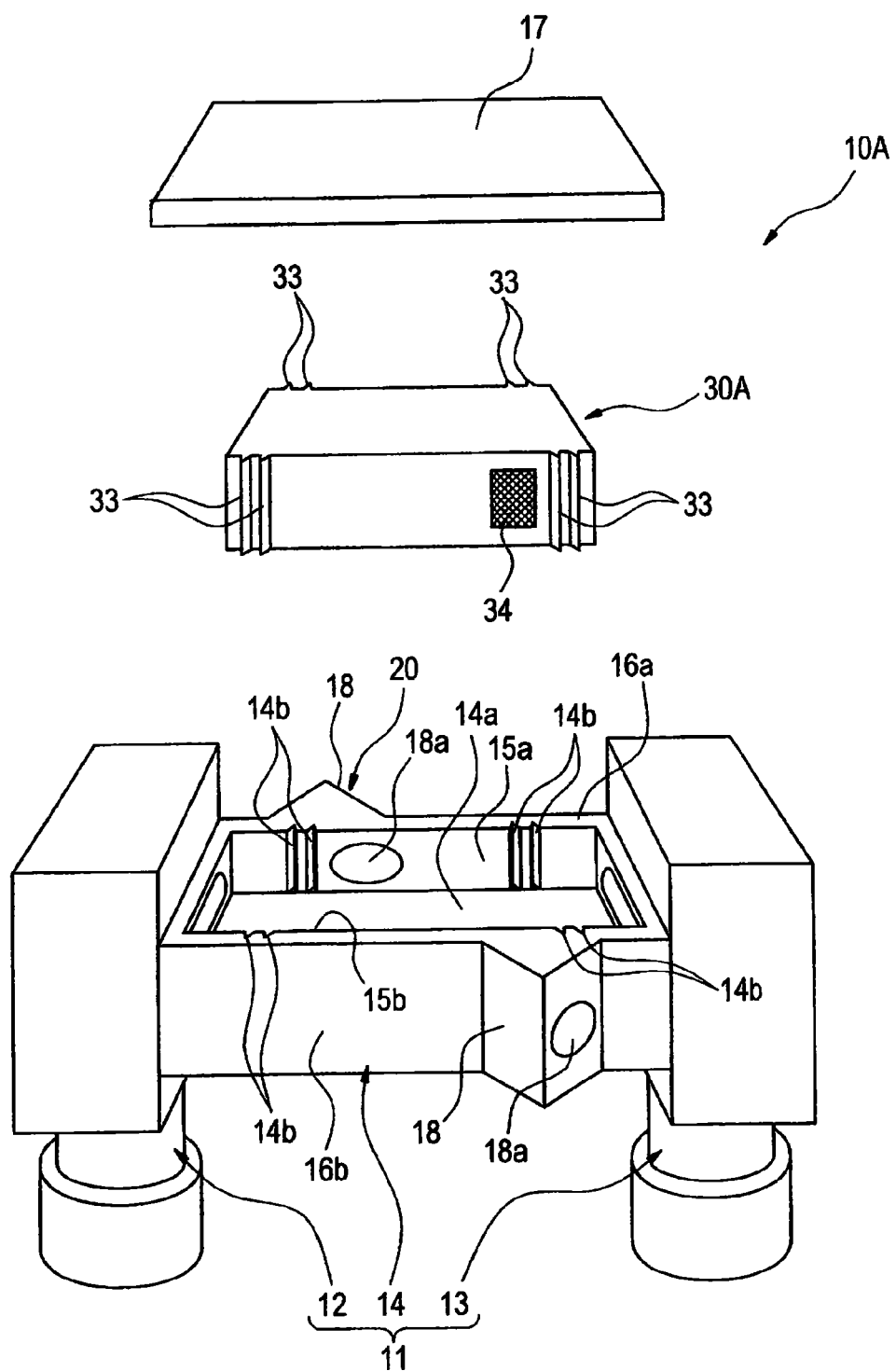
FIG. 9 is a perspective view of an ultrasonic fluid measurement apparatus and a multilayer flow path member according to a fourth embodiment of the invention.

As shown in FIG. 9, an ultrasonic fluid measurement apparatus 10A according to the fourth embodiment has a fluid path 11 formed roughly like an inverse U letter, made up of left and right vertical flow paths 12 and 13 and a horizontal flow path 14 joining the upper end parts of the left and right vertical flow paths 12 and 13. The horizontal flow path 14 has a measurement flow path 14a for measuring a fluid, and an ultrasonic measurement section 20 having a first transducer (here, a transmitter) 21 and a second transducer (here, a receiver) 22 is provided on a pair of opposed inner faces 15a and 15b in the measurement flow path 14a. Further, the measurement flow path 14a has a multilayer flow path member 30A for partitioning a fluid into a plurality of flat flow paths and a lid 17 for housing the multilayer flow path member 30A in the measurement flow path 14a and sealing. Therefore, if the lid 17 is put on the horizontal flow path 14, the measurement flow path 14a is formed like a rectangular cross-section pipe rectangular in cross section.

An ultrasonic propagation path 23 in a measurement direction connecting the first transducer 21 and the second transducer 22 is provided so as to cross slantingly the fluid flowing direction. Such a placement pattern having an angle relative to the flow where the first transducer 21 and the second transducer 22 are opposed to each other is called Z path (Z-path) or Z method and the Z path placement is illustrated in the fourth embodiment.

Figure 10:
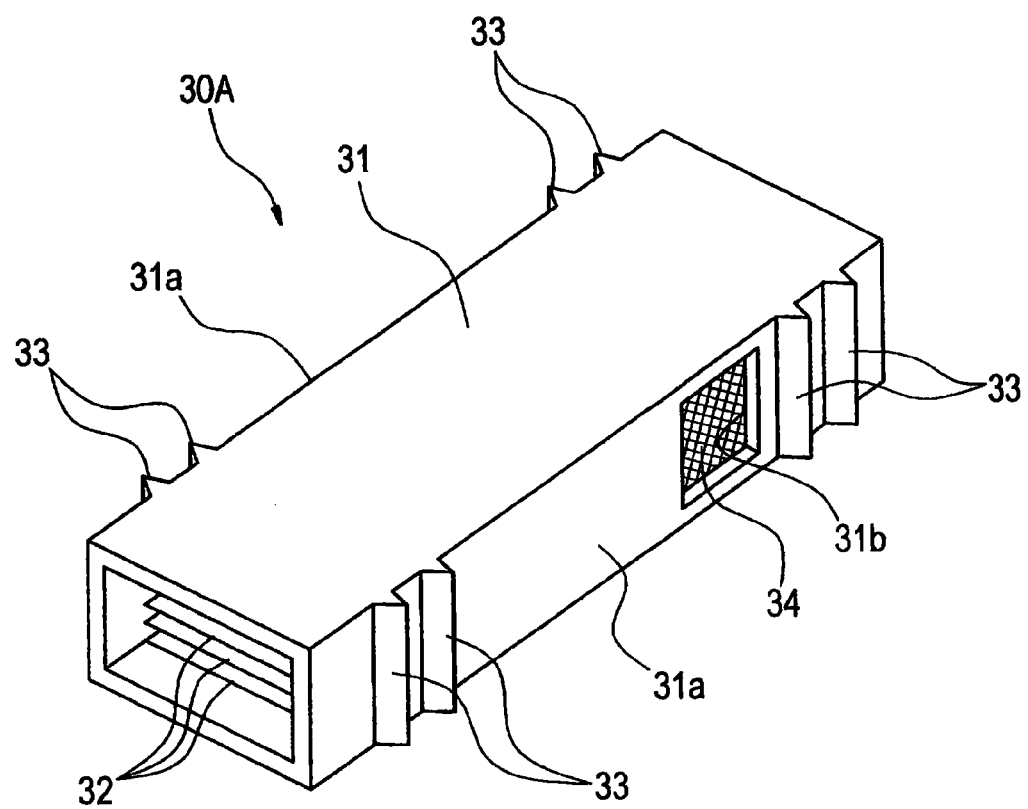
FIG. 10 is a perspective view of the multilayer flow path member according to the fourth embodiment of the invention.

As shown in FIGS. 9 and 10, the horizontal flow path 14 is provided on side walls 16a and 16b with triangle-shaped transducer attachment parts 18 and 18 projecting to the outside. Both the transducer attachment parts 18 and 18 and the side walls 16a and 16b are provided with a through hole 18a, for example, shaped in a circle, piercing in the direction connecting both the transducer attachment parts 18 and 18, and the ultrasonic propagation path 23 is formed. The first transducer 21 is attached to one transducer attachment part 18 and the second transducer 22 is attached to the other transducer attachment part 18 (see FIG. 11).

V-shaped concave parts 14b of seal means (second seal means) are provided on both the inner faces 15a and 15b of the measurement flow path 14a of the horizontal flow path 14 (a total of four) across the ultrasonic propagation path. Here, two V-shaped concave parts 14b are formed in each part.

As shown in FIG. 10, the multilayer flow path member 30A has partition plates 32 for partitioning the measurement flow path 14a into a plurality of flat flow paths and frames 31 for supporting margins along the fluid flowing direction in the partition plates 32.

On outer faces 31a of the frames 31, V-shaped convex parts 33 of seal means (first seal means) corresponding to the V-shaped concave parts 14b of the second seal means described above provided on the measurement flow path 14a are provided projecting from the frames 31 toward the inner faces 15a and 15b of the measurement flow path 14a. Since the V-shaped convex parts 33 are provided integrally with the frame 31, a fluid can be prevented from flowing into the space between the inner face of the measurement flow path and the frame without using any other component. The V-shaped convex parts 33 are provided continuously in the direction crossing the fluid flowing direction (here, at the right angle to the fluid flowing direction).

Figure 11:
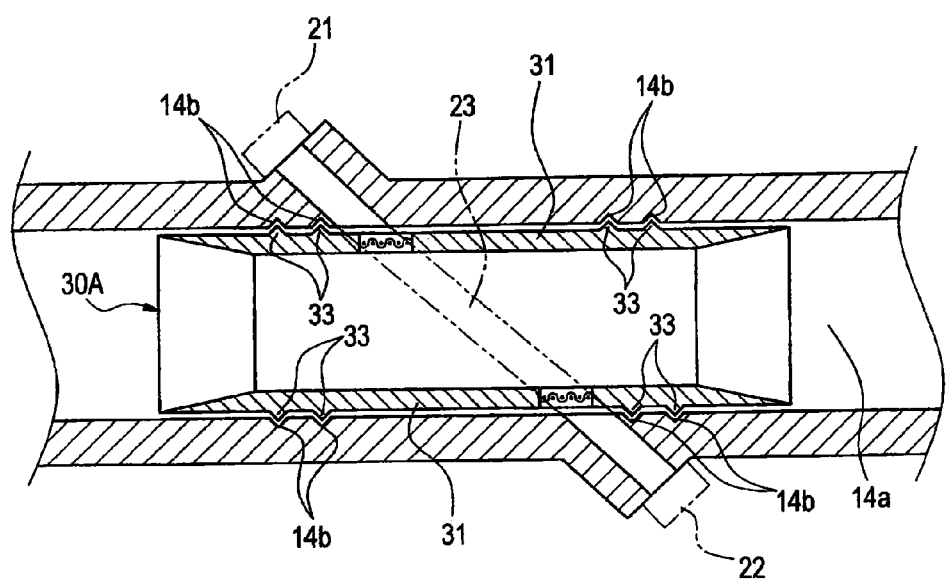
FIG. 11 is a plan view of a horizontal flow path.
Figure 12:
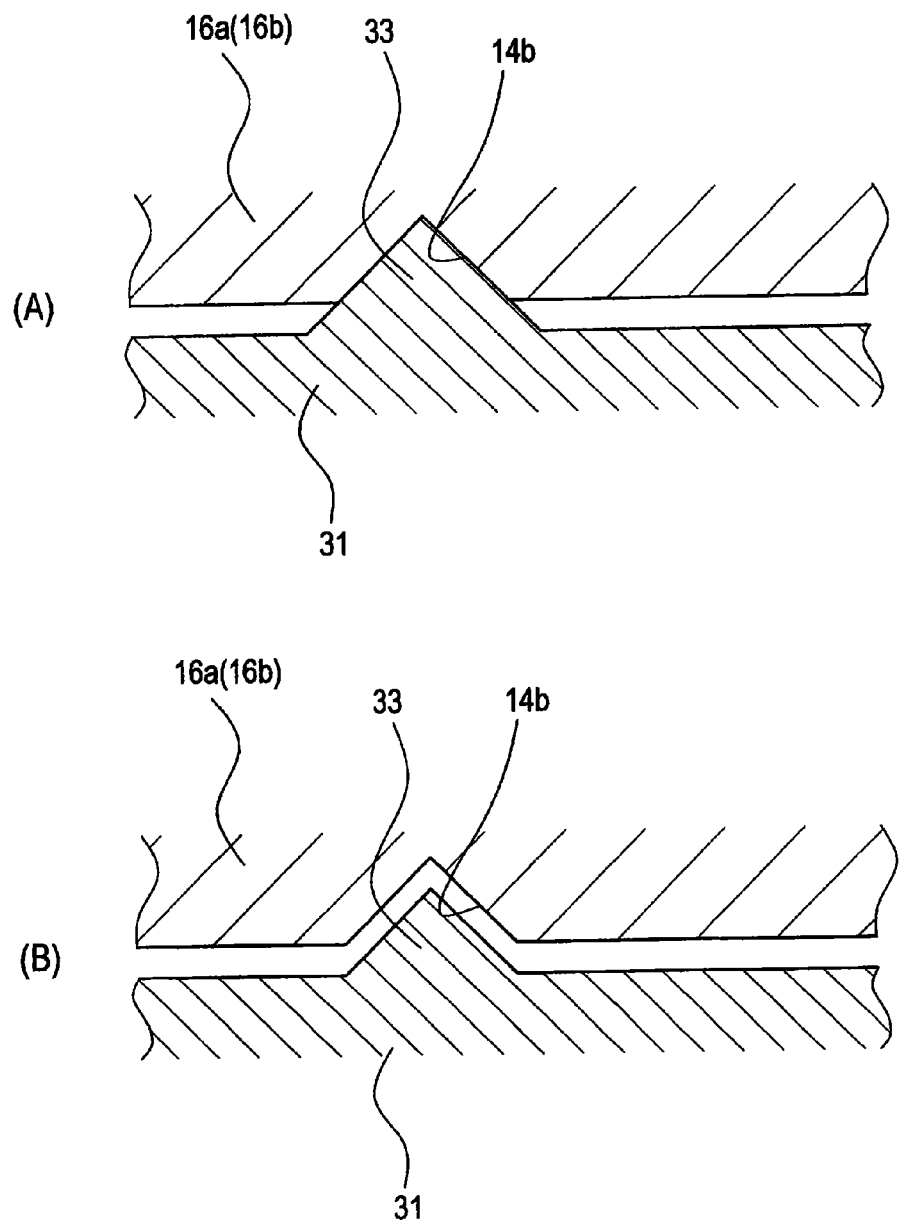
FIGS. 12(A) and (B) are sectional views to show the fit state of a V-shaped convex part and a V-shaped concave part.
Figure 13:
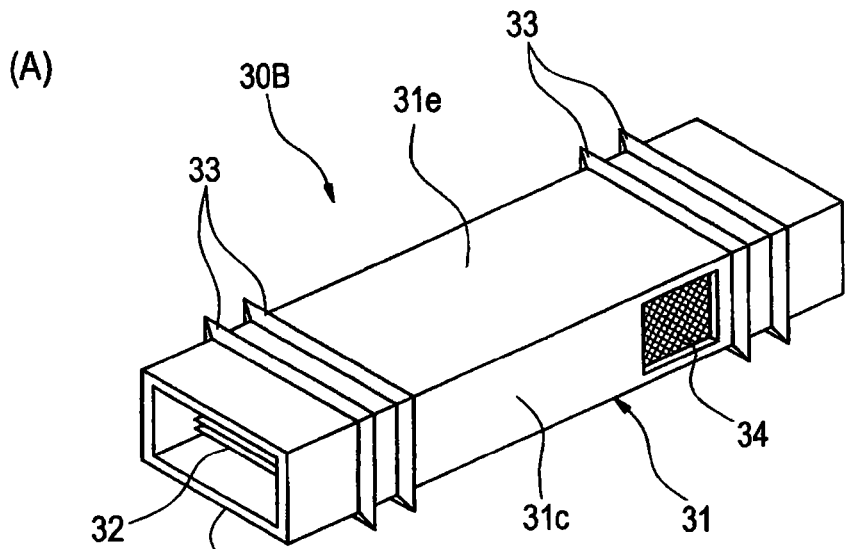
FIG. 13(A) is a perspective view of viewing a multilayer flow path member according to a fifth embodiment of the invention from above.
FIG. 13(B) is a perspective view of viewing the main part of the lower face of a lid member from below.
FIG. 13(C) is a perspective view of viewing the main part of an ultrasonic fluid measurement apparatus from above.
Figure 13:
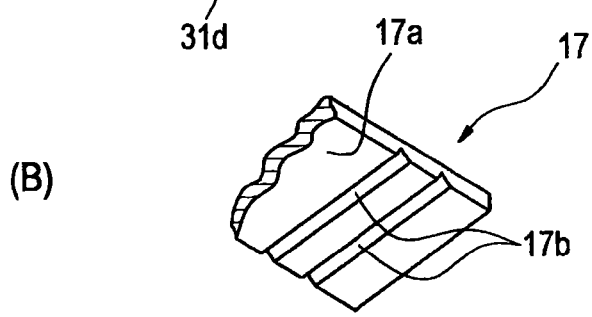
Figure 13:
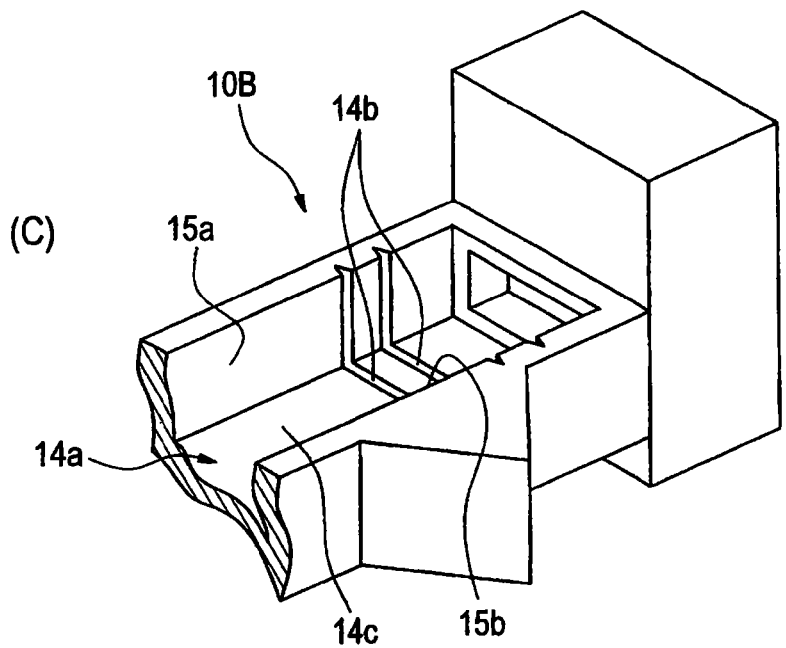

Therefore, if the multilayer flow path member 30A is fitted into the measurement flow path 14a, the V-shaped convex parts 33 are fitted into the V-shaped concave parts 14b as shown in FIG. 11 and thus a fluid does not flow into the space between the frame 31 and the inner face 15a, 15b of the measurement flow path 14a. Positioning of the multilayer flow path member 30A in the measurement flow path 14a is facilitated. The V-shaped concave part 14b and the V-shaped convex part 33 may come in contact with each other as shown in FIG. 12(A). Alternatively, if they do not come in contact with each other, a labyrinth seal may be formed as shown in FIG. 12(B).

As shown in FIGS. 10 and 11, each of the frames 31 of the multilayer flow path member 30A positioned in the ultrasonic propagation path 23 is provided with a through hole 31b for allowing an ultrasonic wave to pass through in a state in which the multilayer flow path member 30A is fitted into the measurement flow path 14a. A filter member 34 of fine mesh punching metal, etc., for example, capable of allowing an ultrasonic wave to pass through although it blocks a fluid is attached to each of the notches 31b; the filter member 34 undergoes water repellency treatment. Thus, a fluid striking the filter member 33 is repelled and clogging caused by a fluid is hard to occur, so that the measurement accuracy can be enhanced.

Here, the "water repellency" refers to the nature of "repelling water" rather than "preventing penetration of water" like waterproofing. As the water repellency treatment, for example, treatment of 1: generating plasma under atmospheric pressure and generating a water-repellent polymer on a material surface by polymerization
2: providing an ultrathin film of fluorine on a material surface
3: forming a nano-scale function membrane on the surface of a raw material by organic thin film treatment, etc., can be illustrated.

According to the multilayer flow path member 30A of the ultrasonic fluid measurement apparatus according to the fourth embodiment of the invention described above, on the multilayer flow path member 30A where the flow path is partitioned into a plurality of flat flow paths by the partition plates 32 placed in the measurement flow path 14a shaped in a rectangular cross-section pipe of the ultrasonic fluid measurement apparatus 10A and attached to the frames 31, the V-shaped convex parts 33 for preventing a fluid from flowing into the space between the inner face 15a, 15b of the measurement flow path 14a and the outer face 31a of the frame 31 are provided integrally with the frame 31. Thus, the problem of degrading the measurement accuracy as a fluid flows into the space between the frame 31 forming a part of the multilayer flow path member 30A and the inner face 15a, 15b of the measurement flow path 14a as before does not occur and accordingly the measurement accuracy can be enhanced.

According to the ultrasonic fluid measurement apparatus 10A according to the fourth embodiment of the invention described above, the V-shaped concave parts 14b into which the V-shaped convex parts 33 are fitted provided in the multilayer flow path member 30A are provided on the inner faces 15a and 15b of the measurement flow path 14a shaped in a rectangular cross-section pipe where the ultrasonic measurement section 20 having the first transducer 21 and the second transducer is provided, so that the problem of degrading the measurement accuracy as a fluid flows into the space between the frame 31 forming a part of the multilayer flow path member 30A and the inner face 15a, 15b of the measurement flow path 14a as before does not occur and accordingly the measurement accuracy can be enhanced.

Fifth Embodiment

Next, a fifth embodiment of the invention will be discussed.

FIG. 13(A) is a perspective view of viewing a multilayer flow path member according to the fifth embodiment of the invention from above, FIG. 13(B) is a perspective view of viewing the main part of the lower face of a lid member from below, and FIG. 13(C) is a perspective view of viewing the main part of an ultrasonic fluid measurement apparatus from above. Parts common to those of the multilayer flow path member of the ultrasonic fluid measurement apparatus and the ultrasonic fluid measurement apparatus according to the fourth embodiment described above are denoted by the same reference numerals and will not be discussed again.

As shown in FIG. 13(A), in a multilayer flow path member 30B according to the fifth embodiment, V-shaped convex parts 33 of seal means are provided each like a ring along all outer faces of a frame 31 formed roughly like a rectangular cross-section pipe. That is, the V-shaped convex parts 33 are formed over the entire perimeter of the outer surfaces of not only side walls 31c and 31c, but also a bottom face 31d and an upper face 31e of the frame 31. As shown in FIG. 13(B), a lid 17 has a lower face 17a provided with V-shaped concave parts 17b corresponding to the V-shaped convex parts 33. Further, as shown in FIG. 13(C), a measurement flow path 14a is provided with V-shaped concave parts 14b not only on inner faces 15a and 15b of side walls 16a and 16b, but also on a bottom face 14c.

According to the multilayer flow path member of the fifth embodiment described above, advantages similar to those of the fourth embodiment described above can be provided. Since the V-shaped convex parts 33 are provided over the entire perimeter along the outer surfaces of the frame 31 formed roughly like a rectangular cross-section pipe, a fluid can be still more prevented from flowing into the space between the measurement flow path 14a and the frame 31.

Sixth Embodiment

Next, a sixth embodiment of the invention will be discussed.

Figure 14:
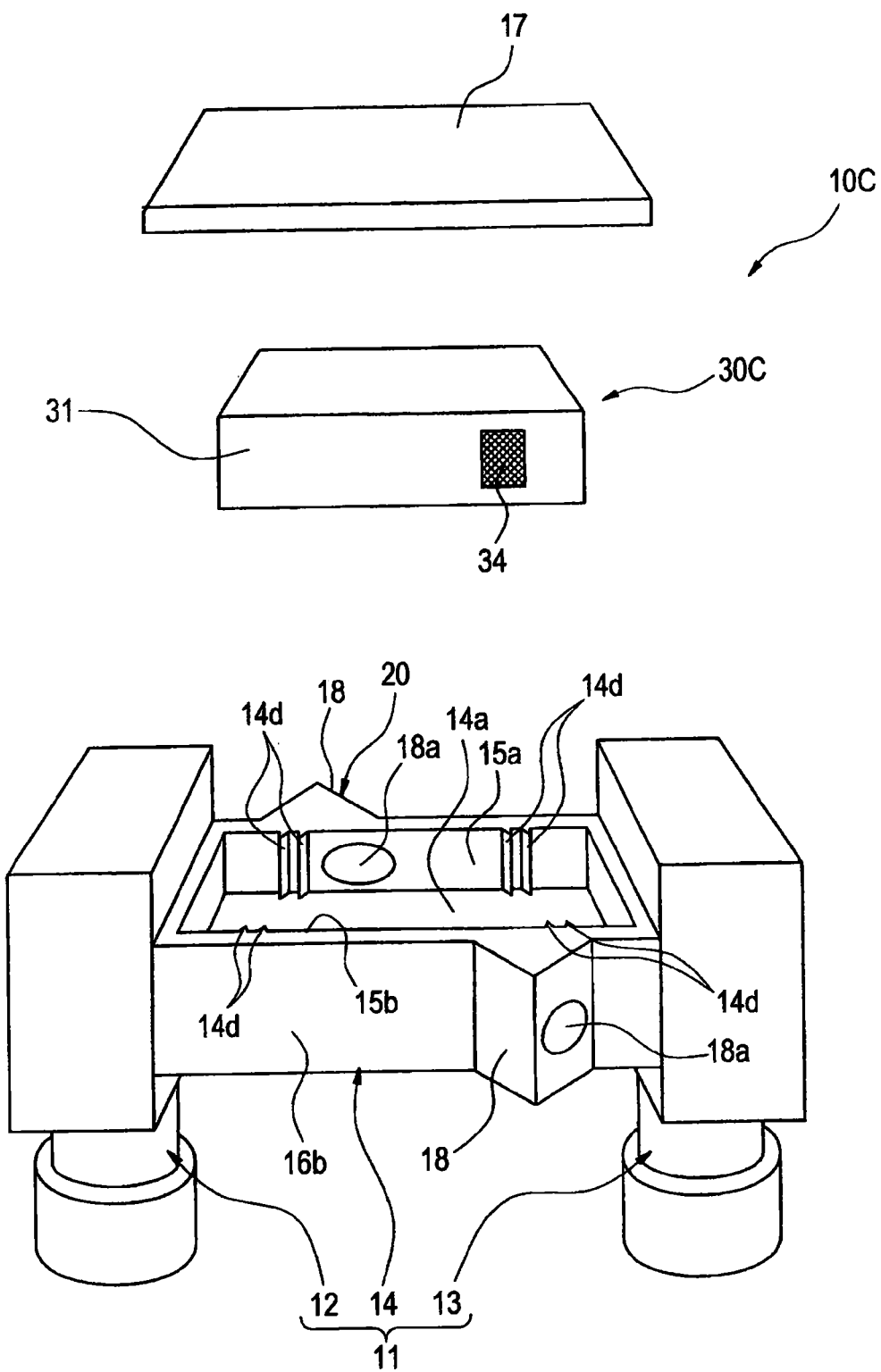
FIG. 14 is an exploded perspective view of viewing an ultrasonic fluid measurement apparatus according to a sixth embodiment of the invention from above.

FIG. 14 is an exploded perspective view of viewing an ultrasonic fluid measurement apparatus according to the sixth embodiment of the invention from above. Parts common to those of the multilayer flow path member of the ultrasonic fluid measurement apparatus and the ultrasonic fluid measurement apparatus according to the fourth or fifth embodiment described above are denoted by the same reference numerals and will not be discussed again.

As shown in FIG. 14, in an ultrasonic fluid measurement apparatus 10C according to the sixth embodiment, V-shaped convex parts 14d of seal means for preventing a fluid from flowing into the space between inner face 15a, 15b of a measurement flow path 14a and an outer face 31a of a frame 31 are provided on the inner faces 15a and 15b of the measurement flow path 14a. Therefore, in a multilayer flow path member 30C attached to the measurement flow path 14a of the ultrasonic fluid measurement apparatus 10C, it is not necessary to provide V-shaped convex parts 33 as described above in the fourth embodiment (see FIGS. 9 and 10) on the outer face 31a of the frame 31.

According to the multilayer flow path member of the sixth embodiment described above, advantages similar to those of the fourth embodiment described above can be provided.

Seventh Embodiment

Next, a seventh embodiment of the invention will be discussed.

FIG. 15(A) is a plan view of a multilayer flow path member according to the seventh embodiment of the invention, FIG. 15(B) is a plan view of a measurement flow path of an ultrasonic fluid measurement apparatus, and FIG. 15(C) is an enlarged view to show the relationship between a frame of the multilayer flow path member and an inner face of the measurement flow path. Parts common to those of the multilayer flow path members of the ultrasonic fluid measurement apparatus and the ultrasonic fluid measurement apparatus according to the fourth to sixth embodiments described above are denoted by the same reference numerals and will not be discussed again.

Figure 15:
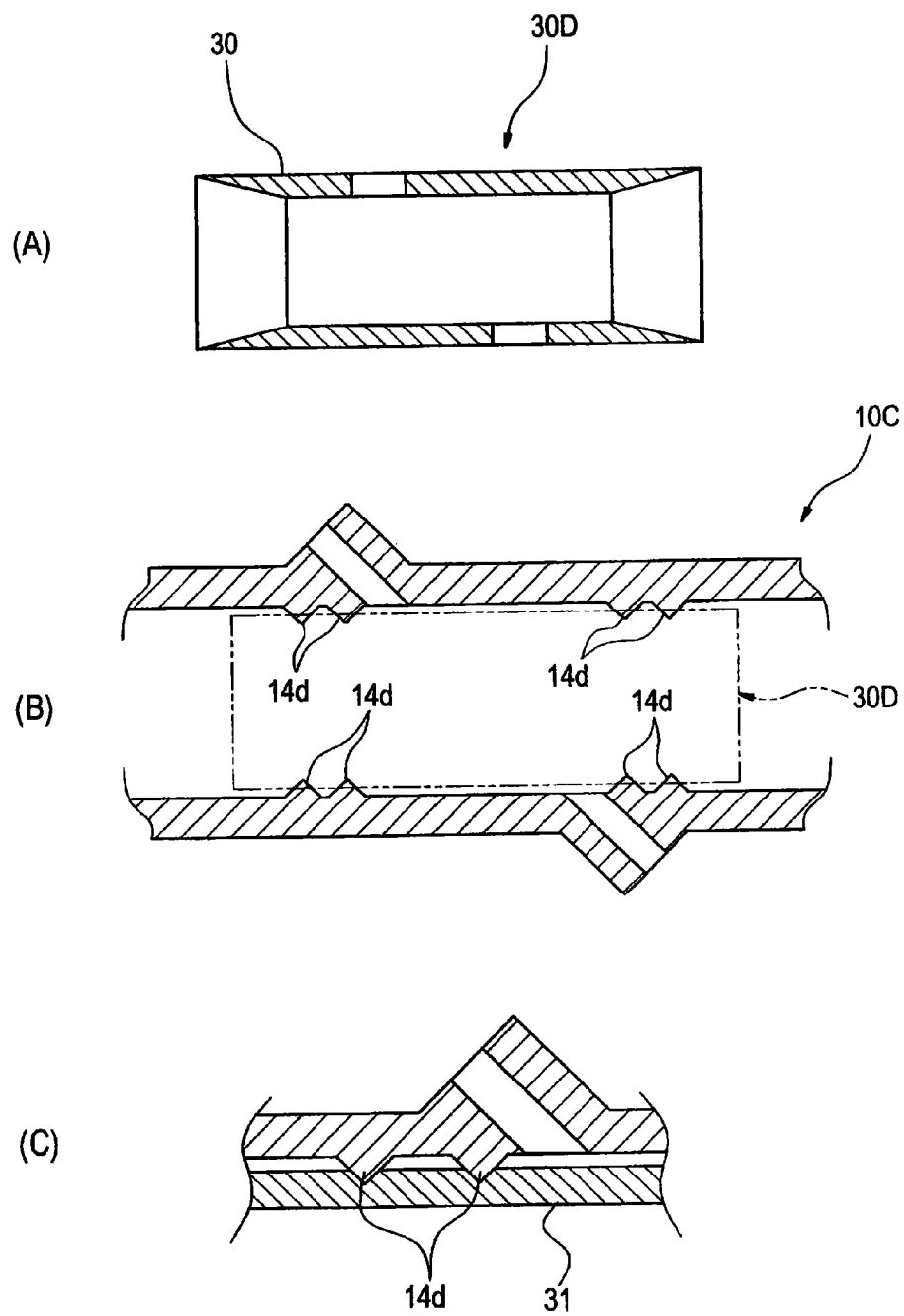
FIG. 15(A) is a plan view of a multilayer flow path member according to a seventh embodiment of the invention.
FIG. 15(B) is a plan view of a measurement flow path of an ultrasonic fluid measurement apparatus.
FIG. 15(C) is an enlarged view to show the relationship between a frame of the multilayer flow path member and an inner face of the measurement flow path.

As shown in FIG. 15, a multilayer flow path member 30D of the ultrasonic fluid measurement apparatus according to the seventh embodiment has a frame 31 formed of a resin soft to some degree, and is used for a measurement flow path 14a where V-shaped convex parts 14d are provided on inner faces 15a and 15b as with the ultrasonic fluid measurement apparatus 10C according to the seventh embodiment described above. In this case, the V-shaped convex parts 14d provided on the measurement flow path 14a are engaged in an outer face 31a of the soft resin frame 31 of the multilayer flow path member 30D.

According to the multilayer flow path member of the seventh embodiment described above, advantages similar to those of the fourth embodiment described above can be provided. Since the V-shaped convex parts 14d provided on the measurement flow path 14a are engaged in the outer face 31a of the soft resin frame 31 of the multilayer flow path member 30D, a fluid can be still more prevented from flowing into the space between the measurement flow path 14a and the frame 31.

Eighth Embodiment

Next, an eighth embodiment of the invention will be discussed.

FIG. 16(A) is a plan view of a multilayer flow path member and a measurement flow path of an ultrasonic fluid measurement apparatus according to the eighth embodiment of the invention, and FIG. 16(B) is an enlarged view to show the relationship between the multilayer flow path member and an inner face of the measurement flow path. Parts common to those of the multilayer flow path members of the ultrasonic fluid measurement apparatus and the ultrasonic fluid measurement apparatus according to the fourth to seventh embodiments described above are denoted by the same reference numerals and will not be discussed again.

Figure 16:
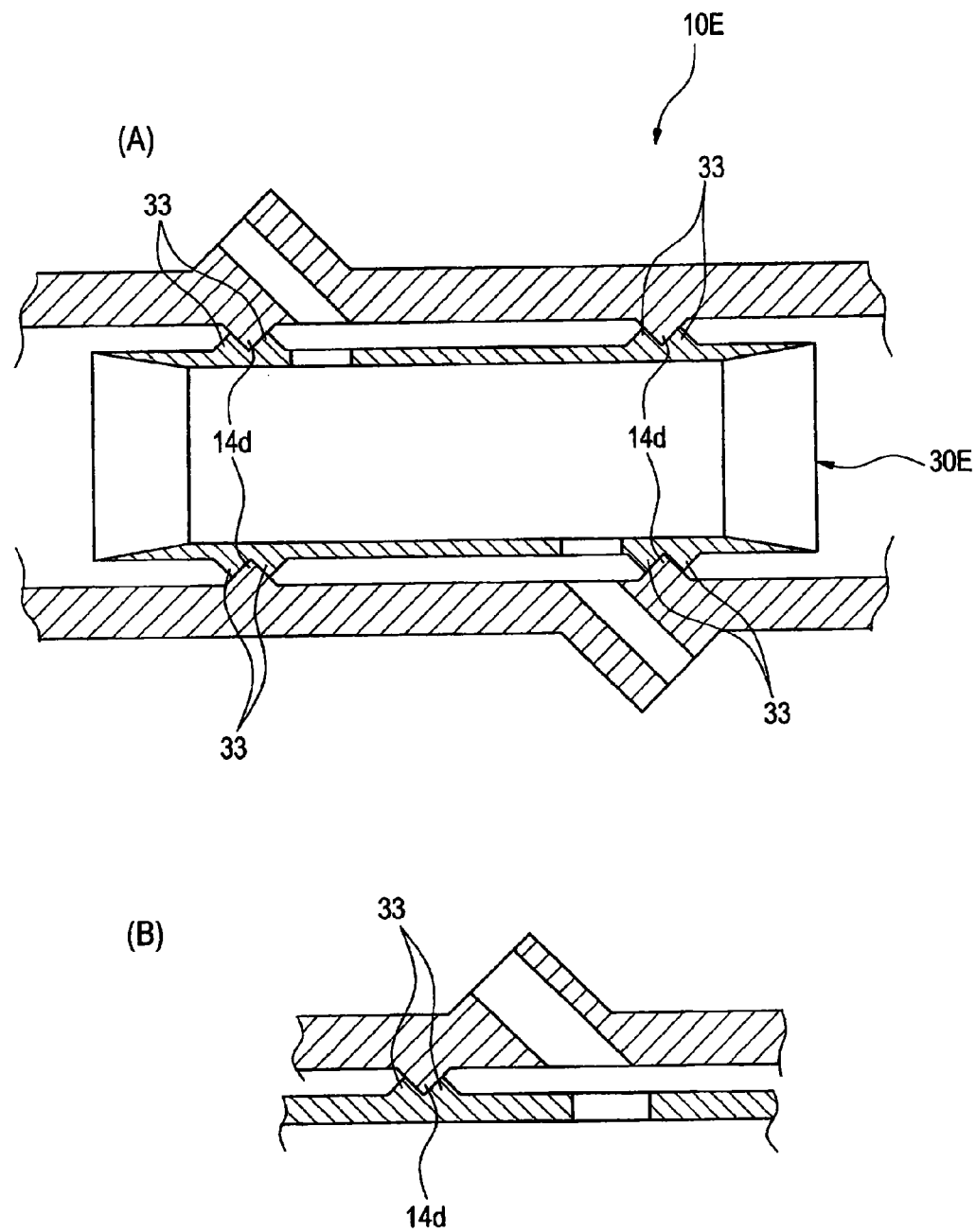
FIG. 16(A) is a plan view of a multilayer flow path member and a measurement flow path of an ultrasonic fluid measurement apparatus according to an eighth embodiment of the invention.
FIG. 16(B) is an enlarged view to show the relationship between the multilayer flow path member and an inner face of the measurement flow path.

As shown in FIG. 16, in a multilayer flow path member 30E of the ultrasonic fluid measurement apparatus according to the eighth embodiment, double-thread V-shaped convex parts 33 are provided continuously on an outer face 31a of a frame 31. On the other hand, single-thread V-shaped convex parts 14d are provided on inner faces 15a and 15b of a measurement flow path 14a in an ultrasonic fluid measurement apparatus 10E. If the multilayer flow path member 30E is fitted into the measurement flow path 14a, the V-shaped convex parts 14d on the measurement flow path 14a side are fitted into V-shaped concave parts each formed between the V-shaped convex parts 33 on the multilayer flow path member 30E side.

According to the multilayer flow path member of the eighth embodiment described above, advantages similar to those of the fourth embodiment described above can be provided. Since the V-shaped convex parts 14d on the measurement flow path 14a side are fitted into the V-shaped concave parts each formed between the V-shaped convex parts 33 on the multilayer flow path member 30E side, positioning of the multilayer flow path member 30E is facilitated.

The multilayer flow path member of the ultrasonic fluid measurement apparatus of the invention and the ultrasonic fluid measurement apparatus are not limited to those of the fourth to eighth embodiments described above and can be appropriately deformed, improved, etc.

For example, in the fourth to eighth embodiments described above, the V-shaped convex parts 33 of seal means, etc., are provided in the front end part and the rear end part of each frame 31 of the multilayer flow path member 30, but can also be provided either or two or more.

Ninth Embodiment

Next, a ninth embodiment of the invention will be discussed.

Figure 17:
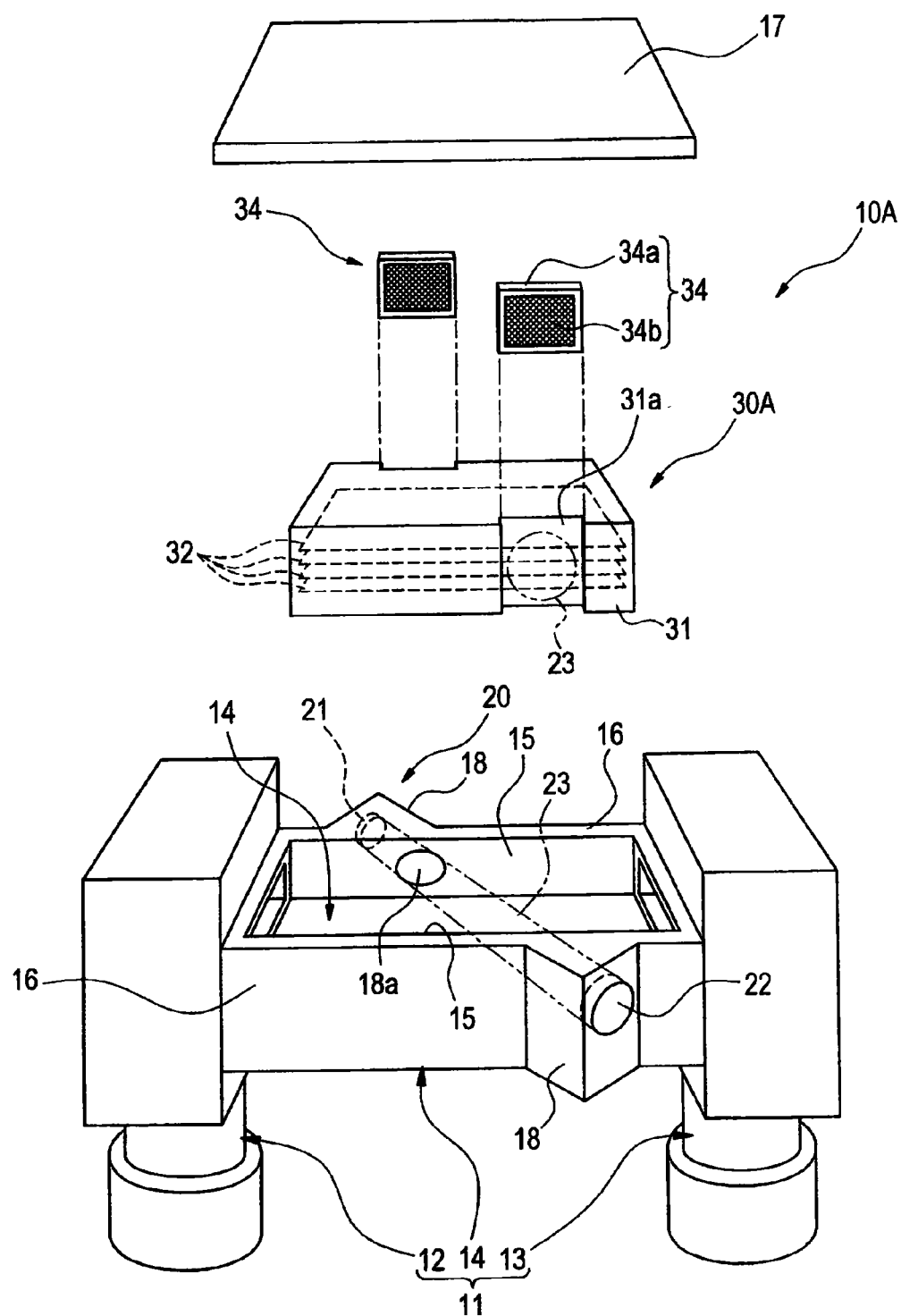
FIG. 17 is a perspective view of an ultrasonic fluid measurement apparatus and a multilayer flow path member according to a ninth embodiment of the invention.
Figure 18:
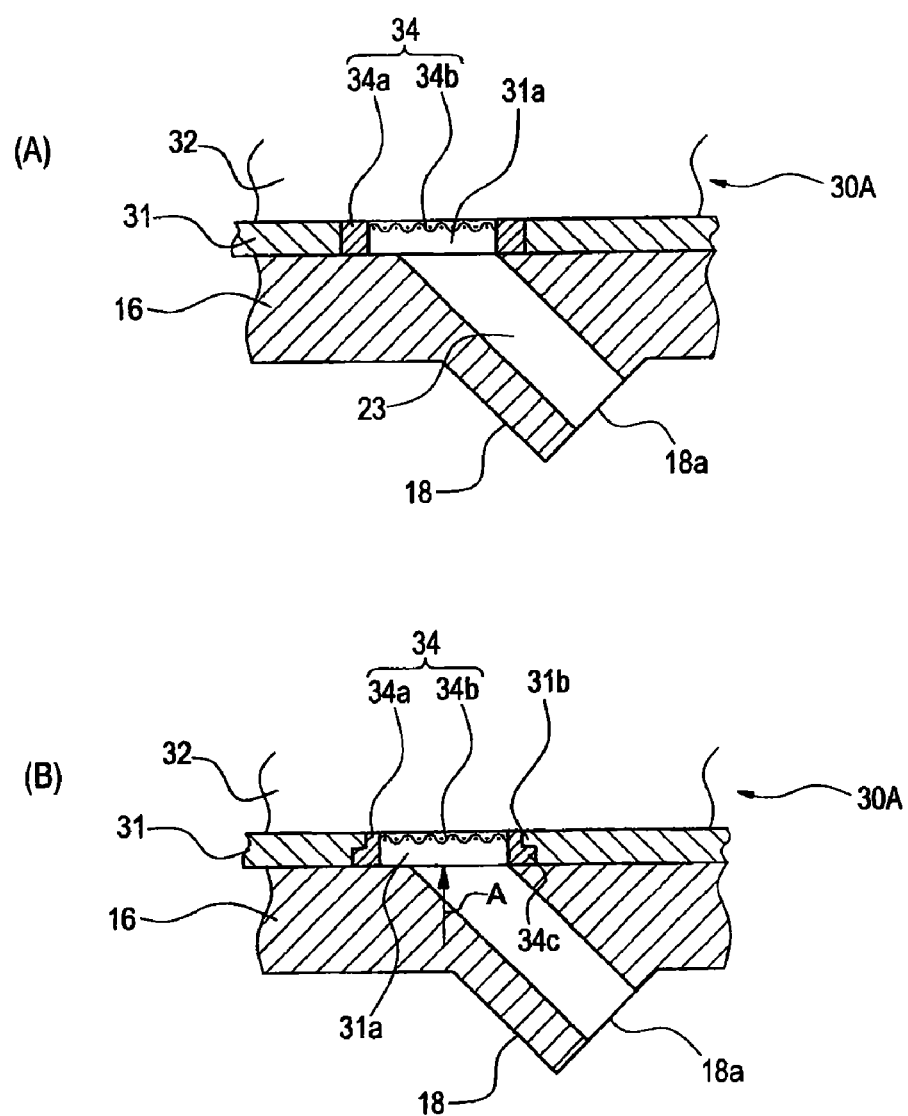
FIGS. 18(A) and (B) are enlarged sectional views of an attachment part of a filter member.

FIG. 17 is a perspective view of an ultrasonic fluid measurement apparatus and a multilayer flow path member according to the ninth embodiment of the invention, and FIGS. 18(A) and (B) are enlarged sectional views of an attachment part of a filter member.

As shown in FIG. 17, an ultrasonic fluid measurement apparatus 10A according to the ninth embodiment has a fluid path 11 formed roughly like an inverse U letter, made up of left and right vertical flow paths 12 and 13 and a horizontal flow path 14 joining the upper end parts of the left and right vertical flow paths 12 and 13. The horizontal flow path 14 has a measurement flow path 14a for measuring a fluid, and an ultrasonic measurement section 20 having a first transducer (here, a transmitter) 21 and a second transducer (here, a receiver) 22 is provided on a pair of opposed inner faces 15 and 15 in the measurement flow path 14a. Further, the measurement flow path 14a has a multilayer flow path member 30A for partitioning a fluid into a plurality of flat flow paths and a lid 17 for housing the multilayer flow path member 30A in the measurement flow path 14a and sealing. Therefore, if the lid 17 is put on the horizontal flow path 14, the measurement flow path 14a is formed like a rectangular cross-section pipe rectangular in cross section.

An ultrasonic propagation path 23 in a measurement direction connecting the first transducer 21 and the second transducer 22 is provided so as to cross slantingly the fluid flowing direction. Such a placement pattern having an angle relative to the flow where the first transducer 21 and the second transducer 22 are opposed to each other is called Z path (Z-path) or Z method and the Z path placement is illustrated in the ninth embodiment.

As shown in FIG. 17, the horizontal flow path 14 is provided on left and right side walls 16 and 16 with triangle-shaped transducer attachment parts 18 and 18 projecting to the outside. Both the transducer attachment parts 18 and 18 and the side walls 16 and 16 are provided with a through hole 18a, for example, shaped in a circle, piercing in the direction connecting both the transducer attachment parts 18 and 18, and the ultrasonic propagation path 23 is formed. The first transducer 21 is attached to one transducer attachment part 18 and the second transducer 22 is attached to the other transducer attachment part 18.

The multilayer flow path member 30A has partition plates 32 for partitioning the measurement flow path 14a into a plurality of flat flow paths and a frame 31 for supporting margins along the fluid flowing direction in the partition plates 32.

As shown in FIG. 18(A), the frame 31 of the multilayer flow path member 30A positioned in the ultrasonic propagation path 23 is provided with a through hole 31a for allowing an ultrasonic wave to pass through in a state in which the multilayer flow path member 30A is fitted into the measurement flow path 14a. A filter member 34 capable of allowing an ultrasonic wave to pass through although it blocks a fluid is attached to the through hole 31a. The filter member 34 includes a frame part 34a housed detachably in the through hole 31a and a filter part 34b made of fine mesh punching metal, etc., for example, supported on the frame part 34a.

As shown in FIGS. 17 and 18(A), the frame part 34a is rectangular, for example, and can be slid and inserted into the rectangular through hole 31a provided in the frame 31 from above the multilayer flow path member 30A. Alternatively, the frame part 34a may be fitted and attached from the front of the through hole 31a of the frame 31 (up and down direction in FIG. 18(A)). In this case, the through hole provided in the frame 31 can be formed, for example, as an oblong figure corresponding to the shape of the ultrasonic propagation path 23 and the frame part can be shaped corresponding to the through hole for direct attachment.

It is desirable that the filter part 34b should be placed along the inner face of each flat flow path, namely, the inner face of the frame 31. Accordingly, disturbing of the flow of a fluid can be prevented. It is also desirable that the filter part 34b should undergo water repellency treatment. Accordingly, a fluid striking the filter part 34b is repelled and clogging caused by a fluid is hard to occur, so that the measurement accuracy can be enhanced.

Here, the "water repellency" refers to the nature of "repelling water" rather than "preventing penetration of water" like waterproofing. As the water repellency treatment, for example, treatment of
1: generating plasma under atmospheric pressure and generating a water-repellent polymer on a material surface by polymerization
2: providing an ultrathin film of fluorine on a material surface
3: forming a nano-scale function membrane on the surface of a raw material by organic thin film treatment, etc., can be illustrated.

As shown in FIG. 18(B), it is desirable that the through hole 31a provided in the frame 31 should be provided with a step 31b and the frame part 34a should be provided with a step 34c that can be inserted into the step 31b of the frame 31. Accordingly, the filter member 34 can be reliably attached to the through hole 31a. In this case, to attach the filter member 34 directly to the through hole 31a of the frame 31, it is attached from the arrow A direction in FIG. 18(B).

According to the multilayer flow path member 30A of the ultrasonic fluid measurement apparatus 10A of the ninth embodiment described above, when the filter member 34 is attached to the through hole 31a of the multilayer flow path member 30A placed in the measurement flow path 14a shaped in a rectangular cross-section pipe of the ultrasonic fluid measurement apparatus 10A and partitioned into a plurality of flat flow paths by the partition plates 32, the filter part 34b is attached to the frame part 34a detachable at the through hole 31a position of the frame 31 of the multilayer flow path member 30A. Thus, the filter member 34 can be created separately from the multilayer flow path member 30A and can be attached, and creation of the filter member 34 and the multilayer flow path member 30A is facilitated.

Tenth Embodiment

Next, a tenth embodiment of the invention will be discussed.

Figure 19:
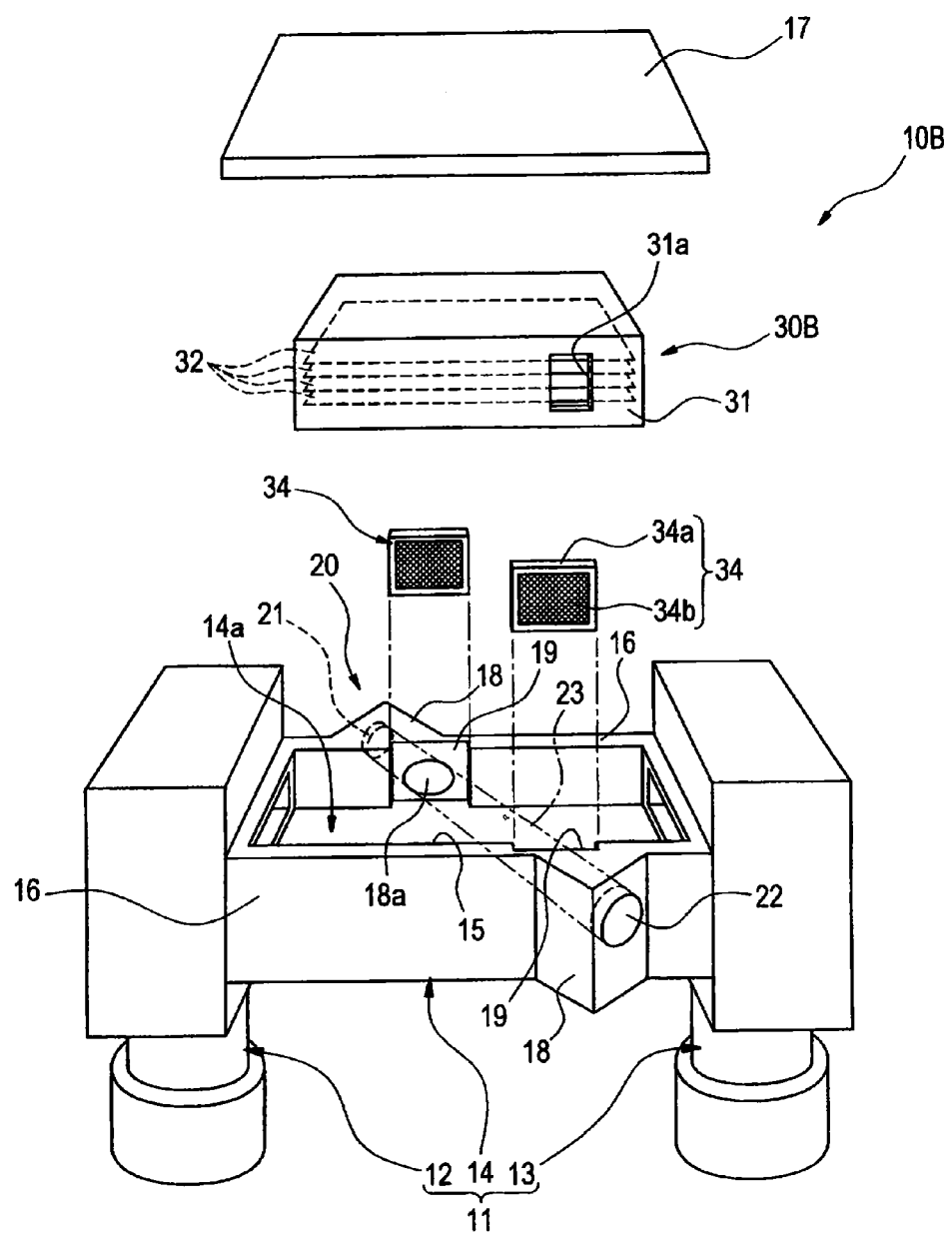
FIG. 19 is a perspective view of an ultrasonic fluid measurement apparatus and a multilayer flow path member according to a tenth embodiment of the invention.
Figure 20:
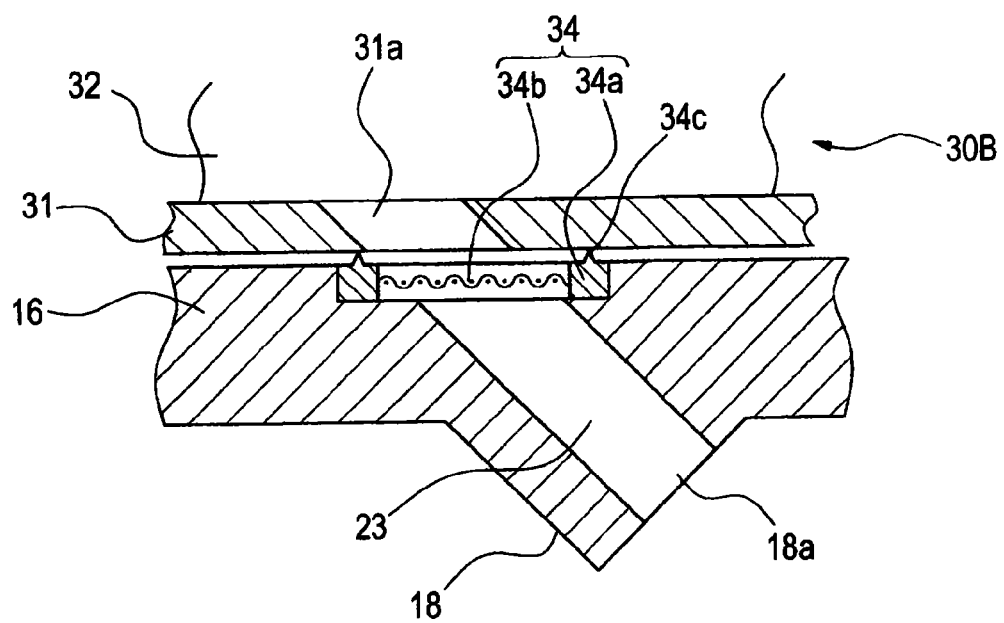
FIG. 20 is an enlarged sectional view of an attachment part of a filter member.
Figure 21:
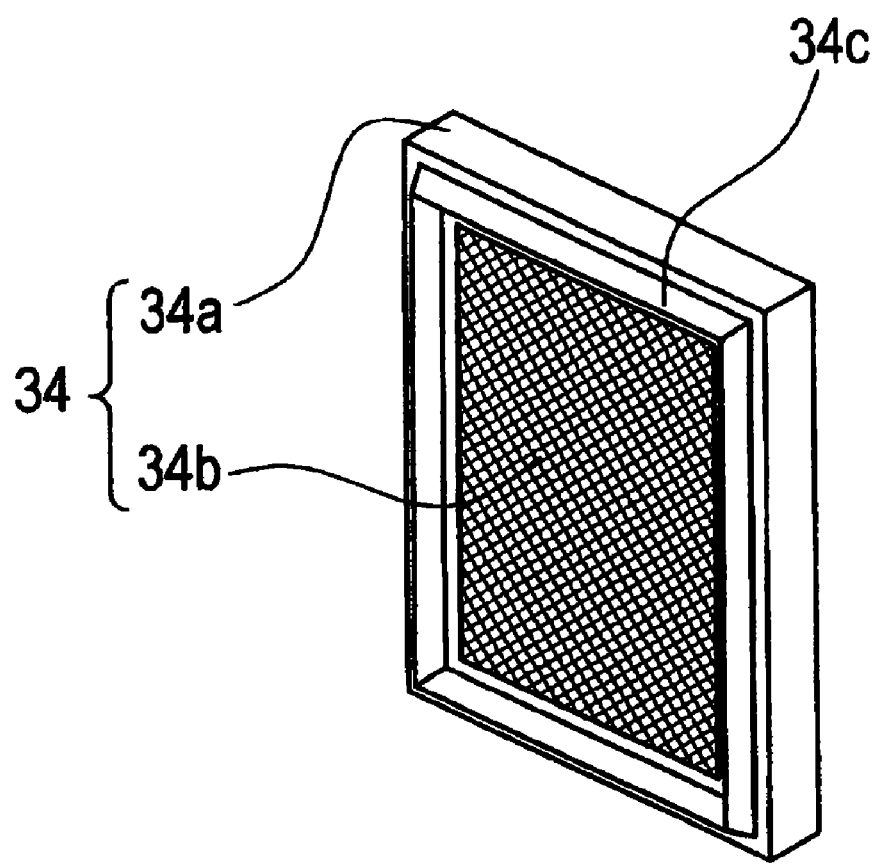
FIG. 21 is a perspective view of the filter member.

FIG. 19 is a perspective view of an ultrasonic fluid measurement apparatus and a multilayer flow path member according to the tenth embodiment of the invention, FIG. 20 is an enlarged sectional view of an attachment part of a filter member, and FIG. 21 is a perspective view of the filter member. Parts common to those of the ninth embodiment described above are denoted by the same reference numerals and will not be discussed again.

As shown in FIG. 19, in an ultrasonic fluid measurement apparatus 10B according to the tenth embodiment of the invention, housing concave parts 19 for attaching filter members 34 are provided at positions corresponding to an ultrasonic propagation path 23 in left and right inner faces 15 and 15 of a measurement flow path 14a, namely, ahead through holes 18a. Each of the housing concave parts 19 is rectangular and a rectangular frame part 34a of the filter member 34 can be inserted from the up and down direction. Alternatively, the filter member 34 can also be fitted from the front of the housing concave part 19.

On the other hand, a frame 31 of a multilayer flow path member 30B is provided with a rectangular through hole 31a at the position corresponding to the ultrasonic propagation path 23 when attached into the measurement flow path 14a. The through hole 31a can also be formed as an oblong figure corresponding to the ultrasonic propagation path 23.

Either of the frame 31 and the frame part 34a of the filter member 34 is provided with a rib 34c projecting toward the other. For example, as shown in FIG. 20, on the side facing the measurement flow path 14a in the frame part 34a, namely, on the face opposed to the frame 31, the rib 34c can be provided projecting so as to surround a filter part 34b. The rib 34c is of a size to allow the tip of the rib 34c to abut the outer side face of the frame 31 of the multilayer flow path member 30B when the filter member 34 is attached to the housing concave part 19 and the multilayer flow path member 30B is fitted into the measurement flow path 14a.

Accordingly, the rib 34c is provided between the frame 31 of the multilayer flow path member 30B and the frame part 34a of the filter member 34 and the filter part 34b is surrounded by the rib 34c, so that a fluid can be reliably prevented from splashing on the filter part 34b at the measuring time.

It is desirable that the rib 34c should be formed of soft resin, rubber, etc., so that it easily becomes deformed. Although the case where the frame part 34a of the filter member 34 is provided with the rib 34c has been described in FIGS. 20 and 21, the rib can also be provided on the inner face 15 of the measurement flow path 14a of the ultrasonic fluid measurement apparatus 10B. In this case, the filter part 34b is completely contained in the rib.

According to the multilayer flow path member 30B of the ultrasonic fluid measurement apparatus and the ultrasonic fluid measurement apparatus 10B according to the tenth embodiment of the invention described above, each housing concave part 19 is provided on each inner face 15 of the measurement flow path 14a and the filter part 34b for allowing an ultrasonic wave to pass through is attached to the frame part 34a that can be housed in the housing concave part 19, so that the filter member 34 can be created separately from the ultrasonic fluid measurement apparatus 10B and can be attached, and creation of the filter member 34, the multilayer flow path member 30B, and the ultrasonic fluid measurement apparatus 10B is facilitated.

Eleventh Embodiment

Next, an eleventh embodiment of the invention will be discussed.

Figure 22:
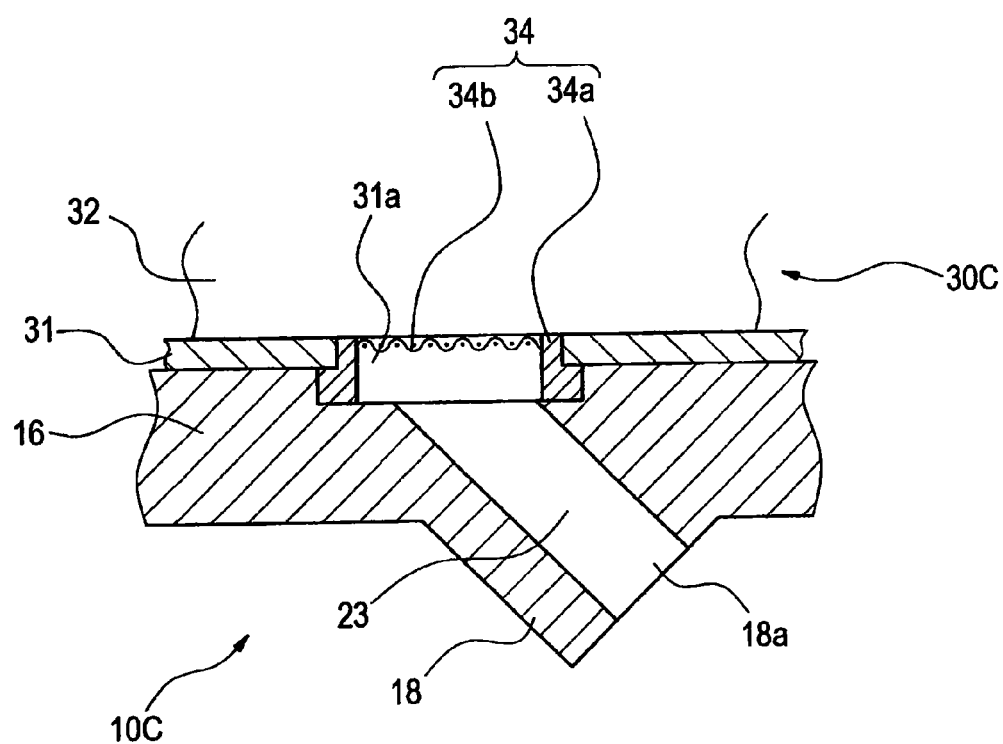
FIG. 22 is an enlarged sectional view of an attachment part of a filter member according to an eleventh embodiment of the invention.
Figure 23:
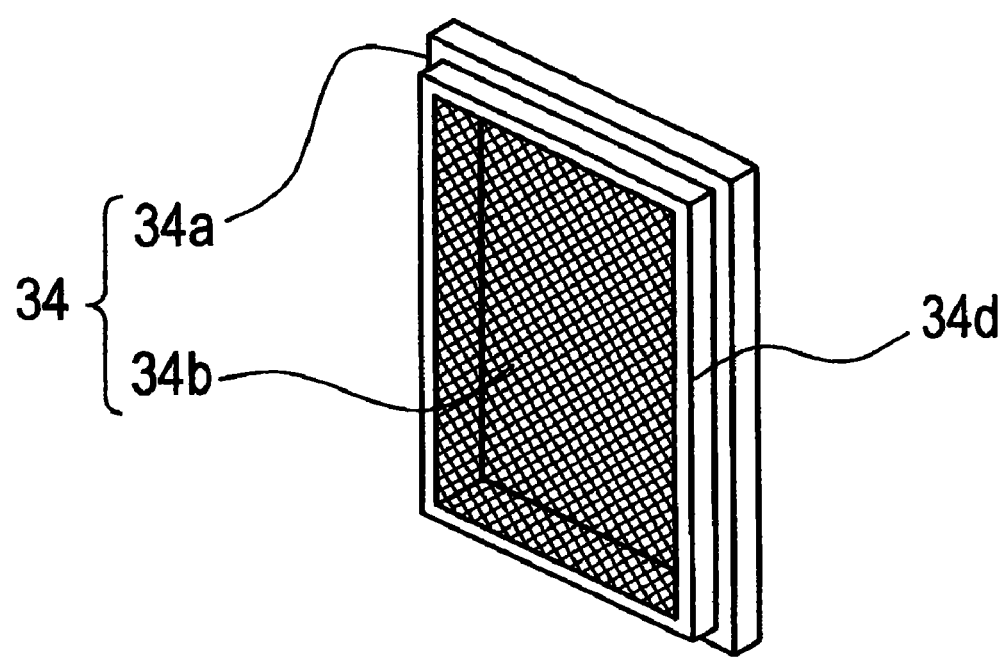
FIG. 23 is a perspective view of the filter member.

FIG. 22 is an enlarged sectional view of an attachment part of a filter member according to the eleventh embodiment of the invention, and FIG. 23 is a perspective view of the filter member. Parts common to those of the ninth or tenth embodiment described above are denoted by the same reference numerals and will not be discussed again.

As shown in FIG. 22, in an ultrasonic fluid measurement apparatus 10C and a multilayer flow path member 30C according to the eleventh embodiment of the invention, a frame part 34a of a filter member 34 attached to a housing concave part 19 of a measurement flow path 14a has a step shape (step part 34d) that can be inserted into a through hole 31a provided in a frame 31. The step part 34d has an outer periphery of a size smaller than that of the frame part 34a and is provided projecting from the surface of the frame part 34a.

In the filter member 34 shown in FIGS. 22 and 23, the case where the frame part 34a is housed in the housing concave part 19 provided on the inner face of the measurement flow path 14a and the step part 34d is fitted into the through hole 31a provided in the frame 31 of the multilayer flow path member 30C has been shown. Therefore, a filter part 34b is provided inside the step part 34d and is placed along the inner face of the frame 31, the inner face of a flat flow path. It is also possible to house the step part 34d in the housing concave part 19 provided on the inner face of the measurement flow path 14a and fit the frame part 34a into the through hole 31a provided in the frame 31 of the multilayer flow path member 30C. In this case, it is desirable that the filter part 34b should be provided in the outer end part of the frame part 34a. It is made possible to insert the filter member 34 into at least either of the housing concave part 19a and the through hole 31 of the frame 31 by sliding from the up and down direction, whereby it is made possible to attach the filter member.

According to the multilayer flow path member 30C of the ultrasonic fluid measurement apparatus and the ultrasonic fluid measurement apparatus 10C according to the eleventh embodiment of the invention described above, the filter member 34 is fitted into both of the housing concave part 19 provided in the ultrasonic fluid measurement apparatus 10C and the through hole 31a provided in the frame 31 of the multilayer flow path member 30C, so that a fluid can be reliably prevented from splashing on the filter part 34b. Positioning of the multilayer flow path member 30C in the measurement flow path 14a can be performed reliably.

Twelfth Embodiment

Next, a twelfth embodiment of the invention will be discussed.

Figure 24:
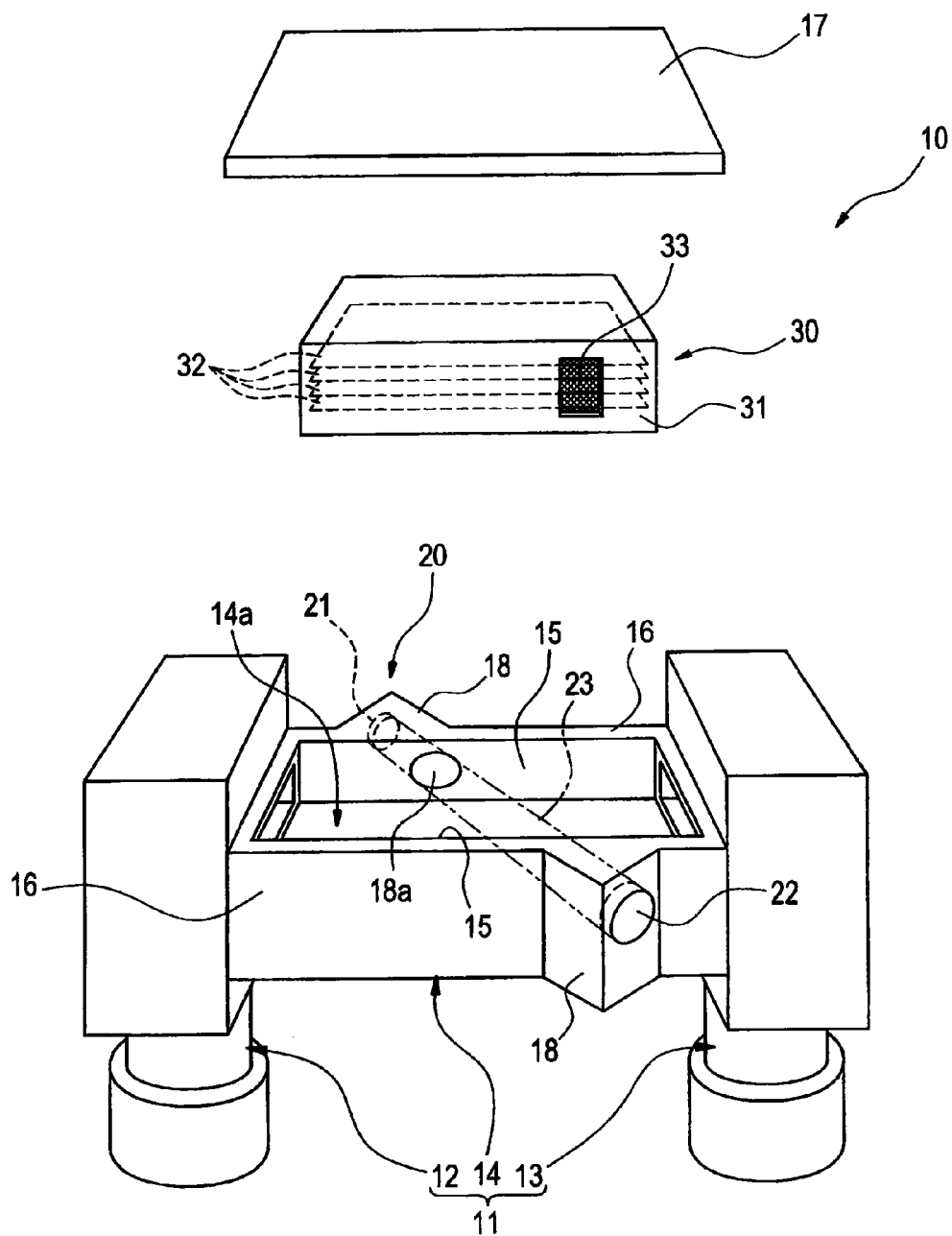
FIG. 24 is a perspective view of an ultrasonic fluid measurement apparatus and a multilayer flow path member according to a twelfth embodiment of the invention.
Figure 25:
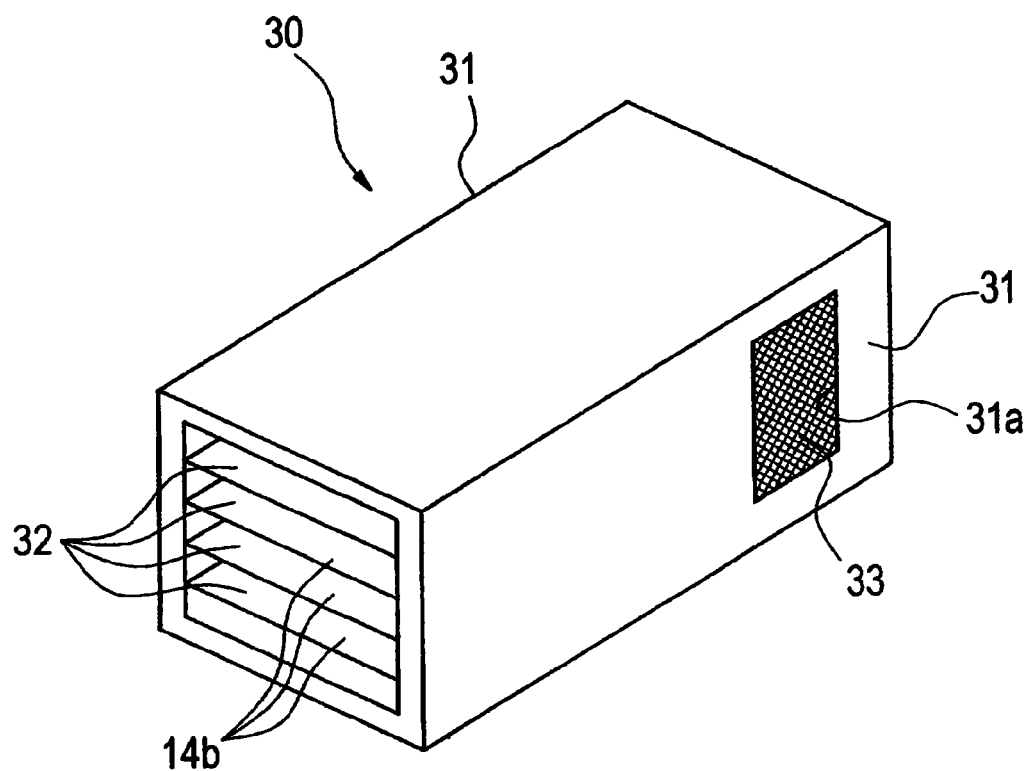
FIG. 25 is a perspective view of the multilayer flow path member.
Figure 26:
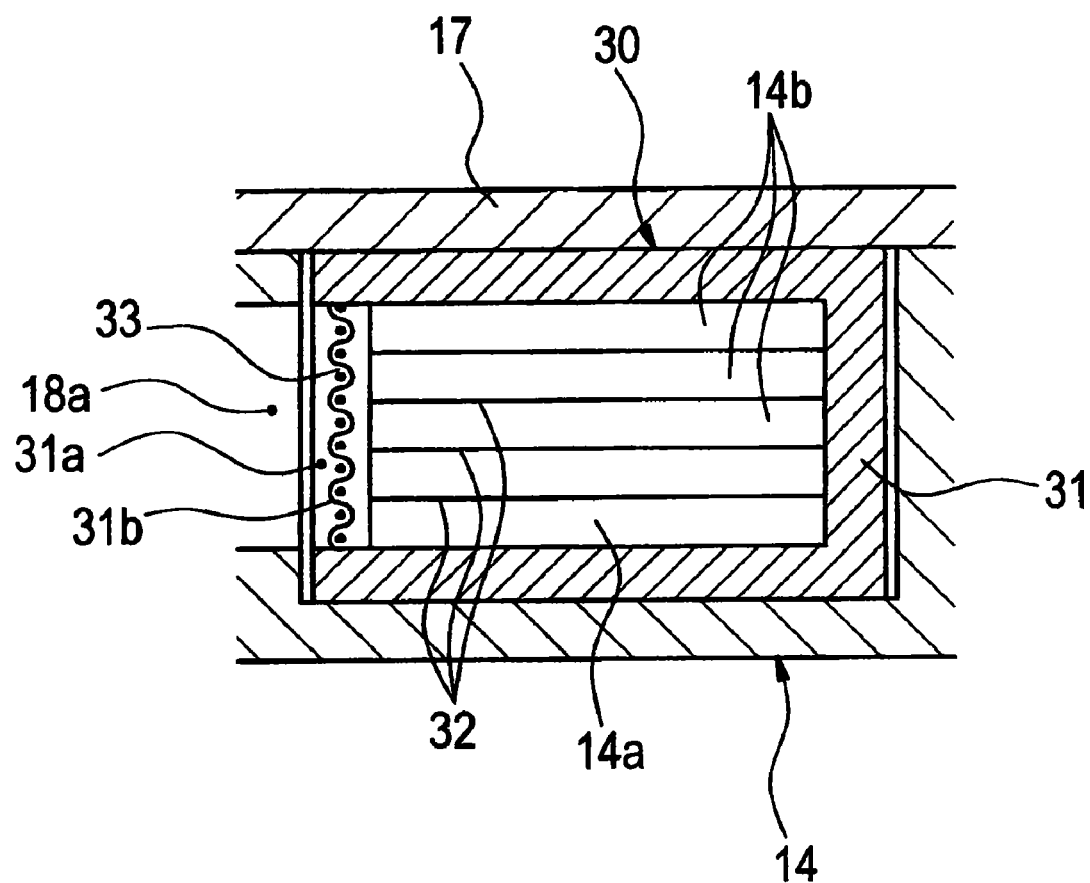
FIG. 26 is a sectional view of the multilayer flow path member at a filter member attachment position.
Figure 27:
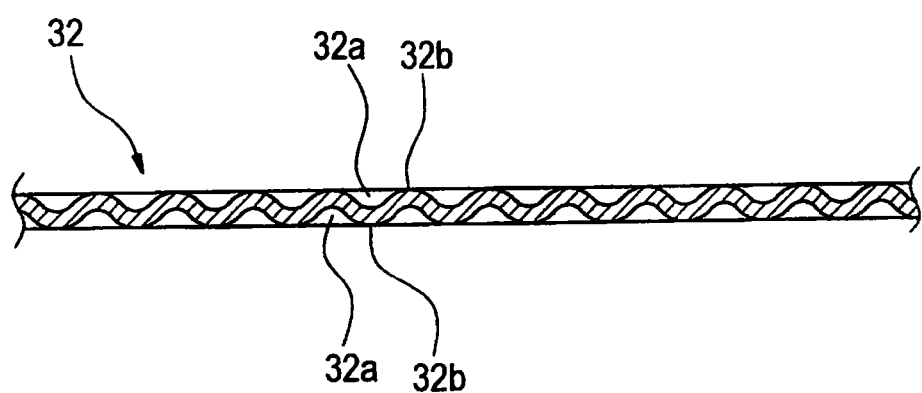
FIG. 27(A) is a sectional view of a partition plate and FIG. 27(B) is a perspective view of the partition plate.
Figure 27:
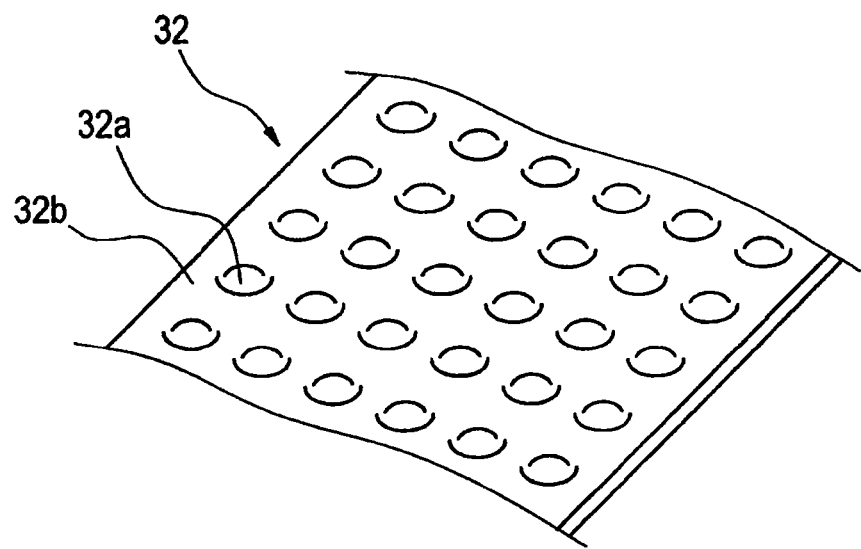

FIG. 24 is a perspective view of an ultrasonic fluid measurement apparatus and a multilayer flow path member according to the twelfth embodiment of the invention, FIG. 25 is a perspective view of the multilayer flow path member, FIG. 26 is a sectional view of the multilayer flow path member at a filter member attachment position, FIG. 27(A) is a sectional view of a partition plate, and FIG. 27(B) is a perspective view of the partition plate.

As shown in FIG. 24, an ultrasonic fluid measurement apparatus 10 according to the twelfth embodiment has a fluid path 11 formed roughly like an inverse U letter, made up of left and right vertical flow paths 12 and 13 and a horizontal flow path 14 joining the upper end parts of the left and right vertical flow paths 12 and 13. The horizontal flow path 14 has a measurement flow path 14a for measuring a fluid, and an ultrasonic measurement section 20 having a first transducer (here, a transmitter) 21 and a second transducer (here, a receiver) 22 is provided on a pair of opposed inner faces 15 and 15 in the measurement flow path 14a. Further, the measurement flow path 14a has a multilayer flow path member 30 for partitioning a fluid into a plurality of flat flow paths and a lid 17 for housing the multilayer flow path member 30 in the measurement flow path 14a and sealing. Therefore, if the lid 17 is put on the horizontal flow path 14, the measurement flow path 14a is formed like a rectangular cross-section pipe rectangular in cross section.

An ultrasonic propagation path 23 in a measurement direction connecting the first transducer 21 and the second transducer 22 is provided so as to cross slantingly the fluid flowing direction. Such a placement pattern having an angle relative to the flow where the first transducer 21 and the second transducer 22 are opposed to each other is called Z path (Z-path) or Z method and the Z path placement is illustrated in the twelfth embodiment.

As shown in FIG. 24, the horizontal flow path 14 is provided on left and right side walls 16 and 16 with triangle-shaped transducer attachment parts 18 and 18 projecting to the outside. Both the transducer attachment parts 18 and 18 and the side walls 16 and 16 are provided with a through hole 18a, for example, shaped in a circle, piercing in the direction connecting both the transducer attachment parts 18 and 18, and the ultrasonic propagation path 23 is formed. The first transducer 21 is attached to one transducer attachment part 18 and the second transducer 22 is attached to the other transducer attachment part 18.

As shown in FIGS. 25 and 26, each of the frames 31 of the multilayer flow path member 30 positioned in the ultrasonic propagation path 23 is provided with a through hole 31a for allowing an ultrasonic wave to pass through in a state in which the multilayer flow path member 30 is fitted into the measurement flow path 14a. A filter member 33 of fine mesh punching metal, etc., for example, capable of allowing an ultrasonic wave to pass through although it blocks a fluid is attached to the notch 31a; the filter member 33 undergoes water repellency treatment. Thus, a fluid striking the filter member 33 is repelled and clogging caused by a fluid is hard to occur, so that the measurement accuracy can be enhanced.

Here, the "water repellency" refers to the nature of "repelling water" rather than "preventing penetration of water" like waterproofing. As the water repellency treatment, for example, treatment of 1: generating plasma under atmospheric pressure and generating a water-repellent polymer on a material surface by polymerization
   2: providing an ultrathin film of fluorine on a material surface
   3: forming a nano-scale function membrane on the surface of a raw material by organic thin film treatment, etc., can be illustrated.

As shown in FIG. 25, the multilayer flow path member 30 has partition plates 32 for partitioning the measurement flow path 14a into a plurality of flat flow paths 14b and the frames 31 for supporting margins along the fluid flowing direction in the partition plates 32. That is, as shown in FIG. 26, the frames 31 are placed along the left and right inner faces 15 and 15 of the horizontal flow path 14 and the partition plates 32 are supported horizontally between both the frames 31 and 31. It is desirable that the partition plates 32 should be set so that the cross-sectional areas of the flat flow paths 14b partitioned by the partition plates 32 become uniform. It is also desirable that the partition plates 32 should be placed so as to become roughly parallel with respect to the ultrasonic propagation path 23 connecting the first transducer 21 and the second transducer 22.

As shown in FIGS. 27(A) and (B), the surface of the partition plate 32 (preferably, both upper and lower faces) undergoes surface treatment for producing regular convexoconcave (concave parts 32a and convex parts 32b). As the surface treatment for producing regular convexoconcave, for example, dimple process, satin process, sand blasting process, shot blast process, scraping process, etc., can be illustrated.

According to the multilayer flow path member 30 of the ultrasonic fluid measurement apparatus 10 of the twelfth embodiment described above, the surface treatment is provided for producing the regular concave parts 32a and convex parts 32b on the surface of each of the partition plates 32 of the multilayer flow path member 30 for partitioning the measurement flow path 14a shaped in a rectangular cross-section pipe, formed in the ultrasonic fluid measurement apparatus 10 into a plurality of flat flow paths 14b, so that an irregular turbulent flow caused by irregular convexoconcave of the surface of each partition plate occurring in the conventional multilayer flow path member can be suppressed and the measurement accuracy can be enhanced.

Thirteenth Embodiment

Next, a thirteenth embodiment of the invention will be discussed.

Figure 28:
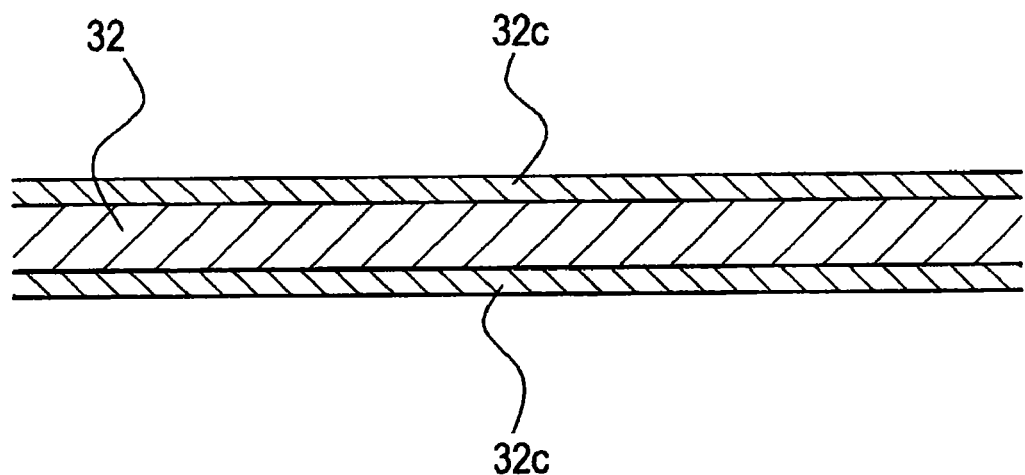
FIG. 28 is a sectional view of a partition plate of a multilayer flow path member of an ultrasonic fluid measurement apparatus according to a thirteenth embodiment.

FIG. 28 is a sectional view to show a partition plate of a multilayer flow path member according to the thirteenth embodiment. Parts common to those of the twelfth embodiment described above are denoted by the same reference numerals and will not be discussed again.

As shown in FIG. 28, the surface of a partition plate 32 (preferably, both upper and lower faces) is provided with a coating layer 32c having regular convexoconcave on a surface by painting. As the coating layer 32c, ceramic-based material, fluororesin, etc., can also be used. Specifically, to use ceramic-based material, the partition plate 32 is provided with the coating layer 32c by a plasma spray method, an anodic oxidation method, PVD (physical vapor deposition), etc., using ceramic based on alumina, silica, titania, zirconia, etc. To use fluororesin, the partition plate 32 is provided with the coating layer 32c by an air gun painting method, a fluidized-bed coating method, an electrostatic paining method, etc., using PTFE (polytetrafluoroethylene), etc.

According to the multilayer flow path member of the ultrasonic fluid measurement apparatus according to the thirteenth embodiment described above, variations in flow rate area where a turbulent flow is caused by irregular convexoconcave of the surface of each partition plate between measurement flow paths can be suppressed and the measurement accuracy can be enhanced as with the multilayer flow path member of the ultrasonic fluid measurement apparatus according to the twelfth embodiment described above.

Fourteenth Embodiment

Next, a fourteenth embodiment of the invention will be discussed.

Figure 29:
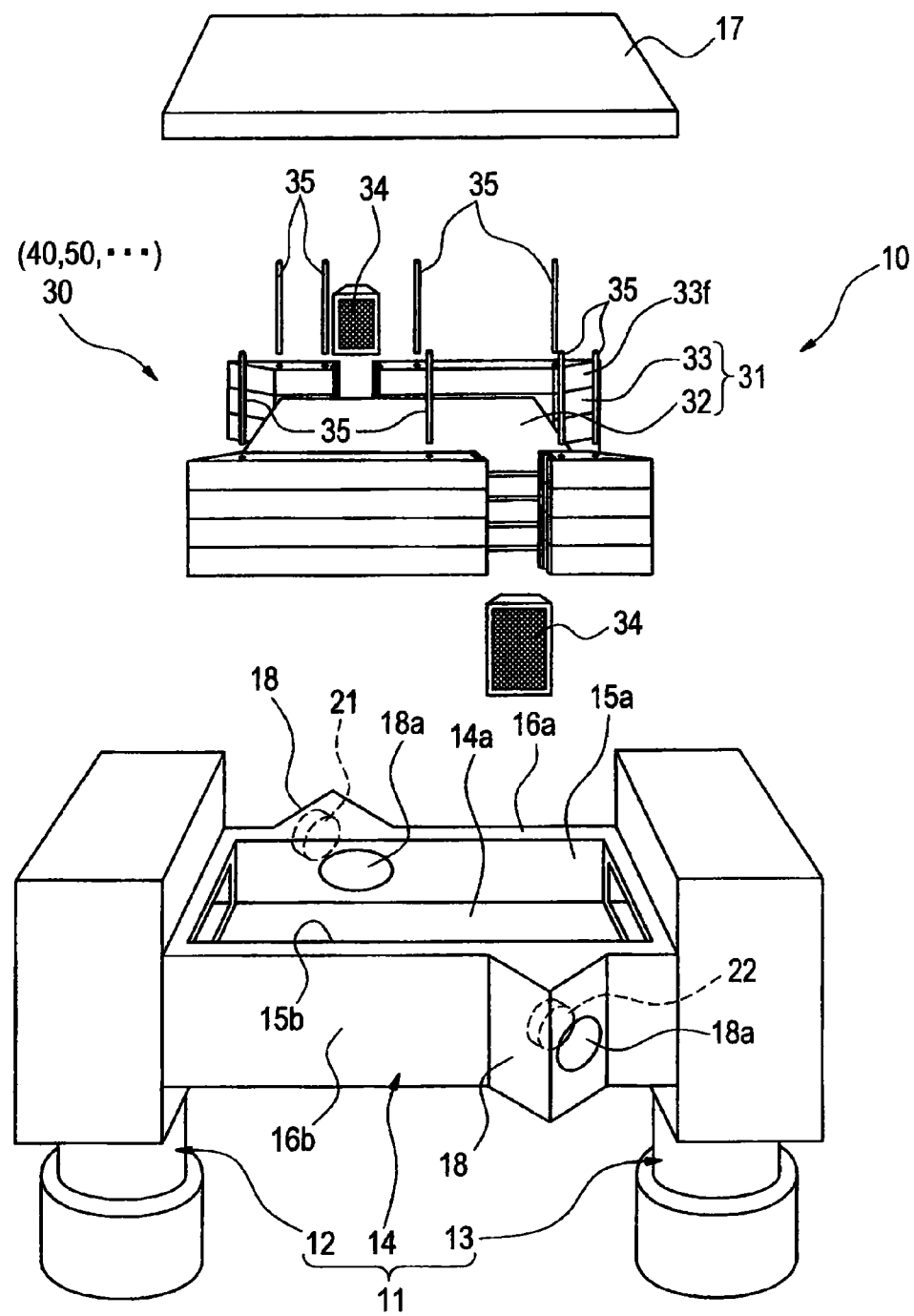
FIG. 29 is an exploded perspective view to show an ultrasonic fluid measurement apparatus that can use a multilayer flow path member of the ultrasonic fluid measurement apparatus according to a fourteenth embodiment of the invention.
Figure 30:
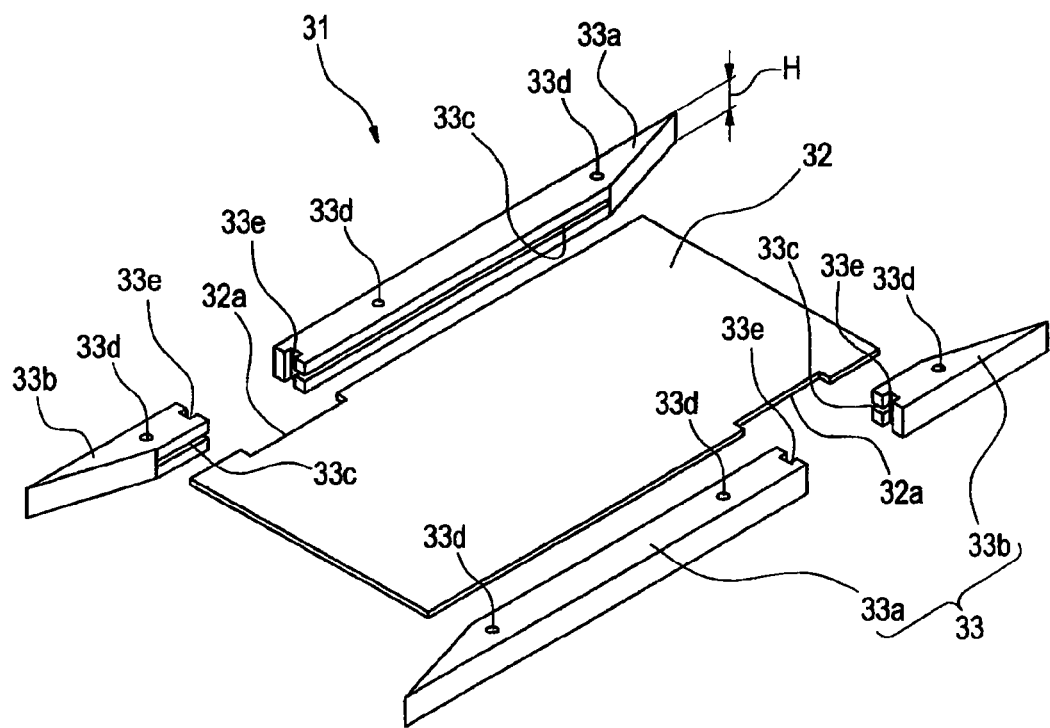
FIG. 30 is an exploded perspective view of one of partition members forming the multilayer flow path member of the ultrasonic fluid measurement apparatus according to the fourteenth embodiment of the invention.
Figure 31:
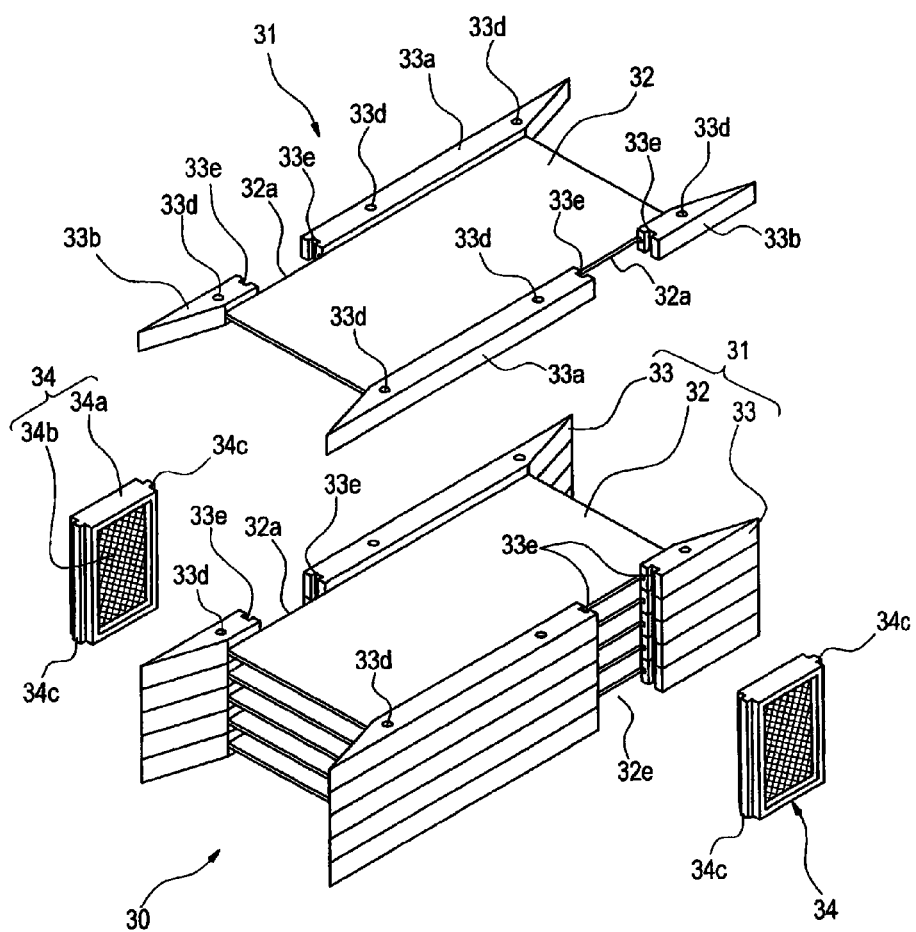
FIG. 31 is a perspective view to show a state in which the partition members are stacked to form the multilayer flow path member.
Figure 32:
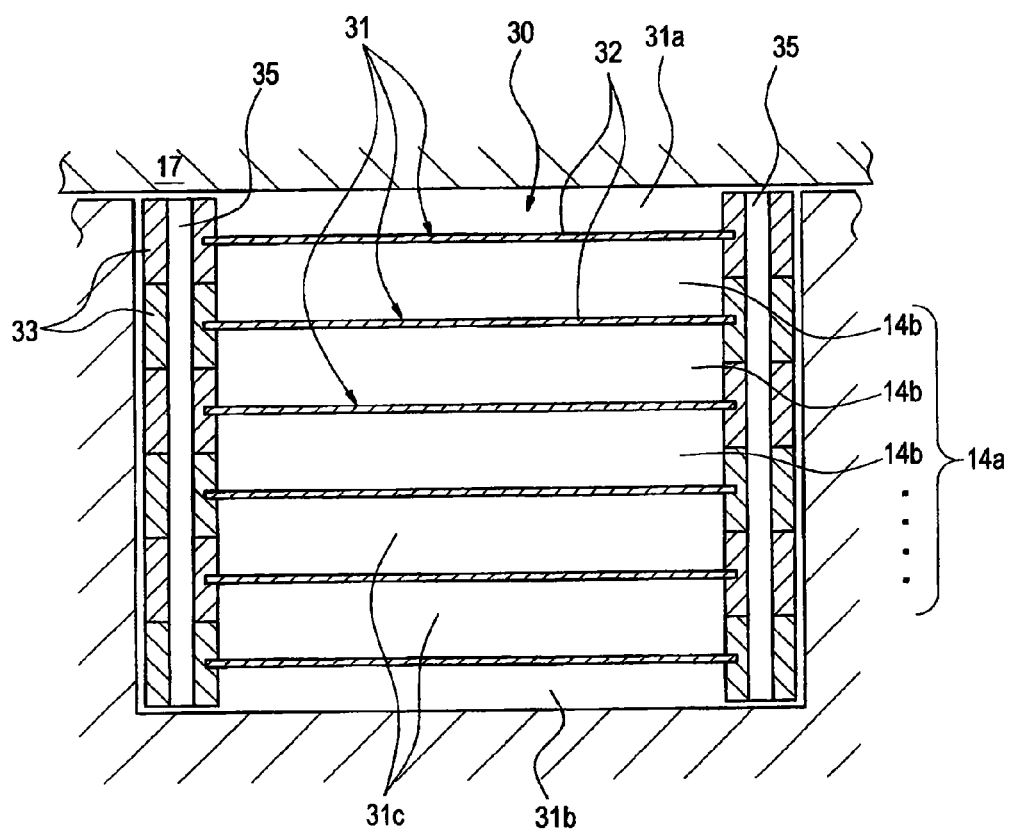
FIG. 32 is a front view of the multilayer flow path member.

FIG. 29 is an exploded perspective view to show an ultrasonic fluid measurement apparatus that can use a multilayer flow path member of the ultrasonic fluid measurement apparatus according to the fourteenth embodiment of the invention, FIG. 30 is an exploded perspective view of one of partition members forming the multilayer flow path member of the ultrasonic fluid measurement apparatus according to the fourteenth embodiment of the invention, FIG. 31 is a perspective view to show a state in which the partition members are stacked to form the multilayer flow path member, and FIG. 32 is a front view of the multilayer flow path member.

As shown in FIG. 29, an ultrasonic fluid measurement apparatus 10 according to the first embodiment has a fluid path 11 formed roughly like an inverse U letter, made up of left and right vertical flow paths 12 and 13 and a horizontal flow path 14 joining the upper end parts of the left and right vertical flow paths 12 and 13. The horizontal flow path 14 has a measurement flow path 14a for measuring a fluid, and an ultrasonic measurement section 20 having a first transducer (here, a transmitter) 21 and a second transducer (here, a receiver) 22 is provided on a pair of opposed inner faces 15a and 15b in the measurement flow path 14a. Further, the measurement flow path 14a has a multilayer flow path member 30 for partitioning a fluid into a plurality of flat flow paths and a lid 17 for housing the multilayer flow path member 30 in the measurement flow path 14a and sealing. Therefore, if the lid 17 is put on the horizontal flow path 14, the measurement flow path 14a is formed like a rectangular cross-section pipe rectangular in cross section.

An ultrasonic propagation path 23 in a measurement direction connecting the first transducer 21 and the second transducer 22 is provided so as to cross slantingly the fluid flowing direction. Such a placement pattern having an angle relative to the flow where the first transducer 21 and the second transducer 22 are opposed to each other is called Z path (Z-path) or Z method and the Z path placement is illustrated in the fourteenth embodiment.

As shown in FIG. 29, the horizontal flow path 14 is provided on side walls 16a and 16b with triangle-shaped transducer attachment parts 18 and 18 projecting to the outside. Both the transducer attachment parts 18 and 18 and the side walls 16a and 16b are provided with a through hole 18a, for example, shaped in a circle, piercing in the direction connecting both the transducer attachment parts 18 and 18, and the ultrasonic propagation path 23 is formed. The first transducer 21 is attached to one transducer attachment part 18 and the second transducer 22 is attached to the other transducer attachment part 18.

As shown in FIG. 30, the multilayer flow path member 30 according to the fourteenth embodiment of the invention has partition plates 32 placed in the measurement flow path 14a shaped in a rectangular cross-section pipe, formed in the ultrasonic fluid measurement apparatus 10 described above for partitioning the measurement flow path 14a into a plurality of flat flow paths 14b. It has partition members 31 each including support parts 33 for supporting margins along the fluid flowing direction in the partition plate 32 and rising in the thickness direction of the partition plate 32; the partition members 31 are stacked, thereby forming the multilayer flow path member 30 as shown in FIG. 3.

As shown in FIGS. 30 and 31, the partition plate 32 is a rectangular plate member and is provided with a rectangular notch 32a on each of both left and right sides. The support part 33 is a square member rectangular in cross section and having a predetermined height H and is made up of a long member 33a and a short member 33b matched with both side margins sandwiching the notch 32a of the partition plate 32. Opposed end faces of the long member 33a and the short member 33b are formed each with a filter groove 33e in the up and down direction. The support part 33 is formed on an inner side face with a fit groove 33c along its entire length and both margin end parts of the partition plate 32 are fitted into the fit groove 33c, thereby clamping the partition plate 32 in the thickness direction. The support part 33 is provided with a plurality of through holes 33d piercing in the up and down direction at predetermined positions. The partition plate 32 and the support part 33 can be formed of metal or resin.

A filter 34 has a frame-shaped frame body 34a and a filter member 34b attached to the frame body 34a, the filter member of mesh, punching metal, etc., for example, capable of allowing an ultrasonic wave to pass through although it blocks a fluid to be measured. The frame body 34a is provided on each longitudinal side with an engagement projection 34c in the up and down direction that can be inserted into the filter groove 33e provided in the support part 34 of the partition member 31. It is desirable that the filter member 34b should undergo water repellency treatment. Accordingly, a fluid striking the filter member 34b is repelled and clogging caused by a fluid is hard to occur, so that the measurement accuracy can be enhanced.

Here, the "water repellency" refers to the nature of "repelling water" rather than "preventing penetration of water" like waterproofing. As the water repellency treatment, for example, treatment of 1: generating plasma under atmospheric pressure and generating a water-repellent polymer on a material surface by polymerization
2: providing an ultrathin film of fluorine on a material surface
3: forming a nano-scale function membrane on the surface of a raw material by organic thin film treatment, etc., can be illustrated.

Therefore, as shown in FIGS. 29 and 32, to form the multilayer flow path member 30, first both margin end parts of each of the partition plates 32 are inserted into the fit groove 33c of the support part 33 to form each of the partition members 31. Then, the support parts 33 of the partition members 31 are stacked in the up and down direction to form the multilayer flow path member 30. At this time, it is desirable that joint pins 35 should be inserted into the through holes 33d of the support parts 33 for reliably positioning and unifying. Each filter 34 is inserted between the long member 33a and the short member 33b in the support part 33 from above and is attached. Accordingly, the multilayer flow path member 30B is formed.

As shown in FIG. 32, in the multilayer flow path member 30, the height of each of flow paths at a highest stage 31a and at a lowest stage 31b differs from the height of any other center flow path 31c. Therefore, to match the height of each of the highest stage 31a and the lowest stage 31b with the height of the center part, a spacing adjustment support part 33f having no partition plate 32 (see FIG. 29) needs to be provided above the support parts 33 of the highest stage 31a and below the support parts 33 of the lowest stage 31b.

In the multilayer flow path member 30 of the ultrasonic fluid measurement apparatus according to the fourteenth embodiment of the invention described above, to provide the partition plates 32 for partitioning the measurement flow path 14a shaped in a rectangular cross-section pipe, formed in the ultrasonic fluid measurement apparatus 10 into the flat flow paths 14b, the partition members 31 each supporting the margin of each partition plate 32 and having a height in the thickness direction of the partition plate 32 are placed, so that partition plates 32 can be held with a predetermined spacing. Since the spacing of the partition plate 32 is determined by the height of the partition member 31, the spacing of the partition plate 32 can be adjusted for adjusting the height of each flat flow path 14b. Thus, rich general versatility can be provided and the cost can be reduced.

In the partition member 31 described above, the partition plate 32 and the support parts 33 are formed as separate bodies, but can also be formed in one piece by insert molding.

Fifteenth Embodiment

Next, a fifteenth embodiment of the invention will be discussed.

Figure 33:
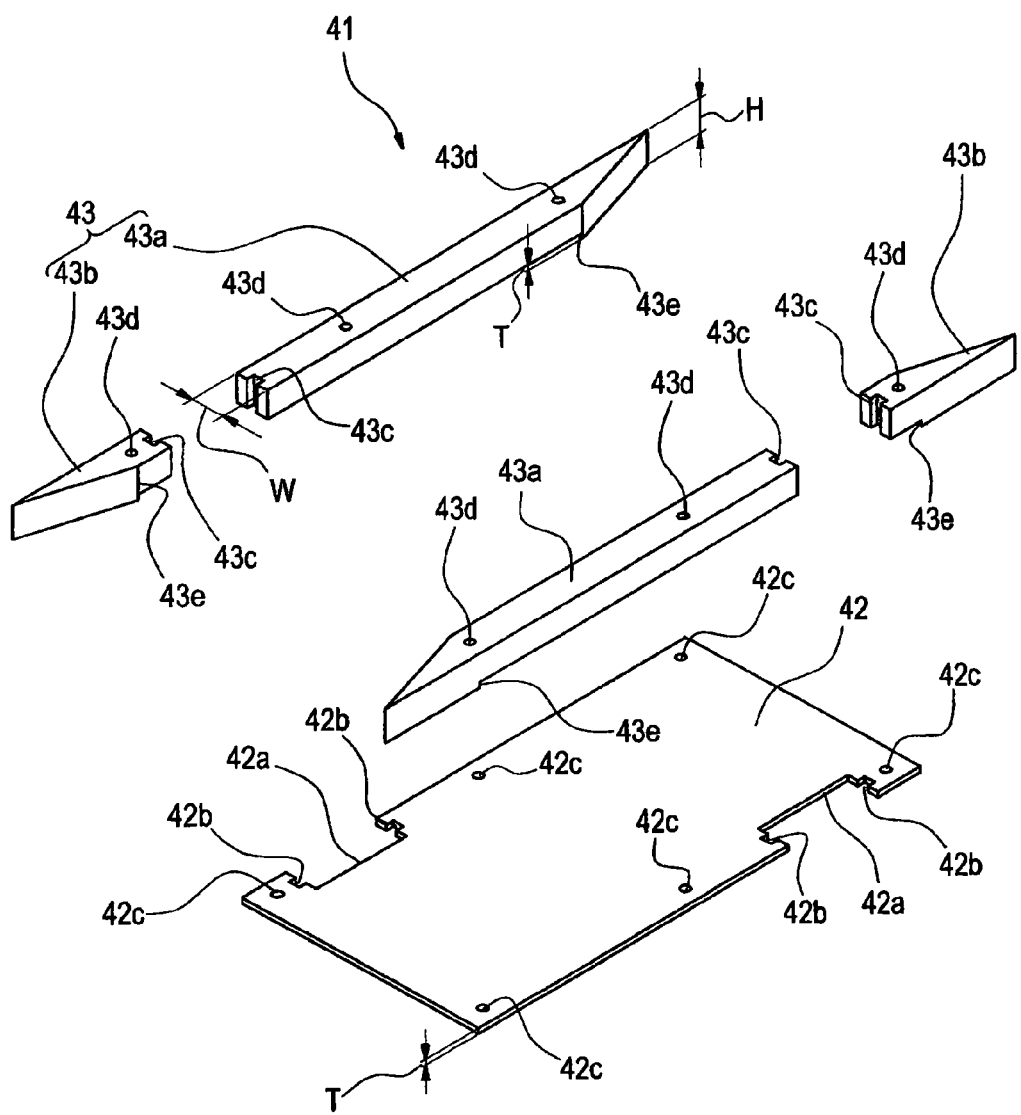
FIG. 33 is an exploded perspective view of one of partition members forming a multilayer flow path member of an ultrasonic fluid measurement apparatus according to a fifteenth embodiment of the invention.
Figure 34:
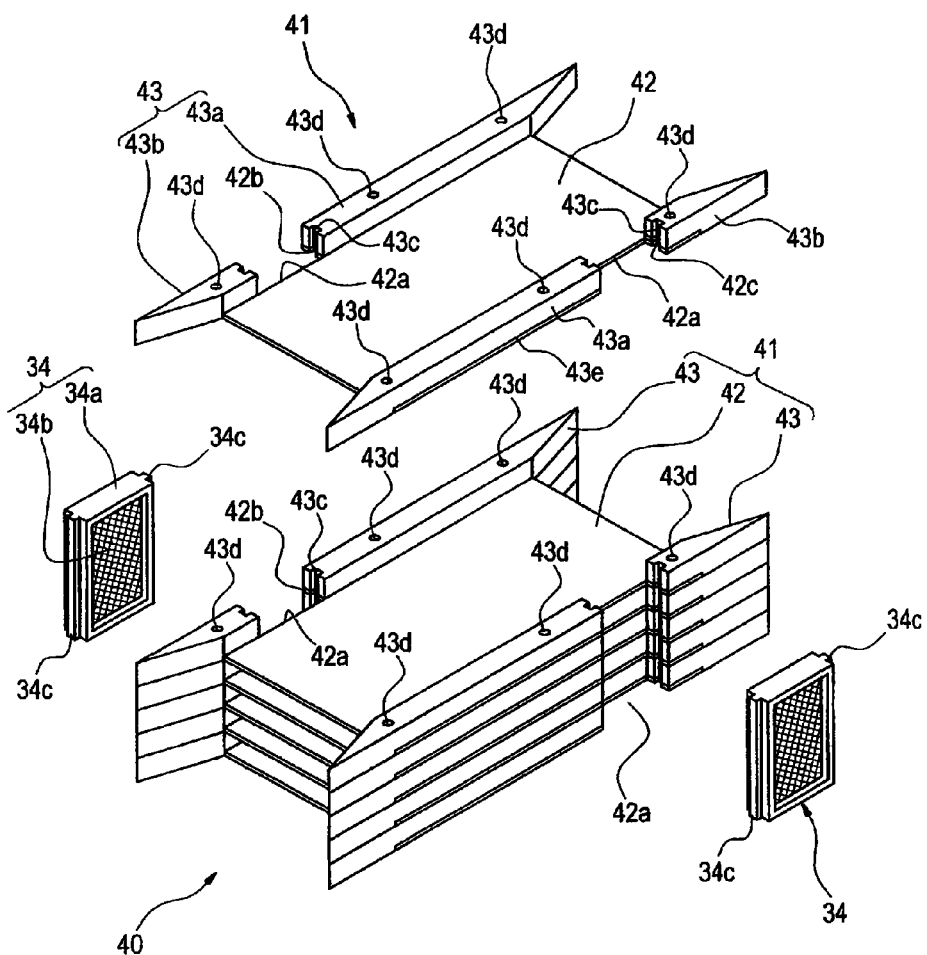
FIG. 34 is a perspective view to show a state in which the partition members are stacked to form the multilayer flow path member.
Figure 35:
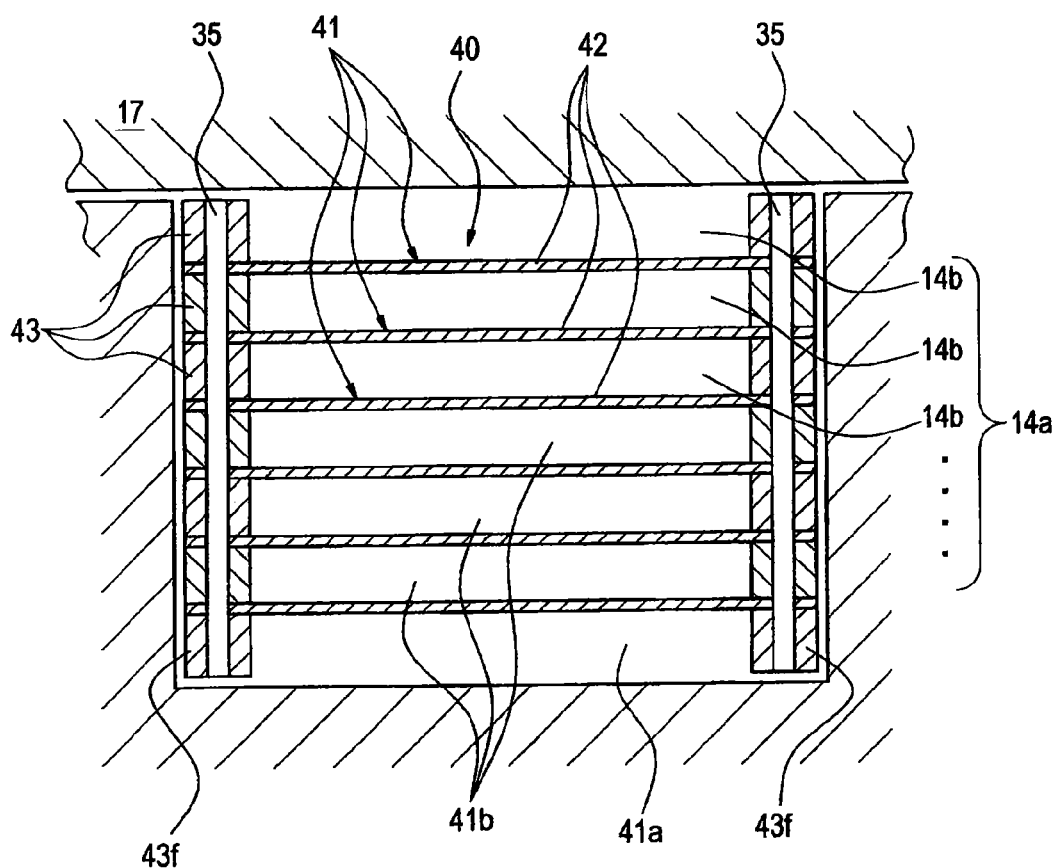
FIG. 35 is a front view of the multilayer flow path member.

FIG. 33 is an exploded perspective view of one of partition members forming a multilayer flow path member of an ultrasonic fluid measurement apparatus according to the fifteenth embodiment of the invention, FIG. 34 is a perspective view to show a state in which the partition members are stacked to form the multilayer flow path member, and FIG. 35 is a front view of the multilayer flow path member.

As shown in FIG. 33, each of partition members 41 forming a multilayer flow path member 40 has a partition plate 42 and prism-shaped support parts 43 attached to one face of the partition plate 42 (in FIG. 33, the upper face).

As shown in FIGS. 33 and 34, the partition plate 42 is a rectangular plate member and is provided with a rectangular notch 42a having the same width as a width W of the support part 43 on each of both left and right sides. The support part 43 is a square member rectangular in cross section and having a predetermined height H and is made up of a long member 43a and a short member 43b matched with both side margins sandwiching the notch 42a of the partition plate 42. The support part 43 is formed on a lower face with a partition plate notch 43e having a depth T equal to a thickness T of the partition plate 42. Opposed end faces of the long member 43a and the short member 43b are formed each with a filter groove 43c in the up and down direction, and the notch 42a of the partition plate 42 is also formed with a filter fit groove 42b.

Each of the support parts 43 and the partition plate 42 is provided in both margins with a plurality of through holes 43c and 42c piercing in the up and down direction at corresponding predetermined positions. The partition plate 42 and the support part 43 can be formed of metal or resin.

Therefore, as shown in FIGS. 34 and 35, to form the multilayer flow path member 40, first the support parts 43 are attached to each of the partition plates 42 so that both margin end parts of the partition plate 42 are fitted into the partition plate notch 43e of the lower face of the support part 43 (43a and 43b) to form each of the partition members 41. Then, the support parts 43 of the partition members 41 are stacked in the up and down direction to form the multilayer flow path member 40. At this time, it is desirable that joint pins 35 (see FIG. 29) should be inserted into the through holes 43d of the support parts 43 and the through holes 42c of the partition plates 42. Each filter 34 is inserted between the long member 43a and the short member 43b opposed to each other in the support part 43, namely, into the notch 42a of the partition plate 42 from above and is attached. At this time, engagement projections 34c of the filter 34 are fitted into the filter grooves 43c of the long member 43a and the short member 43b opposed to each other in the support part 43 and the filter fit grooves 42b of the partition plates 42. Accordingly, the multilayer flow path member 40 is formed.

As shown in FIG. 35, in the multilayer flow path member 40, to match the height of the flow path at a lowest stage 41a with the height of any other center flow path 41b, a spacing adjustment support part 43f having no partition plate 32 needs to be provided as the lowest stage 41a.

In the multilayer flow path member 40 of the ultrasonic fluid measurement apparatus according to the fifteenth embodiment of the invention described above, advantages similar to those of the multilayer flow path member 30 of the ultrasonic fluid measurement apparatus according to the fourteenth embodiment described above can also be provided.

In the multilayer flow path member 40 described above, the support parts 43 are provided on the upper face of the partition plate 42 to form the partition member 41, but the support parts 43 can also be provided on the lower face of the partition plate 42 to form the partition member 41.

In the partition member 41 described above, the partition plate 42 and the support parts 43 are formed as separate bodies, but can also be formed in one piece by insert molding.

Sixteenth Embodiment

Next, a sixteenth embodiment of the invention will be discussed.

Figure 36:
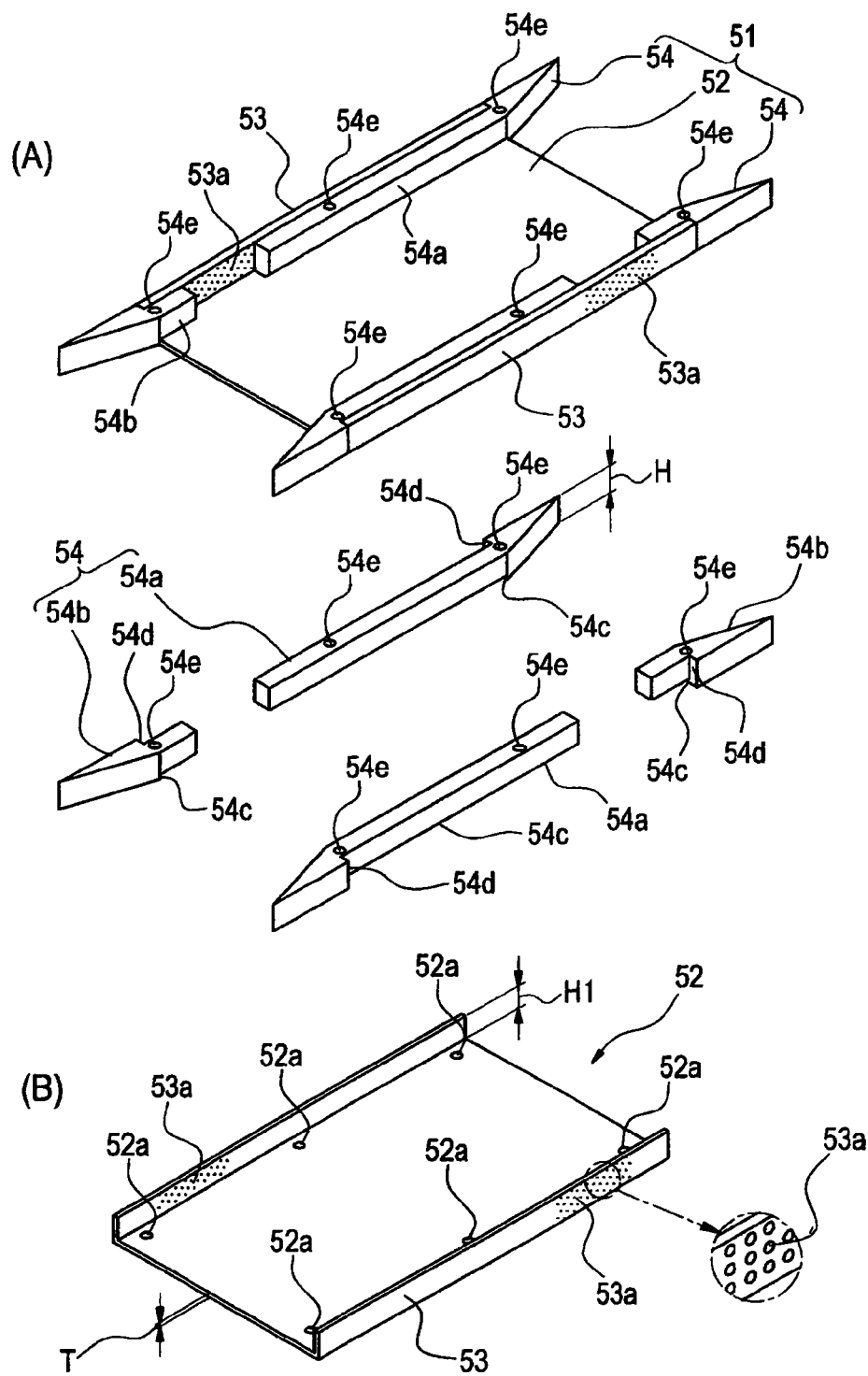
FIG. 36(A) is a perspective view of one of partition members forming a multilayer flow path member of an ultrasonic fluid measurement apparatus according to a sixteenth embodiment of the invention and FIG. 36(B) is an exploded perspective view of the same.
Figure 37:
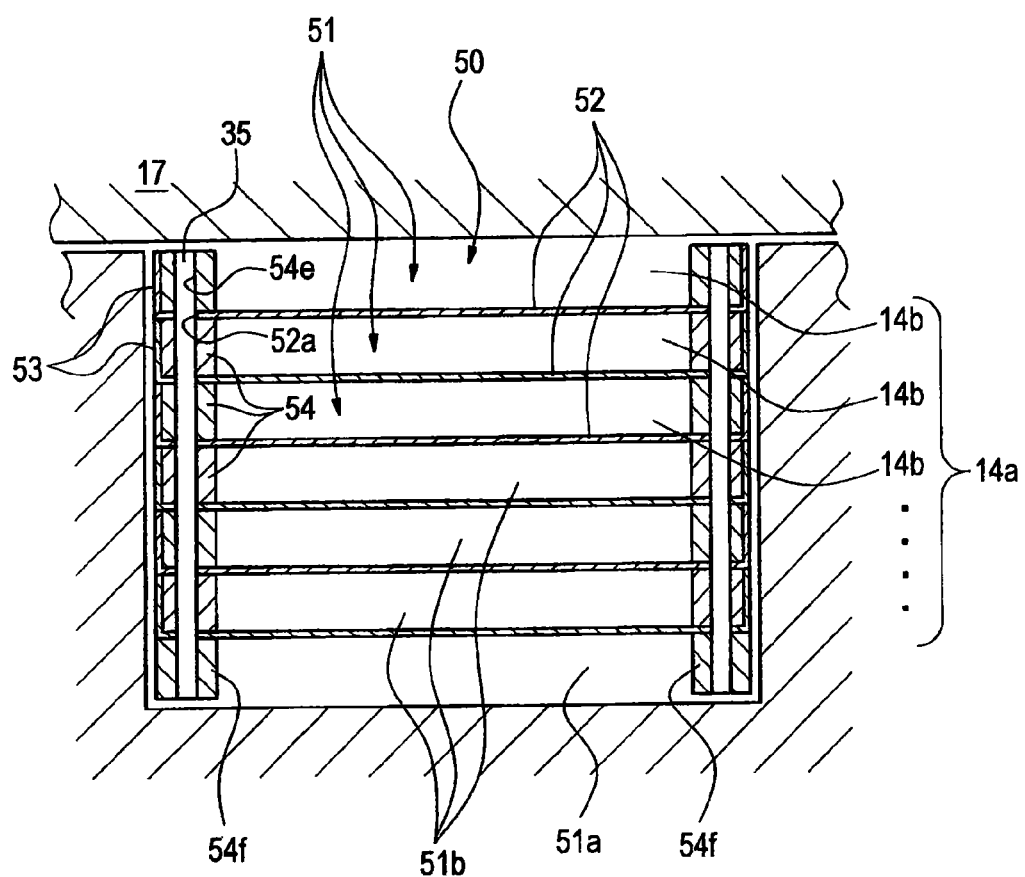
FIG. 37 is a front view of the multilayer flow path member.

FIG. 36(A) is a perspective view of one of partition members forming a multilayer flow path member of an ultrasonic fluid measurement apparatus according to the sixteenth embodiment of the invention, FIG. 36(B) is an exploded perspective view of the same, and FIG. 37 is a front view of the multilayer flow path member.

As shown in FIG. 36, in a multilayer flow path member 50 of the ultrasonic fluid measurement apparatus according to the sixteenth embodiment of the invention, each partition member 51 has a partition plate 52, bend parts 53 provided in all areas of both margins of the partition plate 52, filter members 53a each provided at a predetermined position of each bend part 53 for allowing an ultrasonic wave to pass through, and prism-shaped support parts 54 attached to one face of the partition plate 52 (in FIG. 36, the upper face) and along the bend parts 53.

As shown in FIG. 36, the partition plate 52 is a rectangular plate member and the bend parts 53 are formed by bending both left and right sides at right angles. The support part 54 is a square member rectangular in cross section and having a predetermined height H and is made up of a long member 54a and a short member 54b matched with both sides sandwiching a filter member 53a provided in the bend part 53 of the partition plate 52. The support part 54 is formed on a lower face with a partition plate notch 54c having a depth T equal to a thickness T of the partition plate 52, and is formed on an outer side face with a bend part notch 54d having a depth T equal to a thickness of the bend part 53 (namely, thickness of the partition plate 52) T.

A height H1 of the bend part 53 is formed as a height resulting from subtracting the thickness T of the partition plate 52 from a height H of the support part 54, namely, H1=H−T. Thus, if the partition plate 52 is fitted into the partition plate notches 54c of the support parts 54 and the bend parts 53 are fitted into the bend part notches 54d of the support parts 54 to attach the support parts 54 to the partition plate 52, the upper faces of the support parts 54 and the upper faces of the bend parts 53 become flush with each other.

Each of the support parts 54 and the partition plate 52 is provided in both margins with a plurality of through holes 54e and 52a piercing in the up and down direction at corresponding predetermined positions. The partition plate 52 and the support part 54 can be formed of metal or resin.

Therefore, as shown in FIG. 37, to form the multilayer flow path member 50, first the support parts 54 are attached to each of the partition plates 52 so that both margin end parts of the partition plate 52 are fitted into the partition plate notch 54c of the lower face of the support part 54 (54a and 54b) and the bend parts 53 are fitted into the bend part notches 54d of the outer side faces of the support parts 54 to form each of the partition members 51. Then, the support parts 54 of the partition members 51 are stacked in the up and down direction to form the multilayer flow path member 50. At this time, it is desirable that joint pins 35 (see FIG. 29) should be inserted into the through holes 54e of the support parts 54 and the through holes 52a of the partition plates 52.

As shown in FIG. 37, in the multilayer flow path member 50, to match the height of the flow path at a lowest stage 51a with the height of any other center flow path 51b, a spacing adjustment support part 54f having no partition plate 52 needs to be provided as the lowest stage 51a.

In the multilayer flow path member 50 of the ultrasonic fluid measurement apparatus according to the sixteenth embodiment of the invention described above, advantages similar to those of the multilayer flow path members 30 of the ultrasonic fluid measurement apparatus according to the fourteenth and fifteenth embodiments described above can also be provided. Further, in the multilayer flow path member 50, each filter member 53a is provided in the bend part 53 of a part of the partition plate 52, so that it is not necessary to separately provide a filter 34 as described above.

In the partition member 51 described above, the partition plate 52 and the support parts 54 are formed as separate bodies, but can also be formed in one piece by insert molding.

Seventeenth Embodiment

Next, a seventeenth embodiment of the invention will be discussed.

Figure 38:
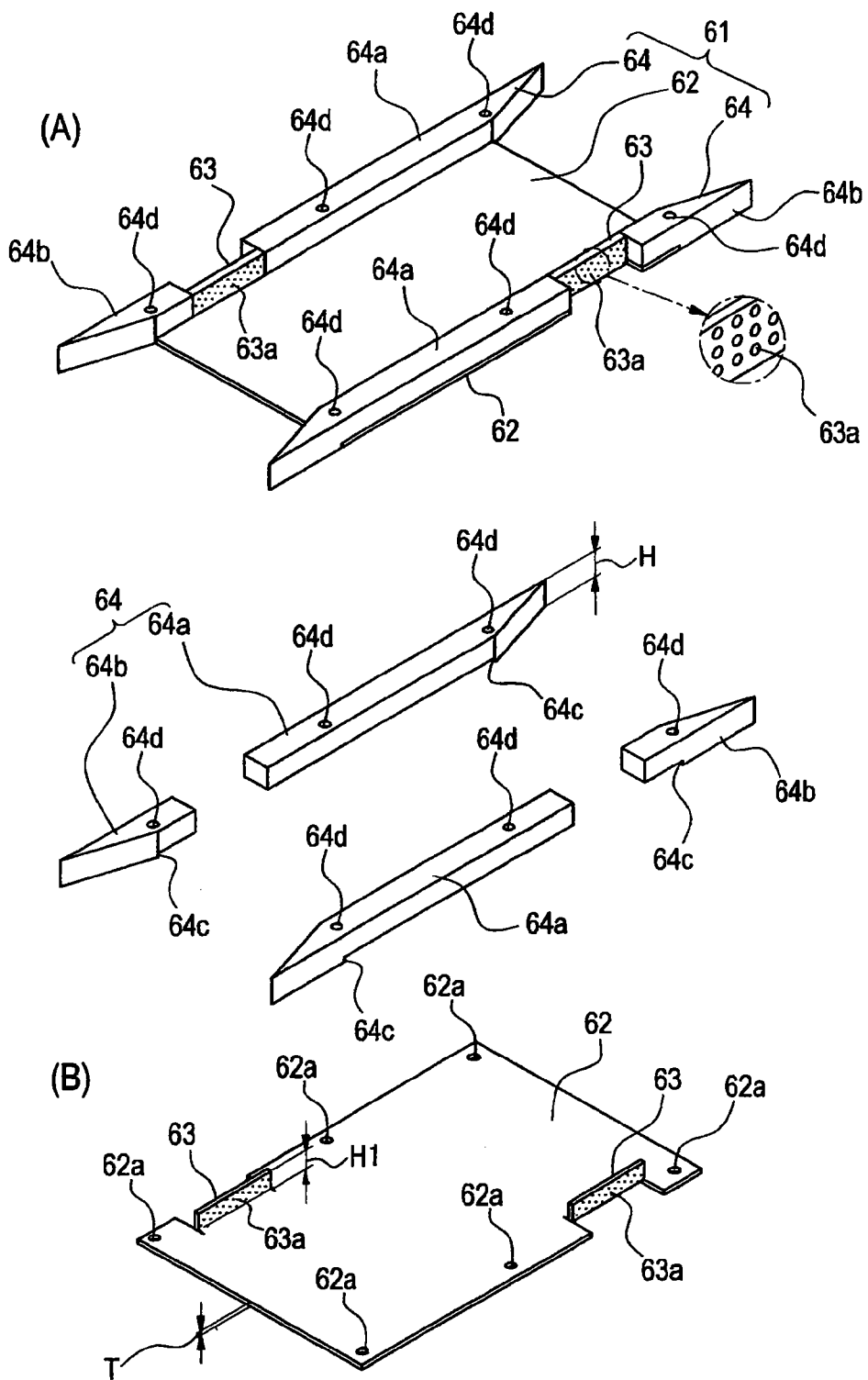
FIG. 38(A) is a perspective view of one of partition members forming a multilayer flow path member of an ultrasonic fluid measurement apparatus according to a seventeenth embodiment of the invention and FIG. 38(B) is an exploded perspective view of the same.
Figure 39:
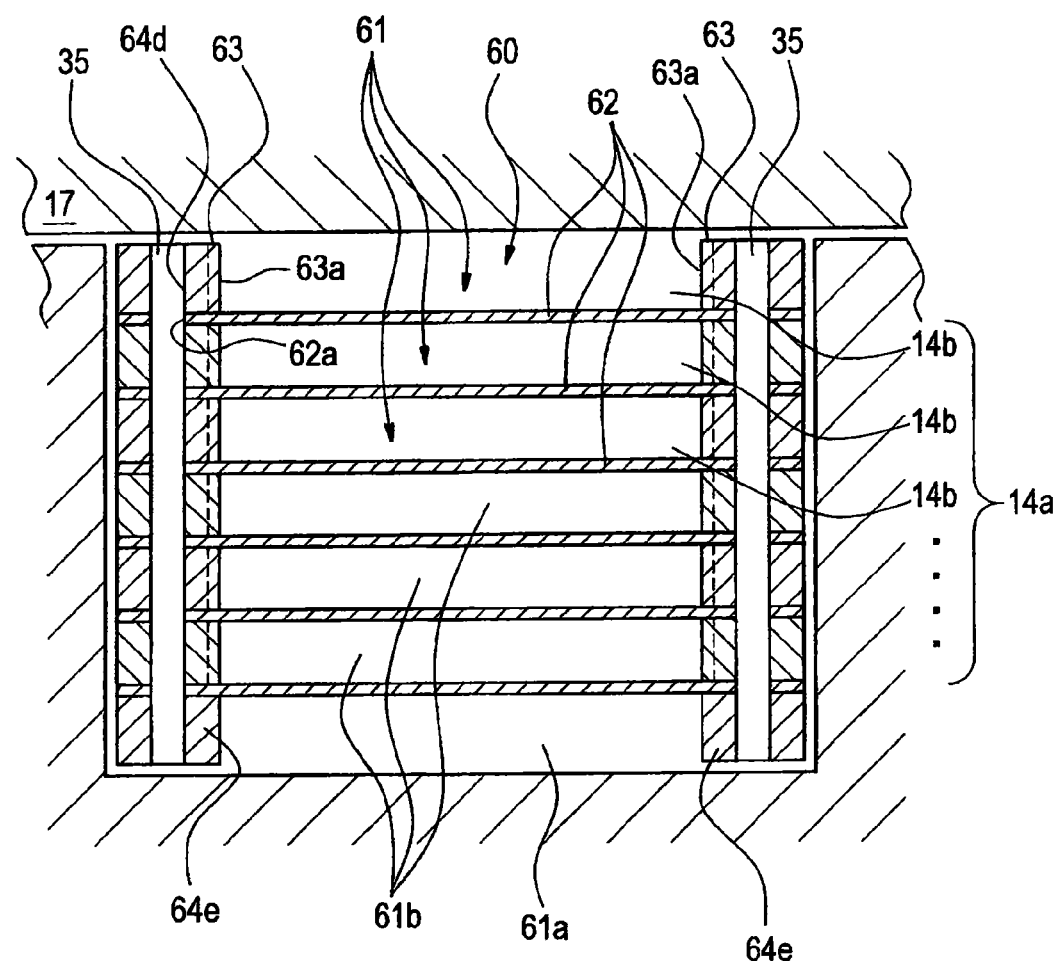
FIG. 39 is a front view of the multilayer flow path member.
Figure 40:
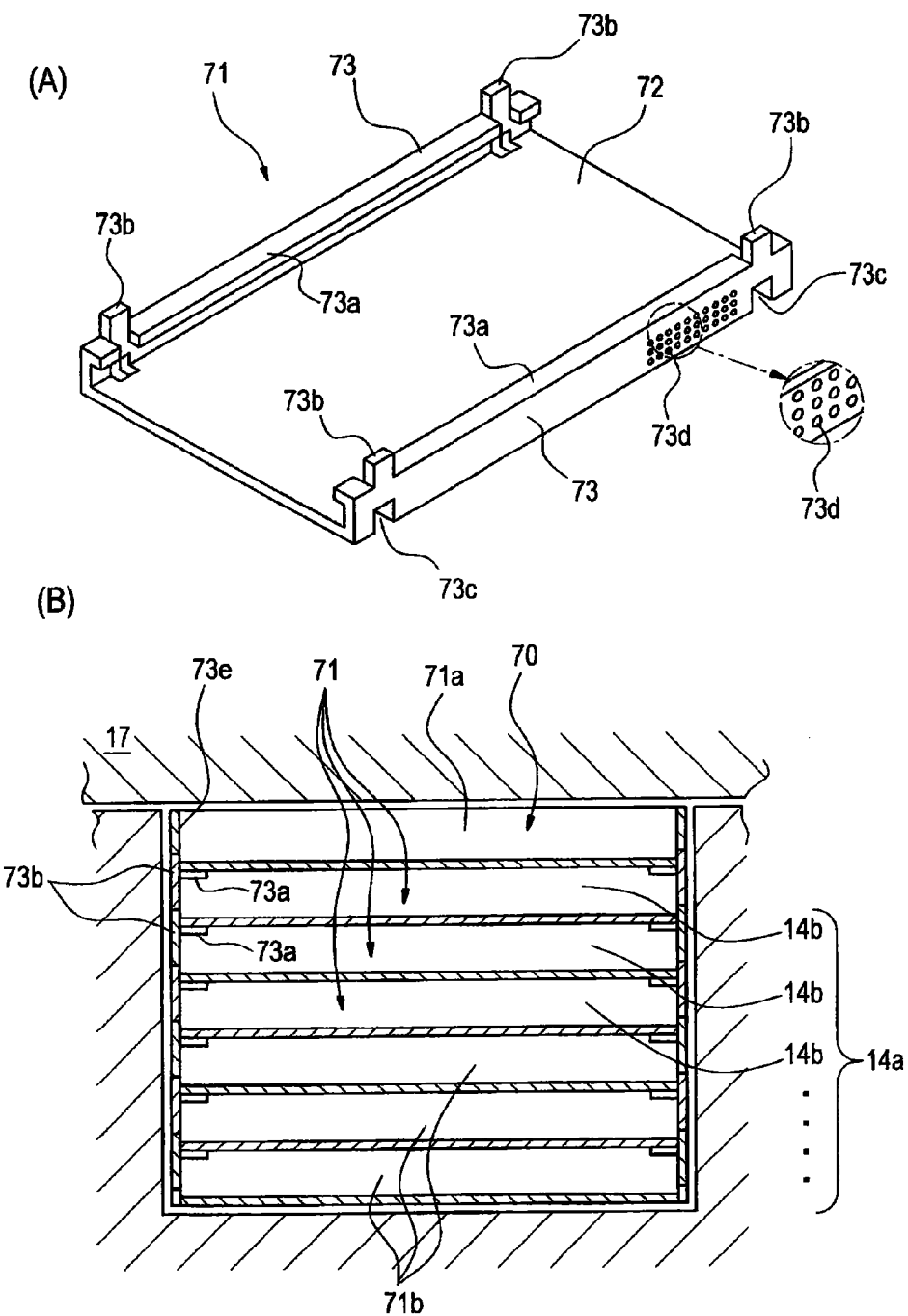
FIG. 40(A) is a perspective view of one of partition members forming a multilayer flow path member of an ultrasonic fluid measurement apparatus according to an eighteenth embodiment of the invention and FIG. 40(B) is a front view of the multilayer flow path member.
Figure 41:
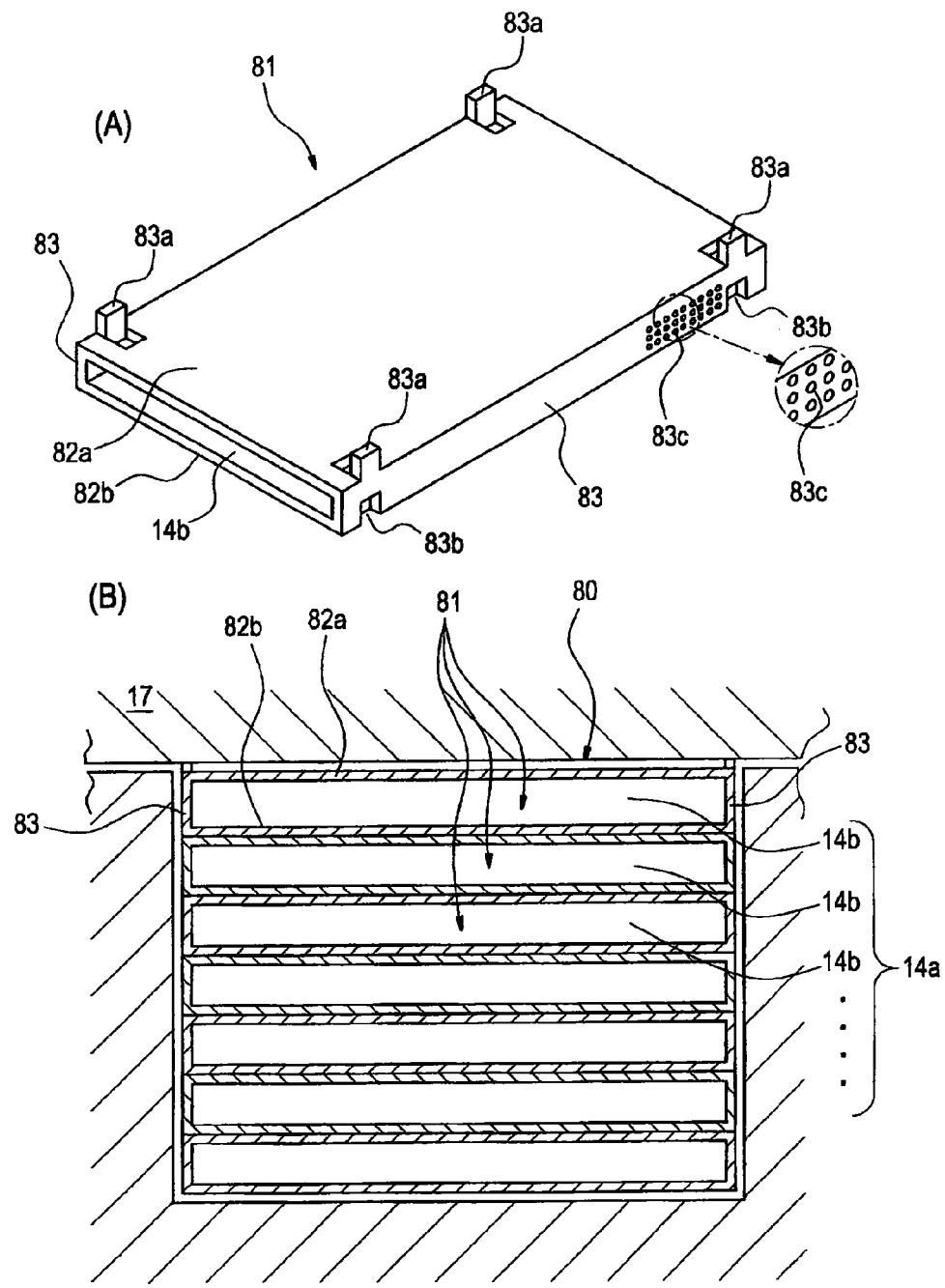
FIG. 41(A) is a perspective view of one of partition members forming a multilayer flow path member of an ultrasonic fluid measurement apparatus according to a nineteenth embodiment of the invention and FIG. 41(B) is a front view of the multilayer flow path member.
Figure 42:
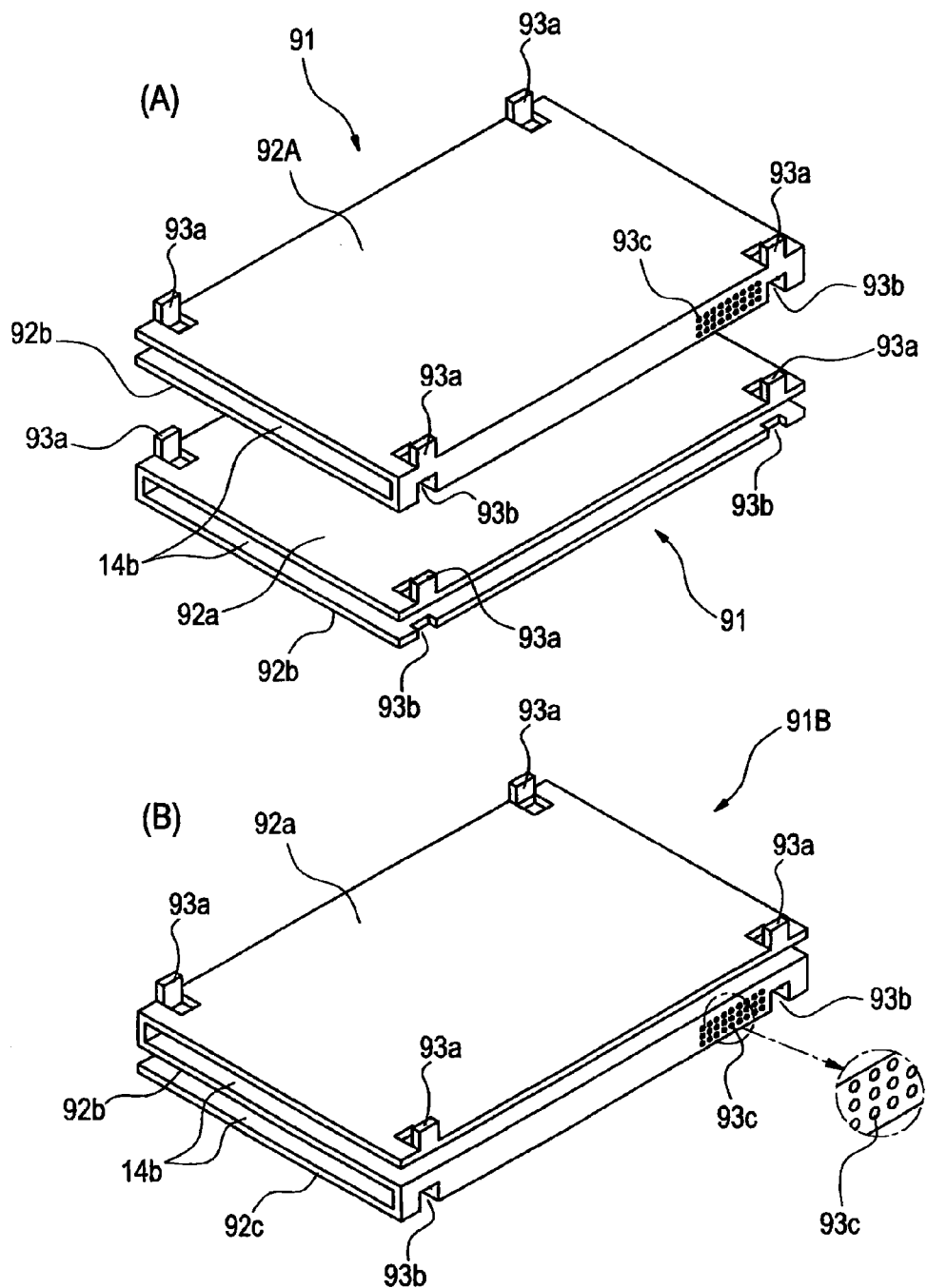
FIG. 42(A) is a perspective view of one of partition members forming a multilayer flow path member of an ultrasonic fluid measurement apparatus according to a twentieth embodiment of the invention and FIG. 42(B) is a front view to show a modified example of the multilayer flow path member.

FIG. 38(A) is a perspective view of one of partition members forming a multilayer flow path member of an ultrasonic fluid measurement apparatus according to the seventeenth embodiment of the invention, FIG. 38(B) is an exploded perspective view of the same, and FIG. 39 is a front view of the multilayer flow path member.

As shown in FIG. 38, in a multilayer flow path member 60 of the ultrasonic fluid measurement apparatus according to the seventeenth embodiment of the invention, each partition member 61 has a partition plate 62, bend parts 63 provided at predetermined positions of both margins of the partition plate 62, filter members 63a each provided in each bend part 63 for allowing an ultrasonic wave to pass through, and prism-shaped support parts 64 attached to one face of the partition plate 62 (in FIG. 38, the upper face) and along the bend parts 63, wherein the inner faces of the bend parts 63 and the inner faces of the support parts 64 are along the same plane.

As shown in FIG. 38, the partition plate 62 is a rectangular plate member and the bend parts 63 are formed by bending parts at predetermined positions on both left and right sides at right angles. The support part 64 is a square member rectangular in cross section and having a predetermined height H and is made up of a long member 64a and a short member 64b matched with both sides sandwiching the bend part 63 of the partition plate 62. The support part 64 is formed on a lower face with a partition plate notch 64c having a depth T equal to a thickness T of the partition plate 62.

A height H1 of the bend part 63 is formed as a height resulting from subtracting the thickness T of the partition plate 62 from a height H of the support part 64, namely, H1=H−T. Thus, if the partition plate 62 is fitted into the partition plate notches 64c of the support parts 64 and the support parts 64 are attached to the partition plate 62, the upper faces of the support parts 64 and the upper faces of the bend parts 64 become flush with each other.

Each of the support parts 64 and the partition plate 62 is provided in both margins with a plurality of through holes 64d and 62a piercing in the up and down direction at corresponding predetermined positions. The partition plate 62 and the support part 64 can be formed of metal or resin.

Therefore, as shown in FIG. 39, to form the multilayer flow path member 60, first both margin end parts of the partition plate 62 are fitted into the partition plate notch 64c of the lower face of the support part 64 (64a and 64b), the long member 64a and the short member 64b are placed on both sides of the bend part 63, and the support parts 64 are attached to each of the partition plates 62 so that to form each of the partition members 61. Then, the support parts 64 of the partition members 61 are stacked in the up and down direction to form the multilayer flow path member 60. At this time, it is desirable that joint pins 35 (see FIG. 29) should be inserted into the through holes 64d of the support parts 64 and the through holes 62a of the partition plates 62.

As shown in FIG. 39, in the multilayer flow path member 60, to match the height of the flow path at a lowest stage 61a with the height of any other center flow path 61b, a spacing adjustment support part 64e having no partition plate 62 needs to be provided as the lowest stage 61a.

In the multilayer flow path member 60 of the ultrasonic fluid measurement apparatus according to the seventeenth embodiment of the invention described above, advantages similar to those of the multilayer flow path members of the ultrasonic fluid measurement apparatus according to the fourteenth and sixteenth embodiments described above can also be provided. Further, in the multilayer flow path member 60, each filter member 63a is provided in the bend part 63 of a part of the partition plate 62, so that it is not necessary to separately provide a filter 34 as described above. Since the inner faces of the support parts 64 become flush with the inner faces of the bend parts 64, the flow of a fluid can be held smoothly.

In the partition member 61 described above, the partition plate 62 and the support parts 64 are formed as separate bodies, but can also be formed in one piece by insert molding.

Eighteenth Embodiment

Next, an eighteenth embodiment of the invention will be discussed.

FIG. 40(A) is a perspective view of one of partition members forming a multilayer flow path member of an ultrasonic fluid measurement apparatus according to the eighteenth embodiment of the invention and FIG. 40(B) is a front view of the multilayer flow path member.

As shown in FIG. 40(A), each of partition members 71 forming a multilayer flow path member 70 of the ultrasonic fluid measurement apparatus according to the eighteenth embodiment of the invention has a partition plate 72 and support parts 73, and the support parts 73 are formed by bending both margins of the partition plate 72.

As shown in FIG. 40(A), the partition plate 72 is a rectangular plate member and both left and right sides are bent at right angles to form the support parts 73. The upper end part of each of the support parts 73 is bent to the inside to form a placement part 73a for making it easy to stack the partition members 71. Further, the support part 73 is provided in both back and forth end parts each with a positioning projection 73b straightly upward projecting without providing the placement part 73a, and a positioning fit hole 73c into which the positioning projection 73b is fitted is formed below the positioning projection 73b in the support part 73. A filter member 34b for allowing an ultrasonic wave to pass through is provided at a predetermined position of each of the support parts 73.

Therefore, as shown in FIG. 40(B), to form the multilayer flow path member 70, first both left and right sides of the partition plate 72 are bent to form the support parts 73. At this time, the placement part 73a is provided in the upper end of each of the support parts 73 and the positioning projection 73b and the positioning fit holes 73c are also provided to form each of the partition members 71. Then, the support parts 73 of the partition members 71 are stacked in the up and down direction to form the multilayer flow path member 70. At this time, the positioning projections 73b of a lower partition member 71 are fitted into the positioning fit holes 73c of the partition member 71 placed on that partition member 71 for reliable positioning.

As shown in FIG. 40(B), in the multilayer flow path member 70, to match the height of the flow path at a highest stage 71a with the height of any other center flow path 71b, a partition member (71a) having support parts 73e having no positioning projections 73b needs to be provided for the highest stage 71a.

In the multilayer flow path member 70 of the ultrasonic fluid measurement apparatus according to the eighteenth embodiment of the invention described above, advantages similar to those of the multilayer flow path members of the ultrasonic fluid measurement apparatus according to the fourteenth and seventeenth embodiments described above can also be provided. Further, in the multilayer flow path member 70, each filter member 34b is provided in the support part 73 of a part of the partition plate 72, so that it is not necessary to separately provide a filter 34 as described above. Since the inner faces of the filter members 34b become flush with the inner faces of the support parts 73, the flow of a fluid can be held smoothly.

Nineteenth Embodiment

Next, a nineteenth embodiment of the invention will be discussed.

FIG. 41(A) is a perspective view of one of partition members forming a multilayer flow path member of an ultrasonic fluid measurement apparatus according to the nineteenth embodiment of the invention and FIG. 41(B) is a front view of the multilayer flow path member.

As shown in FIG. 41(A), each of partition members 81 forming a multilayer flow path member 80 of the ultrasonic fluid measurement apparatus according to the sixth embodiment of the invention is formed like a flat angular pipe by integrally molding a plurality of (in FIG. 41(A), two) partition plates 82a and 82b and wall parts 83 for joining the partition plates 82a and 82b.

As shown in FIG. 41(A), each of the partition plates 82a and 82b is a rectangular plate member and both left and right margins are joined by the left and right wall parts 83 with a predetermined spacing to form the partition member 81 rectangular in cross section as a whole. The wall part 83 is provided in both back and forth end parts each with a positioning projection 83a upward projecting as the wall part 83 is extended upward, and a positioning fit hole 83b into which the positioning projection 83a is fitted is formed below the positioning projection 83a in the wall part 83. A filter member 83c for allowing an ultrasonic wave to pass through is provided at a predetermined position of each of the wall parts 83. The positioning projections 83a can be formed by integral molding, but each can also be formed by cutting and raising a part of the partition plate 82a after integral molding.

Therefore, as shown in FIG. 41(B), to form the multilayer flow path member 80, a plurality of partition members 81 each rectangular in cross section containing a flat flow path 14b formed by the partition plates 82a and 82b and the wall parts 83 and 83 are formed by integral molding. Then, the partition members 81 are stacked in the up and down direction to form the multilayer flow path member 80. At this time, the positioning projections 83a of a lower partition member 81 are fitted into the positioning fit holes 83b of the partition member 81 placed on that partition member 81 for reliable positioning.

In the multilayer flow path member 80 of the ultrasonic fluid measurement apparatus according to the nineteenth embodiment of the invention described above, advantages similar to those of the multilayer flow path members of the ultrasonic fluid measurement apparatus according to the fourteenth to eighteenth embodiments described above can also be provided. Further, in the multilayer flow path member 80, each filter member 83c is provided in the wall part 83, so that it is not necessary to separately provide a filter 34 as described above. Since each of the partition members 81 has the rectangular flat flow path 14b, the flat flow path 14b is also formed at the height stage and the lowest stage like intermediate portions.

Twentieth Embodiment

Next, a twentieth embodiment of the invention will be discussed.

FIG. 42(A) is a perspective view of one of partition members forming a multilayer flow path member of an ultrasonic fluid measurement apparatus according to the twentieth embodiment of the invention and FIG. 42(B) is a front view to show a modified example of the multilayer flow path member.

As shown in FIG. 42(A), each of partition members 91 forming the multilayer flow path member of the ultrasonic fluid measurement apparatus according to the twentieth embodiment of the invention is formed roughly like a rectangular cross-section U shape by integrally molding a plurality of (in FIG. 42(A), two) partition plates 92a and 92b and a wall part 93 for joining the partition plates 92a and 92b.

As shown in FIG. 42(A), each of the partition plates 92a and 92b is a rectangular plate member and either left or right margin is joined by the wall part 93 with a predetermined spacing to form the partition member 91 roughly like a rectangular cross-section U shape as a whole. The wall part 93 is provided in both back and forth end parts each with a positioning projection 93a upward projecting as the wall part 93 is extended upward, and a positioning fit hole 93b into which the positioning projection 93a is fitted is formed below the positioning projection 93a in the lower partition plate 92b. A filter member 93c for allowing an ultrasonic wave to pass through is provided at a predetermined position of the wall part 93.

Therefore, to form the multilayer flow path member, a plurality of partition members 91 each formed like a rectangular cross-section U shape in cross section containing a flat flow path 14b formed by the partition plates 92a and 92b and the wall part 93 are formed by integral molding. Then, the partition members 91 are stacked in the up and down direction to form the multilayer flow path member. At this time, the positioning projections 93a of a lower partition member 91 are fitted into the positioning fit holes 93b of the partition member 91 placed on that partition member 91 for reliable positioning.

In the multilayer flow path member of the ultrasonic fluid measurement apparatus according to the twentieth embodiment of the invention described above, advantages similar to those of the multilayer flow path members of the ultrasonic fluid measurement apparatus according to the fourteenth to nineteenth embodiments described above can also be provided. Further, in the multilayer flow path member, the filter member 93c is provided in the wall part 93, so that it is not necessary to separately provide a filter 34 as described above. Since each of the partition members 91 has the rectangular flat flow path 14b, the flat flow path 14b is also formed at the height stage and the lowest stage like intermediate portions.

In a partition member 91B shown in FIG. 42(B), three partition plates 92a, 92b, and 92c are joined like a letter S by wall parts 93. In this case, the partition member is equal to concatenation of two partition members 91 described above in FIG. 42(A), so that similar advantages can be provided. The positioning projections 93a are provided on the highest partition plate 92a and the positioning fit holes 93b are provided in the lowest partition plate 92c.

The multilayer flow path members of the ultrasonic fluid measurement apparatus of the invention are not limited to those of the embodiments described above and can be appropriately modified, improved, etc.

Figure 43:
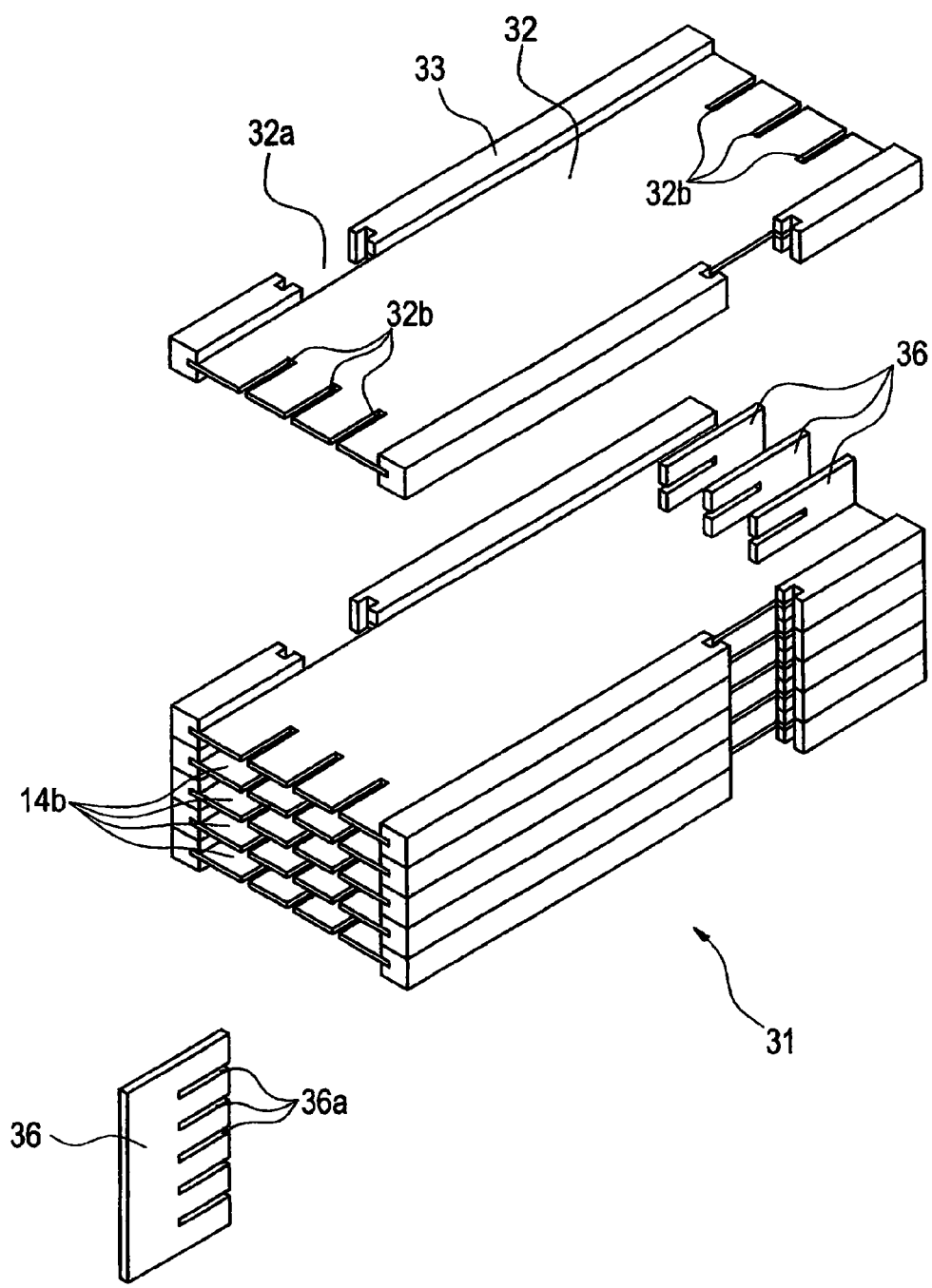
FIG. 43 is a perspective view to show a flow path formed as a square by further portioning a flat flow path.
Figure 44:
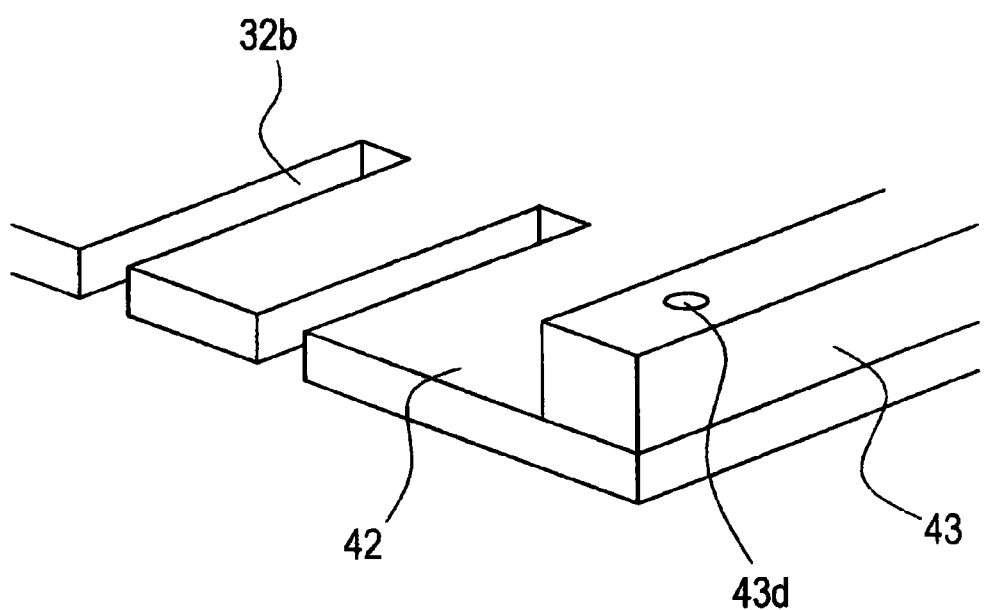
FIG. 44 is a perspective view to show notches of a partition plate to form a square flow path by further partitioning a flat flow path.
Figure 45:
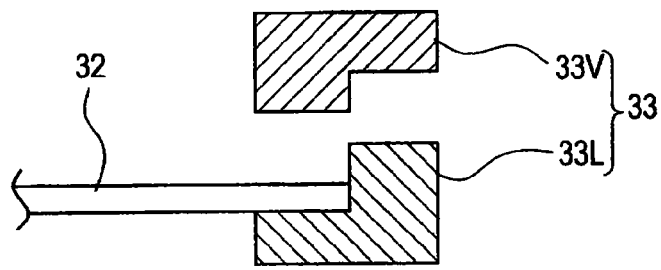
FIGS. 45(A) to (C) are sectional views to show modified examples of cross-sectional shapes of support parts.
Figure 45:
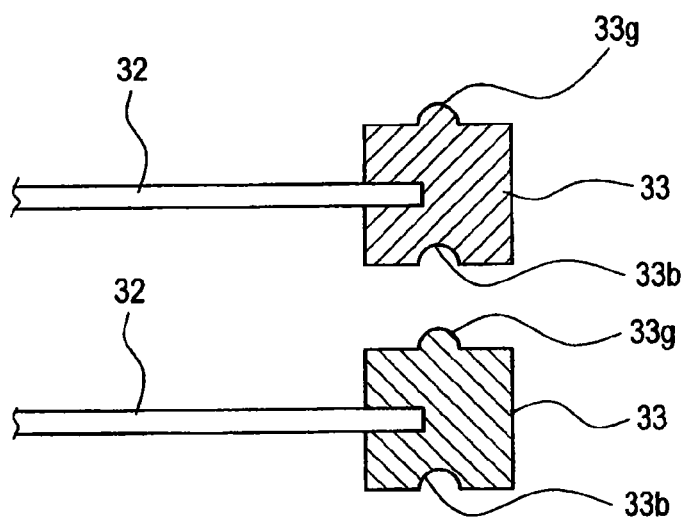
Figure 45:
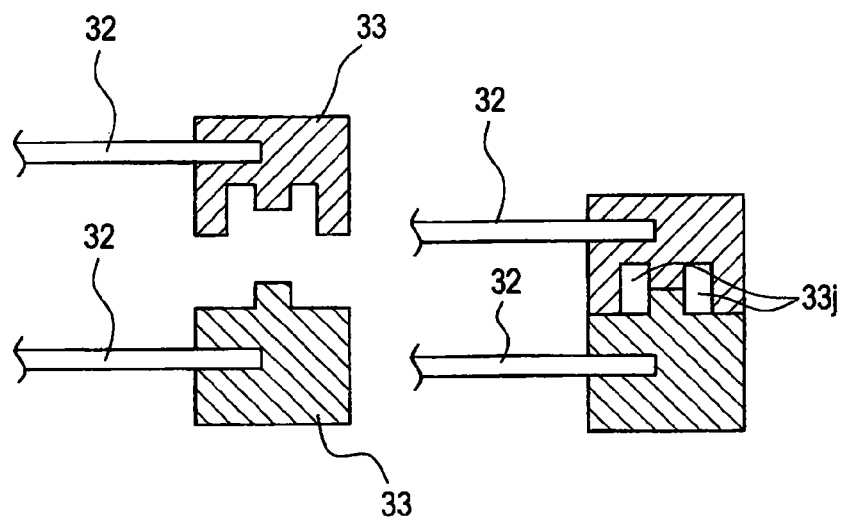

For example, as shown in FIGS. 43 and 44, division plates 36 to form a square flow path by further partitioning an upstream, downstream flat flow path 14b may be provided. The division plate 36 and a partition plate 32 are provided with notches 36a and 32b of the same length to enable one to be inserted into another mutually. The division plate 36 is formed as a size so as not to interfere with the passage of an ultrasonic wave when it is attached to the partition plate 32. FIG. 43 shows the case of the fourteenth embodiment as an example and FIG. 44 shows the case of the fifteenth embodiment as an example, but they can also be applied to any other embodiment in a similar manner.

As shown in FIGS. 45(A) to (C), the shape of each support part can be changed. That is, a support part 33 shown in FIG. 45(A) can be divided into two parts up and down to form an upper support part 33U and a lower support part 33L and a partition plate 32 can be sandwiched between the upper support part 33U and the lower support part 33L. The upper support part 33U and the lower support part 33L can be joined by ultrasonic welding or with an adhesive.

In a support part 33 shown in FIG. 45(B), a convex part 33g is provided on the upper face of the support part 33 and a concave part 33h into which the convex part 33g is fitted is provided on the lower face of the support part 33. Accordingly, positioning of the stacked upper and lower support parts 33 can be performed reliably. The convex part 33g and the concave part 33h may be provided like dots or may be provided long along the support part 33.

In a support part 33 shown in FIG. 45(C), when upper and lower support parts 33 are combined, an internal space 33j is formed. The space 33j is thus provided, whereby when ultrasonic welding is performed, effective welding can be performed.

Figure 46:
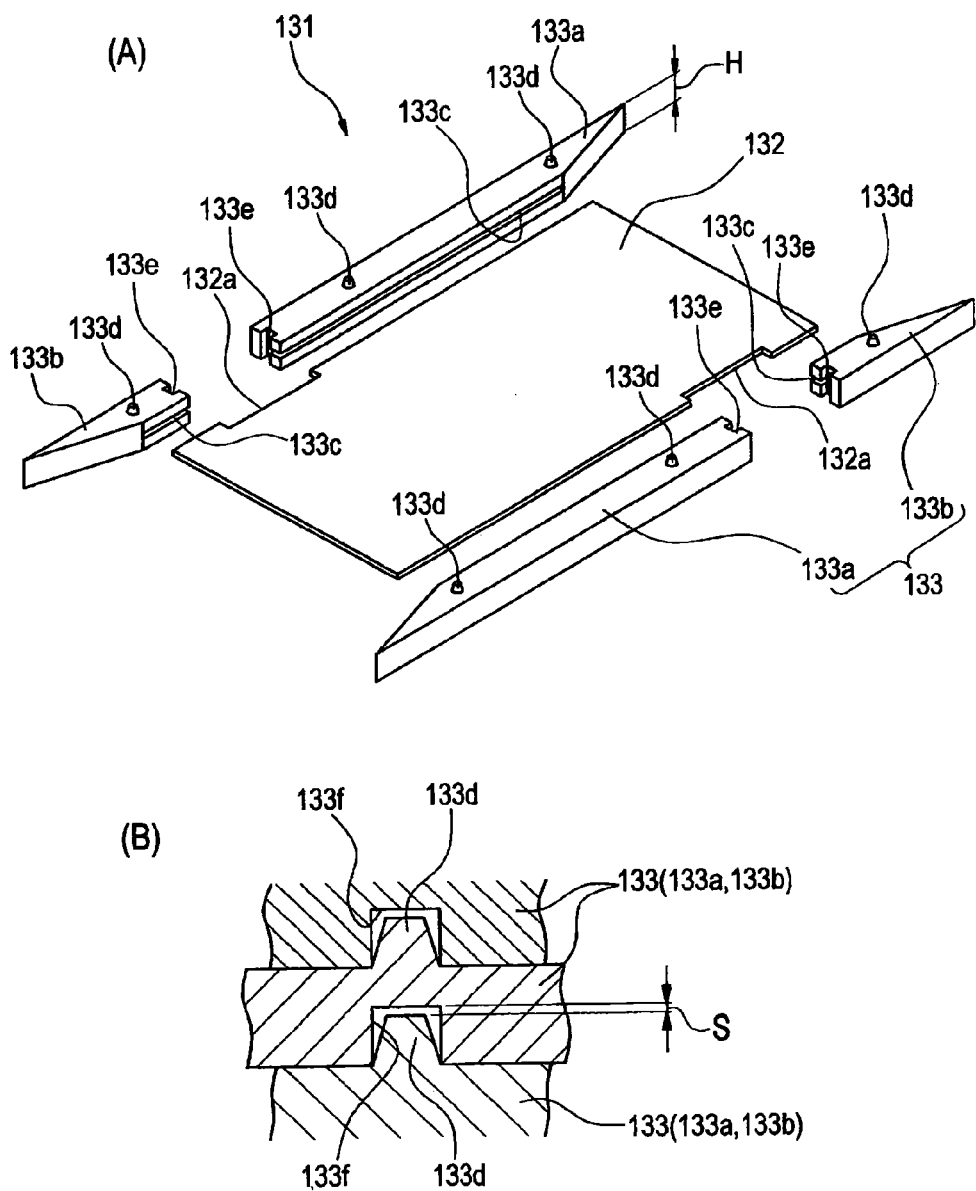
FIG. 46(A) is a perspective view and FIG. 46(B) is a sectional view of the main part to show a modified example of the invention.

Further, the invention includes a partition member 131 shown in FIG. 46.

In the partition member 131 described below, parts similar to those of the partition member 31 of the fourteenth embodiment described above are denoted by the same reference numerals and will not be discussed again.

The partition member 131 shown in FIG. 46(A) is provided with taper-shaped connection pins 133d provided in a support part 133 (133a and 133b) and connection holes 133f into which the connection pins 133d are inserted.

The connection pin 133d is shaped roughly like a cone tapering toward the tip and has an axis placed along an extension of the axis of the connection hole 133f. The height dimension of the connection pin 133d is set slightly smaller than the depth dimension of the connection hole 133f and the diameter dimension of the large diameter part of the base end of the connection pin 133d is set slightly smaller than the opening diameter dimension of the connection hole 133f.

As shown in FIG. 46(B), if such a partition member 131 is stacked on another partition member 131, the connection pins 133d are inserted into the connection holes 133f of an upper different partition member 131 and the connection pins 133d of a lower different partition member 131 are inserted into the connection holes 133f, whereby the partition members 131 can be fixed in a state in which they are stacked without using the joint pints illustrated in the first embodiment.

At this time, the connection pins 133d and the connection holes 133f are set to the dimensions described above, so that the crown of each connection pin 133d and the bottom part of each connection hole 133f do not come in contact with each other and a space S occurs therebetween. Thus, the taper face of the connection pin 133d is inserted into the opening margin of the connection hole 133f in a linear contact state and accordingly, it is not feared that looseness will occur in each partition member 131.

According to the partition member 131 described above, each support part is provided with the connection pins 133d and the connection holes 133f, so that joint pins for fixing other partition members 131 in a state in which the partition members 131 are stacked become unnecessary and the manufacturing cost can be reduced.

Since the partition member 131 has the connection pins 133d each shaped in a taper having a taper face, looseness does not occur in a state in which the partition member 131 is stacked on another partition member 131.

Figure 47:
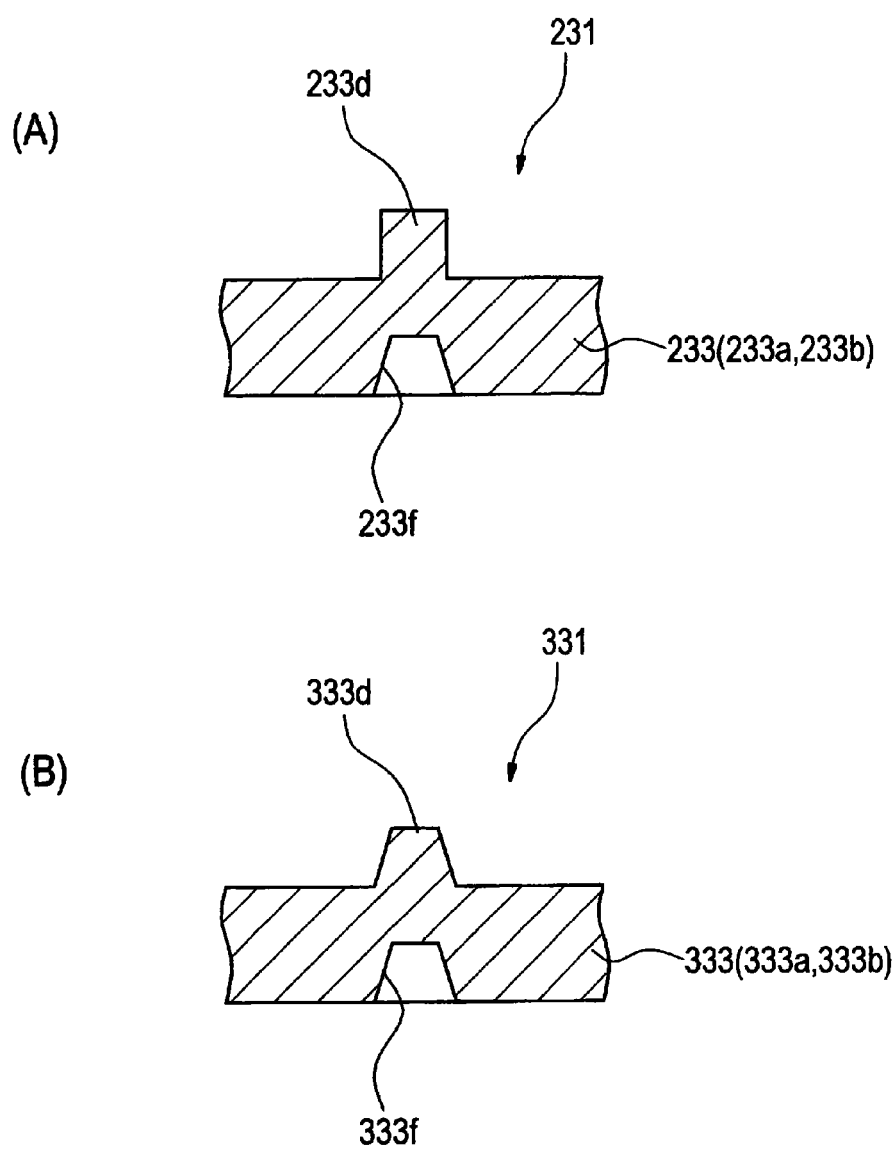
FIGS. 47(A) and (B) are sectional views of the main part to show a modified example of the invention.

The invention includes partition members 231 and 331 shown in FIG. 47.

That is, the partition member 231 shown in FIG. 47(A) is provided with a connection pin 233d shaped roughly like a circular cylinder and a connection hole 233f tapering toward the back direction.

The partition member 331 shown in FIG. 47(B) is provided with a connection pin 333d shaped roughly like a cone tapering toward the tip and a connection hole 333f tapering toward the back direction.

In the partition members 231 and 331, similar advantages can also be provided.

Figure 48:
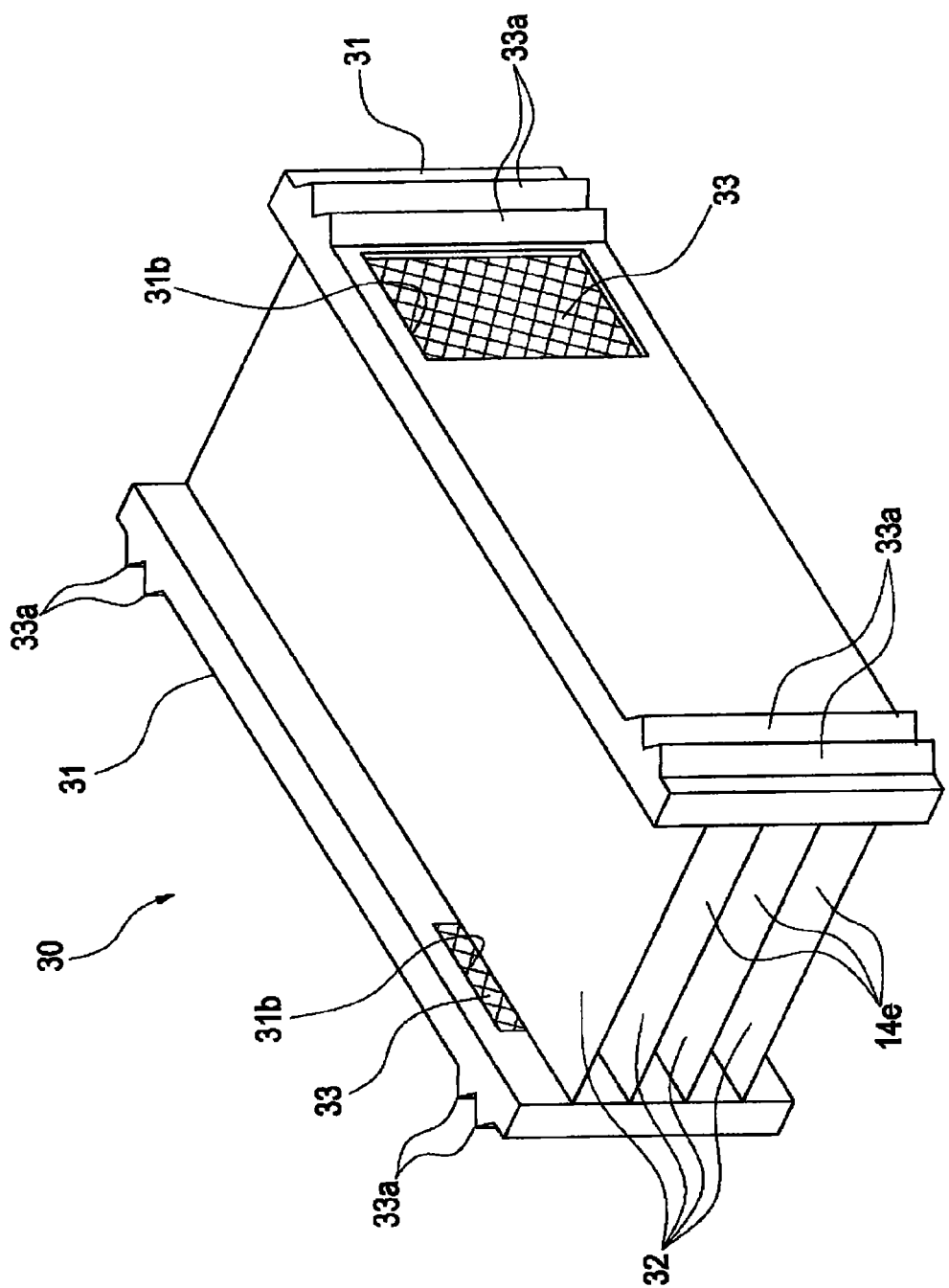
FIG. 48 is a perspective view to show a modified example of the invention.

The invention also includes a form shown in FIG. 48.

That is, a multilayer flow path member 30 of an ultrasonic fluid measurement apparatus shown in FIG. 48 is provided as each of the frames 31 in the multilayer flow path member 30 of the first embodiment described above is provided with V-shaped convex parts 33a of seal means (first seal means) projecting toward the inner face of a measurement flow path not shown.

According to the multilayer flow path member 30 shown in FIG. 48, the problem of degrading the measurement accuracy as a fluid flows into the space between the frame 31 forming a part of the multilayer flow path member 30 and the bottom face of the measurement flow path and the space between the frame 31 and the lower face of the lid as before does not occur and the problem of degrading the measurement accuracy as a fluid flows into the space between the frame 31 and the inner face of the measurement flow path does not occur either and the measurement accuracy can be dramatically enhanced owing to the synergistic effect.

The multilayer flow path members of the ultrasonic fluid measurement apparatus and the ultrasonic fluid measurement apparatus of the invention are not limited to those of the embodiments described above and can be appropriately modified, improved, etc.

For example, in the description of the embodiments, each flow path is formed "roughly like an inverse U letter," but measurement can also be conducted in a state in which each flow path is formed roughly like a U letter with top side down.

This application is based on Japanese Patent Application (No. 2007-179695) filed on Jul. 9, 2007, Japanese Patent Application (No. 2007-179696) filed on Jul. 9, 2007, Japanese Patent Application (No. 2007-179697) filed on Jul. 9, 2007, Japanese Patent Application (No. 2007-179952) filed on Jul. 9, 2007, and Japanese Patent Application (No. 2007-179953) filed on Jul. 9, 2007, which are incorporated herein by reference.

INDUSTRIAL APPLICABILITY

As described above, in the multilayer flow path member of the ultrasonic fluid measurement apparatus and the ultrasonic fluid measurement apparatus according to the invention, when the multilayer flow path member placed in the measurement flow path shaped in a rectangular cross-section pipe of the ultrasonic fluid measurement apparatus is partitioned into a plurality of flat flow paths by the partition plates attached to each frame along the flowing direction, the partition plates are provided so as to face the inner faces of the measurement flow path. Thus, the partition plates are exposed and face the inner faces of the measurement flow path and thus the space between the exposed partition plate and the inner face of the measurement flow path becomes the highest-stage or lowest-stage flat flow path. Therefore, the problem of degrading the measurement accuracy as a fluid flows into the space between the frame forming a part of the multilayer flow path member and the inner face of the measurement flow path as before does not occur and accordingly the measurement accuracy of the mean flow velocity can be enhanced, and the invention is useful as a multilayer flow path member of an ultrasonic fluid measurement apparatus formed with a plurality of flat flow paths in a measurement flow path using the multilayer flow path member, an ultrasonic fluid measurement apparatus, etc.

The invention claimed is:

1. A multilayer flow path member of an ultrasonic fluid measurement apparatus comprising:
   partition plates placed in a measurement flow path shaped in a rectangular cross-section pipe, formed in the ultrasonic fluid measurement apparatus for partitioning the measurement flow path into a plurality of flat flow paths; and
   a frame for supporting a margin along a flowing direction of a fluid in said partition plates, wherein
   said partition plates face the inner face of the measurement flow path.

2. The multilayer flow path member of the ultrasonic fluid measurement apparatus as claimed in claim 1 wherein said partition plates face a pair of opposed inner faces in the measurement flow path.

3. The multilayer flow path member of the ultrasonic fluid measurement apparatus as claimed in claim 1 having an extension provided in an end part along the flowing direction in said frame wherein
   the inner side face of the extension crosses the inner side face of said frame.

4. The multilayer flow path member of the ultrasonic fluid measurement apparatus as claimed in claim 1 wherein a filter member provided in a through hole of said frame for allowing an ultrasonic wave to pass through undergoes water repellency treatment.

5. The multilayer flow path member of the ultrasonic fluid measurement apparatus as claimed in claim 1 wherein said frame is provided with seal means for preventing the fluid from flowing into a space between the inner face of the measurement flow path and the outer face of said frame.

6. The multilayer flow path member of the ultrasonic fluid measurement apparatus as claimed in claim 5 wherein the seal means is provided integrally with said frame.

7. The multilayer flow path member of the ultrasonic fluid measurement apparatus as claimed in claim 5 wherein the seal member projects from said frame toward the inner face of the measurement flow path and is continuous in the direction crossing the fluid flowing direction.

8. The multilayer flow path member of the ultrasonic fluid measurement apparatus as claimed in claim 5 wherein said frame is formed roughly like a rectangular cross-section pipe and the seal means is provided like a ring along all outer faces of said frame.

9. The multilayer flow path member of the ultrasonic fluid measurement apparatus as claimed in claim 5 wherein a filter member provided in a through hole of said frame for allowing an ultrasonic wave to pass through undergoes water repellency treatment.

10. The multilayer flow path member of the ultrasonic fluid measurement apparatus as claimed in claim 1 wherein a filter member for allowing an ultrasonic wave to pass through comprises a frame part housed detachably in a through hole provided in said frame and a filter part supported on the frame part.

11. The multilayer flow path member of the ultrasonic fluid measurement apparatus as claimed in claim 10 wherein the filter part is placed along the inner face of the flat flow path.

12. The multilayer flow path member of the ultrasonic fluid measurement apparatus as claimed in claim 10 wherein the filter part undergoes water repellency treatment.

13. The multilayer flow path member of the ultrasonic fluid measurement apparatus as claimed in claim 1 wherein said partition plates undergo surface treatment for producing regular convexoconcave on the surfaces of said partition plates.

14. The multilayer flow path member of the ultrasonic fluid measurement apparatus as claimed in claim 13 wherein the surfaces of said partition plates are coated.

15. The multilayer flow path member of the ultrasonic fluid measurement apparatus as claimed in claim 13 wherein a filter member being provided in a through hole of said frame for supporting margin end parts of said partition plates along the fluid flowing direction for allowing an ultrasonic wave to pass through undergoes water repellency treatment.

16. An ultrasonic fluid measurement apparatus comprises:
a measurement flow path formed like a rectangular cross-section pipe rectangular in cross section;
an ultrasonic measurement section having a first transducer and a second transducer provided on said measurement flow path; and
a multilayer flow path member having partition plates housed in said measurement flow path so as to become roughly parallel with respect to an ultrasonic propagation path connecting the first transducer and the second transducer and a frame for supporting a margin along a flowing direction of a fluid in the partition plates, wherein
a plurality of flat flow paths are formed in said measurement flow path using said multilayer flow path member, wherein
an inclined plane continuing with the inner face of said measurement flow path and continuing with the inner side face of the frame is provided.

* * * * *

UNITED STATES PATENT AND TRADEMARK OFFICE
CERTIFICATE OF CORRECTION

PATENT NO. : 8,161,824 B2
APPLICATION NO. : 12/668171
DATED : April 24, 2012
INVENTOR(S) : Masato Satou et al.

Page 1 of 1

It is certified that error appears in the above-identified patent and that said Letters Patent is hereby corrected as shown below:

On the Title Page

Item (75), after "Masato Satou," replace "Kadoma" with --Nara--.

Item (75), after "Yukinori Ozaki," replace "Kadoma" with --Nara--.

Item (75), after "Akihisa Adachi," replace "Kadoma" with --Nara--.

Signed and Sealed this
Tenth Day of July, 2012

David J. Kappos
*Director of the United States Patent and Trademark Office*